US012062069B2

(12) United States Patent
Pinkus et al.

(10) Patent No.: US 12,062,069 B2
(45) Date of Patent: Aug. 13, 2024

(54) TRANSACTION AND COMMUNICATION SYSTEM AND METHOD FOR VENDORS AND PROMOTERS

(71) Applicant: IVSC IP LLC, Las Vegas, NV (US)

(72) Inventors: Michael Collins Pinkus, Alpharetta, GA (US); Jill Ruth Manasse, Las Vegas, NV (US); Christine R. Preus, Las Vegas, NV (US)

(73) Assignee: IVSC IP, LLC, Las Vegas, NV (US)

( * ) Notice: Subject to any disclaimer, the term of this patent is extended or adjusted under 35 U.S.C. 154(b) by 0 days.

(21) Appl. No.: 17/074,377

(22) Filed: Oct. 19, 2020

(65) Prior Publication Data
US 2021/0209646 A1 Jul. 8, 2021

Related U.S. Application Data

(63) Continuation of application No. 15/969,672, filed on May 2, 2018, now abandoned, which is a continuation
(Continued)

(51) Int. Cl.
G06Q 30/02 (2023.01)
G06Q 30/0251 (2023.01)
G07F 17/00 (2006.01)

(52) U.S. Cl.
CPC ......... *G06Q 30/0265* (2013.01); *G06Q 30/02* (2013.01); *G06Q 30/0264* (2013.01); *G07F 17/0057* (2013.01)

(58) Field of Classification Search
CPC ...... G06Q 30/0207–0277; G06Q 30/02; G07F 17/0057
See application file for complete search history.

(56) References Cited

U.S. PATENT DOCUMENTS 2,870,018 A 1/1959 Williams
3,589,486 A 6/1971 Kelch
(Continued)

FOREIGN PATENT DOCUMENTS

CA 2261370 A1 8/2000
CN 2938649 Y 8/2007
(Continued)

OTHER PUBLICATIONS

Deaton, Jamie Page, "How Taxi Meters Work", Title page <http://auto.howstuffworks.com/taxi-meter.htm> (<http://web.archive.org/web/20110423034037/http://auto.howstuffworks.com/taxi-meter.htm> captured on Apr. 23, 2011 using Wayback Machine) (Year: 2011).
(Continued)

*Primary Examiner* — Saba Dagnew
(74) *Attorney, Agent, or Firm* — Peacock Law, P.C.; Justin R. Jackson; Daniel Berenger-Russell

(57) ABSTRACT

Transaction and communication systems and methods are disclosed for vendors and promoters. Some embodiments disclosed herein provide a deal manager system comprising transaction data associated with the promotional activities of one or more promoters, such as promoters registered with the deal manager system. The deal manager system can process the transaction data and provide compensation to promoters for their promotional activities based at least partly thereon. In certain embodiments, at least a portion of the transaction data can be provided to one or more vendors. A vendor may direct that benefits or promotional material be provided to a subset of promoters based at least in part on the received transaction data. The deal manager system may include promoter contact information, and materials provided by the vendor may be conveyed by the deal manager system to certain promoters based on the same.

19 Claims, 31 Drawing Sheets

Related U.S. Application Data of application No. 15/224,338, filed on Jul. 29, 2016, now abandoned, which is a continuation of application No. 13/427,695, filed on Mar. 22, 2012, now abandoned.

(56) References Cited

U.S. PATENT DOCUMENTS

| | | |
|---|---|---|
| 3,667,307 A | 6/1972 | Kelch |
| 3,675,504 A | 7/1972 | Schuh |
| 3,698,627 A | 10/1972 | Kelch et al. |
| 3,736,408 A | 5/1973 | Kienzle et al. |
| 3,764,782 A | 10/1973 | Kelch et al. |
| 3,809,312 A | 5/1974 | Warrick et al. |
| 3,860,806 A | 1/1975 | Fichter et al. |
| 3,860,807 A | 1/1975 | Fichter et al. |
| 3,931,508 A | 1/1976 | Kelch |
| 3,937,933 A | 2/1976 | Warkentin |
| 3,946,213 A | 3/1976 | Kepper |
| 3,953,720 A | 4/1976 | Kelch |
| 4,001,560 A | 1/1977 | Larsen |
| 4,021,645 A | 5/1977 | Saufferer et al. |
| 4,024,384 A | 5/1977 | Tateishi et al. |
| 4,039,780 A | 8/1977 | Kelch et al. |
| 4,045,656 A | 8/1977 | Scott |
| 4,056,709 A | 11/1977 | Scholl et al. |
| 4,081,663 A | 3/1978 | Ahlberg |
| 4,095,737 A | 6/1978 | Schuh et al. |
| 4,118,775 A | 10/1978 | Boyce |
| 4,160,155 A | 7/1979 | Steele et al. |
| 4,167,040 A | 9/1979 | Heritier et al. |
| 4,205,388 A | 5/1980 | Steiner |
| 4,208,664 A | 6/1980 | Mattori |
| 4,209,688 A | 6/1980 | Kelch |
| 4,212,069 A | 7/1980 | Baumann |
| 4,217,484 A | 8/1980 | Gerst |
| 4,240,146 A | 12/1980 | Iles |
| 4,280,180 A | 7/1981 | Eckert et al. |
| 4,360,875 A | 11/1982 | Behnke |
| 4,389,563 A | 6/1983 | Ricard |
| 4,409,685 A | 10/1983 | Ricard |
| 4,436,423 A | 3/1984 | Kumar et al. |
| 4,482,965 A | 11/1984 | Tateishi et al. |
| 4,539,644 A | 9/1985 | Adams et al. |
| 4,570,228 A | 2/1986 | Ahlberg |
| 4,574,189 A | 3/1986 | Adams et al. |
| 4,578,760 A | 3/1986 | Adams et al. |
| 4,580,039 A | 4/1986 | Adams |
| 4,658,707 A | 4/1987 | Hawkins et al. |
| 4,713,753 A | 12/1987 | Boebert et al. |
| 4,736,423 A | 4/1988 | Matyas |
| 4,740,900 A | 4/1988 | Adams |
| 4,789,774 A | 12/1988 | Koch et al. |
| 4,800,502 A | 1/1989 | Stewart et al. |
| 4,860,124 A | 8/1989 | Adams |
| 4,882,570 A | 11/1989 | Martinez |
| 4,888,798 A | 12/1989 | Earnest |
| 4,897,874 A | 1/1990 | Lidinsky et al. |
| 4,926,476 A | 5/1990 | Covey |
| 4,939,652 A | 7/1990 | Steiner |
| 4,965,833 A | 10/1990 | McGregor et al. |
| 4,998,205 A | 3/1991 | Ricard |
| 5,008,827 A | 4/1991 | Sansone et al. |
| 5,010,571 A | 4/1991 | Katznelson |
| 5,043,562 A | 8/1991 | Hautvast et al. |
| 5,058,162 A | 10/1991 | Santon et al. |
| 5,121,097 A | 6/1992 | Van Zeggeren |
| 5,123,045 A | 6/1992 | Ostrovsky et al. |
| 5,155,747 A | 10/1992 | Huang |
| 5,187,646 A | 2/1993 | Koch |
| 5,218,638 A | 6/1993 | Matsumoto et al. |
| 5,241,594 A | 8/1993 | Kung |
| 5,247,575 A | 9/1993 | Sprague et al. |
| 5,274,561 A | 12/1993 | Adams et al. |
| 5,297,206 A | 3/1994 | Orton |
| 5,303,163 A | 4/1994 | Ebaugh et al. |
| 5,319,613 A | 6/1994 | Adams |
| 5,319,705 A | 6/1994 | Halter et al. |
| 5,337,357 A | 8/1994 | Chou et al. |
| 5,341,429 A | 8/1994 | Stringer et al. |
| 5,369,702 A | 11/1994 | Shanton |
| 5,386,369 A | 1/1995 | Christiano |
| 5,400,403 A | 3/1995 | Kaliski et al. |
| 5,410,598 A | 4/1995 | Shear |
| 5,414,772 A | 5/1995 | Naccache et al. |
| 5,416,840 A | 5/1995 | Cane et al. |
| 5,428,555 A | 6/1995 | Starkey et al. |
| 5,448,641 A | 9/1995 | Pintsov et al. |
| 5,454,101 A | 9/1995 | MacKay et al. |
| 5,490,077 A | 2/1996 | Freytag |
| 5,499,295 A | 3/1996 | Cooper |
| 5,504,814 A | 4/1996 | Miyahara |
| 5,509,070 A | 4/1996 | Schull |
| 5,511,122 A | 4/1996 | Atkinson |
| 5,557,796 A | 9/1996 | Fehskens et al. |
| 5,563,946 A | 10/1996 | Cooper et al. |
| 5,598,470 A | 1/1997 | Cooper et al. |
| 5,606,508 A | 2/1997 | Thiel |
| 5,615,264 A | 3/1997 | Kazmierczak et al. |
| 5,623,136 A | 4/1997 | Schmid et al. |
| 5,629,856 A | 5/1997 | Ricard |
| 5,634,012 A | 5/1997 | Stefik et al. |
| 5,646,387 A | 7/1997 | Schmid et al. |
| 5,646,992 A | 7/1997 | Subler et al. |
| 5,664,948 A | 9/1997 | Dimitriadis et al. |
| 5,699,415 A | 12/1997 | Wagner |
| 5,708,709 A | 1/1998 | Rose |
| 5,715,164 A | 2/1998 | Liechti et al. |
| 5,742,807 A | 4/1998 | Masinter |
| 5,754,938 A | 5/1998 | Herz et al. |
| 5,765,152 A | 6/1998 | Erickson |
| 5,778,348 A | 7/1998 | Manduley et al. |
| 5,801,614 A | 9/1998 | Kokubu |
| 5,809,145 A | 9/1998 | Slik et al. |
| 5,809,234 A | 9/1998 | Le |
| 5,812,959 A | 9/1998 | Froeberg et al. |
| 5,822,428 A | 10/1998 | Gardner |
| 5,828,738 A | 10/1998 | Spaeth |
| 5,842,131 A | 11/1998 | Yamane |
| 5,842,186 A | 11/1998 | Kulik |
| 5,892,900 A | 4/1999 | Ginter et al. |
| 5,897,626 A * | 4/1999 | Pomerantz ......... G06Q 30/0284 705/417 |
| 5,898,777 A | 4/1999 | Tycksen et al. |
| 5,917,434 A | 6/1999 | Murphy |
| 5,920,868 A | 7/1999 | Fowlow et al. |
| 5,924,057 A | 7/1999 | Kell |
| 5,982,887 A | 11/1999 | Hirotani |
| 5,991,402 A | 11/1999 | Jia et al. |
| 5,999,622 A | 12/1999 | Yasukawa et al. |
| 6,028,510 A | 2/2000 | Tamam et al. |
| 6,060,993 A | 5/2000 | Cohen |
| 6,081,204 A | 6/2000 | Lavoie et al. |
| 6,087,965 A | 7/2000 | Murphy |
| 6,109,520 A | 8/2000 | Ricard |
| 6,122,591 A | 9/2000 | Pomerantz |
| 6,212,525 B1 | 4/2001 | Guha |
| 6,225,890 B1 | 5/2001 | Murphy |
| 6,236,330 B1 | 5/2001 | Cohen |
| 6,246,933 B1 | 6/2001 | Baque |
| 6,249,772 B1 | 6/2001 | Walker et al. |
| 6,253,129 B1 | 6/2001 | Jenkins et al. |
| 6,253,649 B1 | 7/2001 | Shinjo |
| 6,269,343 B1 | 7/2001 | Pallakoff |
| 6,275,768 B1 | 8/2001 | Zobell et al. |
| 6,330,499 B1 | 12/2001 | Chou et al. |
| 6,339,745 B1 | 1/2002 | Novik |
| 6,347,739 B1 | 2/2002 | Tamam |
| 6,366,207 B1 | 4/2002 | Murphy |
| 6,388,579 B1 | 5/2002 | Adcox et al. |
| 6,442,553 B1 | 8/2002 | Take |
| 6,456,207 B1 | 9/2002 | Yen |
| 6,466,921 B1 | 10/2002 | Cordery et al. |
| 6,474,552 B1 | 11/2002 | Ricard |

(56) References Cited

U.S. PATENT DOCUMENTS

| | | |
|---|---|---|
| 6,487,717 B1 | 11/2002 | Brunemann et al. |
| 6,546,006 B1 | 4/2003 | Fraser |
| 6,565,443 B1 | 5/2003 | Johnson et al. |
| 6,587,781 B2 | 7/2003 | Feldman et al. |
| 6,609,103 B1 | 8/2003 | Kolls |
| 6,611,755 B1 | 8/2003 | Coffee et al. |
| 6,677,858 B1 | 1/2004 | Faris et al. |
| 6,686,834 B1 | 2/2004 | Tamam et al. |
| 6,702,674 B1 | 3/2004 | De Bruin et al. |
| 6,710,721 B1 | 3/2004 | Holowick |
| 6,722,331 B2 | 4/2004 | Koehler et al. |
| 6,736,317 B1 | 5/2004 | McDonald et al. |
| 6,754,636 B1 | 6/2004 | Walker et al. |
| 6,754,637 B1 | 6/2004 | Stenz |
| 6,756,913 B1 | 6/2004 | Ayed |
| 6,772,331 B1 | 8/2004 | Hind et al. |
| 6,773,477 B2 | 8/2004 | Lindsay |
| 6,782,241 B2 | 8/2004 | Kobayashi |
| 6,807,534 B1 | 10/2004 | Erickson |
| 6,812,851 B1 | 11/2004 | Dukach et al. |
| 6,839,840 B1 | 1/2005 | Cooreman |
| 6,857,067 B2 | 2/2005 | Edelman |
| 6,930,596 B2 | 8/2005 | Kulesz et al. |
| 6,931,309 B2 | 8/2005 | Phelan et al. |
| 6,941,197 B1 | 9/2005 | Murakami et al. |
| 7,010,685 B1 | 3/2006 | Candelore |
| 7,010,697 B2 | 3/2006 | Byrne et al. |
| 7,039,603 B2 | 5/2006 | Walker et al. |
| 7,085,775 B2 | 8/2006 | Short et al. |
| 7,093,137 B1 | 8/2006 | Sato et al. |
| 7,093,282 B2 | 8/2006 | Hillhouse |
| 7,100,195 B1 | 8/2006 | Underwood |
| 7,103,583 B1 | 9/2006 | Baum et al. |
| 7,124,099 B2 | 10/2006 | Mesaros |
| 7,124,437 B2 | 10/2006 | Byrne et al. |
| 7,127,411 B2 | 10/2006 | Ho |
| 7,130,584 B2 | 10/2006 | Hirvonen |
| 7,130,831 B2 | 10/2006 | Howard et al. |
| 7,163,459 B2 | 1/2007 | Tanskanen |
| 7,181,419 B1 | 2/2007 | Mesaros |
| 7,188,089 B2 | 3/2007 | Goldthwaite et al. |
| 7,203,666 B2 | 4/2007 | Gravell et al. |
| 7,236,956 B1 | 6/2007 | Ogg et al. |
| 7,266,695 B2 | 9/2007 | Nakayama |
| 7,278,031 B1 | 10/2007 | Best |
| 7,378,982 B2 | 5/2008 | Mohamed |
| 7,437,756 B2 | 10/2008 | Bleumer |
| 7,449,988 B2 | 11/2008 | Hata |
| 7,472,172 B2 | 12/2008 | Anderson et al. |
| 7,512,968 B2 | 3/2009 | Stephens et al. |
| 7,551,593 B2 | 6/2009 | Haller et al. |
| 7,562,818 B1 | 7/2009 | Bierbaum et al. |
| 7,565,529 B2 | 7/2009 | Beck et al. |
| 7,567,940 B1 | 7/2009 | Engelberg et al. |
| 7,577,617 B1 | 8/2009 | Reisinger |
| 7,598,889 B2 | 10/2009 | Maeda et al. |
| 7,646,740 B2 | 1/2010 | Crolley et al. |
| 7,647,024 B2 | 1/2010 | Wang et al. |
| 7,689,468 B2 | 3/2010 | Walker et al. |
| 7,689,469 B1 | 3/2010 | Mesaros |
| 7,693,662 B2 | 4/2010 | Yamada |
| 7,693,748 B1 | 4/2010 | Mesaros |
| 7,721,108 B2 | 5/2010 | Pailles et al. |
| 7,738,569 B2 | 6/2010 | Quinn et al. |
| 7,739,205 B1 | 6/2010 | Reisinger |
| 7,743,427 B2 | 6/2010 | Byrne et al. |
| 7,769,694 B2 | 8/2010 | Schwartz et al. |
| 7,769,700 B2 | 8/2010 | D'Amico et al. |
| 7,797,679 B2 | 9/2010 | Tysowski et al. |
| 7,811,172 B2 | 10/2010 | Asher et al. |
| 7,812,711 B2 | 10/2010 | Brown et al. |
| 7,813,715 B2 | 10/2010 | McKillop et al. |
| 7,817,991 B2 | 10/2010 | Hinckley et al. |
| 7,853,600 B2 | 12/2010 | Herz et al. |
| 7,904,063 B1 | 3/2011 | Steelberg et al. |
| 7,907,901 B1 | 3/2011 | Kahn et al. |
| 7,912,020 B2 | 3/2011 | Khasawneh et al. |
| 7,913,297 B2 | 3/2011 | Wyld |
| 7,925,656 B2 | 4/2011 | Liu et al. |
| 7,926,056 B2 | 4/2011 | Lier et al. |
| 7,932,892 B2 | 4/2011 | Chen et al. |
| 7,941,831 B2 | 5/2011 | Mandhana et al. |
| 7,983,616 B2 | 7/2011 | Wang et al. |
| 8,036,822 B2 | 10/2011 | Ho |
| 8,065,718 B2 | 11/2011 | Grove et al. |
| 8,139,820 B2 | 3/2012 | Plante et al. |
| 8,170,524 B2 | 5/2012 | Abbot et al. |
| 8,200,624 B2 | 6/2012 | Clegg et al. |
| 8,239,092 B2 | 8/2012 | Plante et al. |
| 8,243,423 B2 | 8/2012 | Ranta et al. |
| 8,248,245 B2 | 8/2012 | Talach et al. |
| 8,474,050 B2 | 6/2013 | Casimere et al. |
| 8,489,895 B2 | 7/2013 | Tan, Jr. |
| 8,499,356 B2 | 7/2013 | Byrne et al. |
| 8,533,494 B2 | 9/2013 | Harada |
| 8,566,651 B2 | 10/2013 | Liu et al. |
| 8,568,224 B1 | 10/2013 | Itkis et al. |
| 8,630,897 B1* | 1/2014 | Prada Gomez ........ G08G 1/202 |
| | | 705/14.57 |
| 9,037,852 B2 | 5/2015 | Pinkus et al. |
| 9,157,748 B2 | 10/2015 | Millspaugh |
| 9,646,326 B2* | 5/2017 | Goralnick .......... G01C 21/3697 |
| 10,776,837 B2 | 9/2020 | Roivainen |
| 10,957,227 B2 | 3/2021 | Delorean |
| 11,238,498 B2 | 2/2022 | Knowles et al. |
| 2001/0042045 A1 | 11/2001 | Howard et al. |
| 2002/0023027 A1 | 2/2002 | Simonds |
| 2002/0026321 A1 | 2/2002 | Faris et al. |
| 2002/0049683 A1 | 4/2002 | Ricard |
| 2002/0052751 A1 | 5/2002 | Ebata |
| 2002/0065836 A1 | 5/2002 | Sasaki |
| 2002/0072963 A1 | 6/2002 | Jonge |
| 2002/0087500 A1 | 7/2002 | Berkowitz et al. |
| 2002/0091473 A1 | 7/2002 | Gardner et al. |
| 2002/0107027 A1* | 8/2002 | O'Neil ................... G06Q 30/02 |
| | | 455/456.3 |
| 2002/0111154 A1* | 8/2002 | Eldering ............. H04M 3/4872 |
| | | 455/414.1 |
| 2002/0120590 A1 | 8/2002 | Richard |
| 2002/0136407 A1 | 9/2002 | Denning et al. |
| 2002/0156699 A1* | 10/2002 | Gray .................. G06Q 30/0601 |
| | | 705/26.1 |
| 2002/0164962 A1 | 11/2002 | Mankins et al. |
| 2002/0170962 A1* | 11/2002 | Besling ............... G06Q 20/363 |
| | | 235/384 |
| 2002/0174355 A1 | 11/2002 | Rajasekaran et al. |
| 2002/0186144 A1 | 12/2002 | Meunier |
| 2003/0022719 A1 | 1/2003 | Donald et al. |
| 2003/0032460 A1 | 2/2003 | Cannon et al. |
| 2003/0034873 A1 | 2/2003 | Chase et al. |
| 2003/0037237 A1 | 2/2003 | Abgrall et al. |
| 2003/0061080 A1 | 3/2003 | Ross |
| 2003/0068999 A1 | 4/2003 | Casali et al. |
| 2003/0079122 A1 | 4/2003 | Asokan et al. |
| 2003/0084332 A1 | 5/2003 | Krasinski et al. |
| 2003/0139941 A1 | 7/2003 | Matsumoto |
| 2003/0144906 A1 | 7/2003 | Fujimoto et al. |
| 2003/0169162 A1 | 9/2003 | Hyman |
| 2003/0177020 A1 | 9/2003 | Okamura |
| 2003/0177373 A1 | 9/2003 | Moyer et al. |
| 2003/0216960 A1 | 11/2003 | Postrel |
| 2003/0217270 A1 | 11/2003 | Nakayama |
| 2003/0220835 A1 | 11/2003 | Barnes |
| 2003/0222134 A1 | 12/2003 | Boyd |
| 2004/0064415 A1 | 4/2004 | Abdallah et al. |
| 2004/0078118 A1 | 4/2004 | Binder |
| 2004/0078141 A1 | 4/2004 | Kittell et al. |
| 2004/0093280 A1 | 5/2004 | Yamaguchi |
| 2004/0093312 A1 | 5/2004 | Cordery et al. |
| 2004/0112959 A1 | 6/2004 | Jun |
| 2004/0119589 A1* | 6/2004 | French ............... G06Q 30/0267 |
| | | 340/539.11 |
| 2004/0143378 A1 | 7/2004 | Vogelsang |
| 2004/0162802 A1 | 8/2004 | Jonas |

(56) References Cited

U.S. PATENT DOCUMENTS

| | | | |
|---|---|---|---|
| 2004/0176081 A1* | 9/2004 | Bryham | H04W 4/12 455/414.1 |
| 2004/0177109 A1 | 9/2004 | Lee | |
| 2004/0192351 A1 | 9/2004 | Duncan | |
| 2004/0210757 A1 | 10/2004 | Kogan et al. | |
| 2004/0219933 A1 | 11/2004 | Faith | |
| 2004/0225440 A1 | 11/2004 | Khatwa et al. | |
| 2004/0225557 A1 | 11/2004 | Phelan et al. | |
| 2004/0253923 A1 | 12/2004 | Braley et al. | |
| 2005/0131597 A1 | 6/2005 | Raz et al. | |
| 2005/0190619 A1 | 9/2005 | Wakiyama | |
| 2005/0209970 A1 | 9/2005 | Shiba et al. | |
| 2005/0216134 A1 | 9/2005 | Katrak et al. | |
| 2005/0229012 A1 | 10/2005 | Douceur et al. | |
| 2006/0033840 A1 | 2/2006 | Diehl et al. | |
| 2006/0034201 A1 | 2/2006 | Umeda et al. | |
| 2006/0036501 A1 | 2/2006 | Shahbazi et al. | |
| 2006/0069749 A1 | 3/2006 | Herz et al. | |
| 2006/0089912 A1 | 4/2006 | Spagna et al. | |
| 2006/0095329 A1* | 5/2006 | Kim | G06Q 30/0269 705/14.66 |
| 2006/0131401 A1* | 6/2006 | Do | G06Q 30/02 235/383 |
| 2006/0135120 A1* | 6/2006 | Likourezos | G06Q 30/02 455/406 |
| 2006/0143455 A1 | 6/2006 | Gitzinger | |
| 2006/0164257 A1 | 7/2006 | Giubbini | |
| 2006/0168580 A1 | 7/2006 | Harada et al. | |
| 2006/0182055 A1 | 8/2006 | Coffee et al. | |
| 2006/0200430 A1 | 9/2006 | Kim | |
| 2006/0206433 A1 | 9/2006 | Scoggins | |
| 2006/0242058 A1 | 10/2006 | Torto | |
| 2006/0259790 A1 | 11/2006 | Asokan et al. | |
| 2006/0267860 A1 | 11/2006 | Rinaldo et al. | |
| 2006/0276960 A1 | 12/2006 | Adamczyk et al. | |
| 2006/0282649 A1 | 12/2006 | Malamud et al. | |
| 2007/0032195 A1 | 2/2007 | Kurisko et al. | |
| 2007/0075874 A1 | 4/2007 | Shah et al. | |
| 2007/0082614 A1 | 4/2007 | Mock | |
| 2007/0109106 A1 | 5/2007 | Maeda et al. | |
| 2007/0123166 A1 | 5/2007 | Sheynman et al. | |
| 2007/0125843 A1* | 6/2007 | Byerly | B41J 3/407 235/380 |
| 2007/0126601 A1 | 6/2007 | Park | |
| 2007/0179910 A1 | 8/2007 | Ferraro | |
| 2007/0200663 A1 | 8/2007 | White et al. | |
| 2007/0208864 A1 | 9/2007 | Flynn et al. | |
| 2007/0213047 A1* | 9/2007 | Kolker | G06Q 10/02 455/428 |
| 2007/0226777 A1 | 9/2007 | Burton et al. | |
| 2007/0257813 A1 | 11/2007 | Vaswani et al. | |
| 2007/0257815 A1 | 11/2007 | Gunderson et al. | |
| 2008/0018730 A1* | 1/2008 | Roth | H04N 7/163 348/14.02 |
| 2008/0040210 A1 | 2/2008 | Hedley | |
| 2008/0045234 A1 | 2/2008 | Reed | |
| 2008/0048886 A1 | 2/2008 | Brown et al. | |
| 2008/0057868 A1 | 3/2008 | Chang | |
| 2008/0082397 A1 | 4/2008 | Dennison et al. | |
| 2008/0082403 A1 | 4/2008 | Adegoke et al. | |
| 2008/0102793 A1 | 5/2008 | Venkatesan et al. | |
| 2008/0113618 A1 | 5/2008 | De et al. | |
| 2008/0114707 A1 | 5/2008 | Steiner | |
| 2008/0122606 A1 | 5/2008 | Bradley | |
| 2008/0126665 A1 | 5/2008 | Burr et al. | |
| 2008/0147268 A1 | 6/2008 | Fuller | |
| 2008/0162260 A1 | 7/2008 | Rohan et al. | |
| 2008/0166968 A1 | 7/2008 | Tang et al. | |
| 2008/0195428 A1 | 8/2008 | Osullivan | |
| 2008/0235517 A1 | 9/2008 | Ohmori et al. | |
| 2008/0235811 A1 | 9/2008 | Yan | |
| 2008/0248748 A1 | 10/2008 | Sangster et al. | |
| 2008/0270204 A1 | 10/2008 | Poykko et al. | |
| 2008/0285626 A1 | 11/2008 | Ma et al. | |
| 2008/0287062 A1 | 11/2008 | Claus et al. | |
| 2008/0294312 A1 | 11/2008 | Oconnor et al. | |
| 2008/0319604 A1 | 12/2008 | Follmer et al. | |
| 2008/0319666 A1 | 12/2008 | Petrov et al. | |
| 2009/0009321 A1 | 1/2009 | McClellan et al. | |
| 2009/0024419 A1 | 1/2009 | McClellan et al. | |
| 2009/0030885 A1 | 1/2009 | Depasquale et al. | |
| 2009/0034591 A1 | 2/2009 | Julian et al. | |
| 2009/0061769 A1 | 3/2009 | Zimbric et al. | |
| 2009/0079555 A1 | 3/2009 | Aguirre et al. | |
| 2009/0083833 A1 | 3/2009 | Ziola et al. | |
| 2009/0096573 A1 | 4/2009 | Graessley | |
| 2009/0098855 A1 | 4/2009 | Fernandez et al. | |
| 2009/0111378 A1 | 4/2009 | Sheynman et al. | |
| 2009/0112723 A1 | 4/2009 | Gottesman et al. | |
| 2009/0118002 A1* | 5/2009 | Lyons | G07F 17/3227 463/29 |
| 2009/0156123 A1 | 6/2009 | Kim | |
| 2009/0156241 A1 | 6/2009 | Staffaroni et al. | |
| 2009/0157255 A1 | 6/2009 | Plante | |
| 2009/0169006 A1 | 7/2009 | Zick et al. | |
| 2009/0186577 A1 | 7/2009 | Ross et al. | |
| 2009/0207014 A1 | 8/2009 | Ayed | |
| 2009/0210343 A1 | 8/2009 | Griffin | |
| 2009/0234745 A1 | 9/2009 | Ramer et al. | |
| 2009/0254259 A1 | 10/2009 | The | |
| 2009/0254270 A1 | 10/2009 | Yu | |
| 2009/0270036 A1 | 10/2009 | Michaud | |
| 2009/0271289 A1 | 10/2009 | Klinger et al. | |
| 2009/0281818 A1 | 11/2009 | Li et al. | |
| 2009/0286479 A1 | 11/2009 | Thoresson et al. | |
| 2009/0325491 A1 | 12/2009 | Bell et al. | |
| 2009/0326991 A1 | 12/2009 | Wei et al. | |
| 2010/0022217 A1 | 1/2010 | Ketari | |
| 2010/0027414 A1 | 2/2010 | Hamachi | |
| 2010/0030582 A1 | 2/2010 | Rippel et al. | |
| 2010/0036717 A1 | 2/2010 | Trest | |
| 2010/0037063 A1 | 2/2010 | Chontos et al. | |
| 2010/0045452 A1 | 2/2010 | Periwal | |
| 2010/0063857 A1 | 3/2010 | Malik | |
| 2010/0077115 A1 | 3/2010 | Rofougaran | |
| 2010/0094780 A1 | 4/2010 | Trzcinski | |
| 2010/0125510 A1 | 5/2010 | Smith et al. | |
| 2010/0167643 A1 | 7/2010 | Hirsch | |
| 2010/0167646 A1 | 7/2010 | Alameh et al. | |
| 2010/0194549 A1 | 8/2010 | Tonokawa et al. | |
| 2010/0199325 A1 | 8/2010 | Raleigh | |
| 2010/0217507 A1 | 8/2010 | Braunberger et al. | |
| 2010/0227549 A1 | 9/2010 | Kozlay | |
| 2010/0241857 A1 | 9/2010 | Okude et al. | |
| 2010/0246824 A1 | 9/2010 | Julian et al. | |
| 2010/0250060 A1 | 9/2010 | Maeda et al. | |
| 2010/0255782 A1 | 10/2010 | Klemmensen | |
| 2010/0259058 A1 | 10/2010 | Knighton et al. | |
| 2010/0265034 A1 | 10/2010 | Cap et al. | |
| 2010/0299207 A1* | 11/2010 | Harlev | G06Q 50/40 705/14.62 |
| 2010/0299212 A1 | 11/2010 | Graylin et al. | |
| 2010/0318578 A1 | 12/2010 | Treu et al. | |
| 2010/0330908 A1 | 12/2010 | Maddern et al. | |
| 2010/0332312 A1 | 12/2010 | Klinger et al. | |
| 2011/0009107 A1 | 1/2011 | Guba et al. | |
| 2011/0012720 A1 | 1/2011 | Hirschfeld | |
| 2011/0022474 A1* | 1/2011 | Jain | G06Q 30/02 235/382 |
| 2011/0022477 A1* | 1/2011 | Hatridge | G06Q 30/02 715/745 |
| 2011/0022764 A1 | 1/2011 | Ohkubo et al. | |
| 2011/0047062 A1* | 2/2011 | Kerschner | G07F 17/00 705/37 |
| 2011/0053552 A1 | 3/2011 | Kim et al. | |
| 2011/0055309 A1* | 3/2011 | Gibor | H04L 69/18 709/227 |
| 2011/0057815 A1 | 3/2011 | King et al. | |
| 2011/0077056 A1 | 3/2011 | Park et al. | |
| 2011/0093340 A1 | 4/2011 | Kramer et al. | |
| 2011/0099040 A1 | 4/2011 | Felt et al. | |
| 2011/0112770 A1 | 5/2011 | Kuramori | |
| 2011/0119491 A1 | 5/2011 | Nocera | |

(56) References Cited

U.S. PATENT DOCUMENTS

| | | | |
|---|---|---|---|
| 2011/0124321 A1 | 5/2011 | Sagong et al. | |
| 2011/0131153 A1 | 6/2011 | Grim et al. | |
| 2011/0153453 A1 | 6/2011 | Ghafoor et al. | |
| 2011/0153495 A1 | 6/2011 | Dixon et al. | |
| 2011/0185435 A1 | 7/2011 | Chang | |
| 2011/0213618 A1* | 9/2011 | Hodge | G07F 19/20 705/1.1 |
| 2011/0215900 A1 | 9/2011 | Corradino et al. | |
| 2011/0307282 A1 | 12/2011 | Camp et al. | |
| 2011/0313880 A1* | 12/2011 | Paul | G06Q 30/0631 705/26.7 |
| 2011/0320259 A1 | 12/2011 | Roumeliotis et al. | |
| 2012/0053805 A1 | 3/2012 | Dantu | |
| 2012/0054498 A1 | 3/2012 | Rickman | |
| 2012/0072267 A1 | 3/2012 | Gutierrez et al. | |
| 2012/0074927 A1 | 3/2012 | Ramirez | |
| 2012/0109796 A1 | 5/2012 | Mashal et al. | |
| 2012/0130627 A1 | 5/2012 | Islam et al. | |
| 2012/0137126 A1 | 5/2012 | Matsuoka et al. | |
| 2012/0041675 A1 | 7/2012 | Juliver et al. | |
| 2012/0172136 A1 | 7/2012 | House et al. | |
| 2012/0185302 A1 | 7/2012 | Kim et al. | |
| 2012/0203441 A1 | 8/2012 | Higgins et al. | |
| 2012/0226390 A1 | 9/2012 | Adams et al. | |
| 2012/0226748 A1 | 9/2012 | Bosworth et al. | |
| 2012/0233246 A1 | 9/2012 | Guemez | |
| 2012/0303533 A1 | 11/2012 | Pinkus et al. | |
| 2012/0323692 A1 | 12/2012 | Shutter | |
| 2012/0323792 A1 | 12/2012 | Peterson et al. | |
| 2012/0330741 A1 | 12/2012 | Cruz | |
| 2013/0006722 A1 | 1/2013 | Ziomkowski et al. | |
| 2013/0013412 A1 | 1/2013 | Altman et al. | |
| 2013/0054281 A1 | 2/2013 | Thakkar et al. | |
| 2013/0054282 A1 | 2/2013 | Pinkus et al. | |
| 2013/0054361 A1* | 2/2013 | Rakshit | G06Q 30/0261 705/14.66 |
| 2013/0060721 A1 | 3/2013 | Pinkus et al. | |
| 2013/0061044 A1 | 3/2013 | Pinkus et al. | |
| 2013/0066688 A1 | 3/2013 | Pinkus | |
| 2013/0085817 A1 | 4/2013 | Pinkus | |
| 2013/0104220 A1 | 4/2013 | Lee | |
| 2013/0145459 A1 | 6/2013 | Furuichi et al. | |
| 2013/0166387 A1 | 6/2013 | Hoffberg | |
| 2013/0218647 A1 | 8/2013 | Kroll et al. | |
| 2013/0246181 A1 | 9/2013 | Lobsenz | |
| 2013/0253999 A1 | 9/2013 | Pinkus et al. | |
| 2013/0332075 A1 | 12/2013 | Wang et al. | |
| 2014/0039784 A1 | 2/2014 | Millspaugh | |
| 2014/0040016 A1 | 2/2014 | Amla et al. | |
| 2014/0067195 A1 | 3/2014 | James et al. | |
| 2014/0067488 A1 | 3/2014 | James et al. | |
| 2014/0067489 A1 | 3/2014 | James et al. | |
| 2014/0067490 A1 | 3/2014 | James et al. | |
| 2014/0067491 A1 | 3/2014 | James et al. | |
| 2014/0081764 A1 | 3/2014 | James | |
| 2015/0310510 A1* | 10/2015 | Kelly | H04W 4/02 705/13 |
| 2015/0332516 A1 | 11/2015 | Pinkus et al. | |
| 2016/0370202 A1 | 12/2016 | James et al. | |
| 2016/0371754 A1 | 12/2016 | James et al. | |
| 2016/0373528 A1 | 12/2016 | Pinkus et al. | |
| 2016/0379421 A1 | 12/2016 | James et al. | |
| 2017/0024936 A1 | 1/2017 | Pinkus | |
| 2017/0032422 A1 | 2/2017 | Pinkus et al. | |
| 2019/0026749 A1 | 1/2019 | Gao et al. | |
| 2019/0035167 A1 | 1/2019 | Pinkus | |
| 2019/0043089 A1 | 2/2019 | Pinkus et al. | |
| 2019/0213801 A1 | 7/2019 | Pinkus et al. | |
| 2020/0014757 A1 | 1/2020 | Pinkus et al. | |
| 2020/0035042 A1 | 1/2020 | Pinkus | |
| 2020/0211142 A1 | 7/2020 | James et al. | |

FOREIGN PATENT DOCUMENTS

| | | |
|---|---|---|
| CN | 201229596 Y | 4/2009 |
| CN | 101488784 A | 7/2009 |
| CN | 101834903 | 9/2010 |
| CN | 101834903 A | 9/2010 |
| DE | 3636353 C1 | 11/1987 |
| DE | 3736258 A1 | 5/1989 |
| DE | 3922373 A1 | 1/1991 |
| DE | 10120781 C2 | 5/2003 |
| DE | 102005052872 A1 | 7/2007 |
| DE | 202008005583 U1 | 7/2008 |
| EP | 0261433 A2 | 3/1988 |
| EP | 0265708 A2 | 5/1988 |
| EP | 0313882 A2 | 5/1989 |
| EP | 0406663 A3 | 11/1992 |
| EP | 0600818 A1 | 6/1994 |
| EP | 1358748 A2 | 11/2003 |
| EP | 1455487 A1 | 9/2004 |
| EP | 1887770 A1 | 2/2008 |
| EP | 1975899 A1 | 10/2008 |
| EP | 2073160 A1 | 6/2009 |
| EP | 2751785 A2 | 7/2014 |
| GB | 2494909 A | 3/2013 |
| JP | 06-012419 | 1/1994 |
| JP | 6-12419 | 1/1994 |
| JP | 2002-063690 | 2/2002 |
| JP | 2002063690 A | 2/2002 |
| JP | 2002312811 A | 10/2002 |
| JP | 2003-115061 | 4/2003 |
| JP | 2003115061 A | 4/2003 |
| JP | 2004-280329 | 10/2004 |
| JP | 2004280329 A | 10/2004 |
| JP | 2009145080 A | 7/2009 |
| JP | 2009198418 A | 9/2009 |
| KR | 950014892 B1 | 12/1995 |
| KR | 20030017805 A | 3/2003 |
| KR | 20060098940 A | 9/2006 |
| KR | 20070075874 A | 7/2007 |
| KR | 20080005800 A | 1/2008 |
| KR | 100863420 B1 | 10/2008 |
| KR | 20090047144 A | 5/2009 |
| KR | 20090081136 A | 7/2009 |
| KR | 20100120898 A | 11/2010 |
| KR | 10-2012-0040478 | 4/2012 |
| KR | 20120040478 A | 4/2012 |
| KR | 10-2012-0050023 | 5/2012 |
| KR | 20120050023 A | 5/2012 |
| RU | 44193 U1 | 2/2005 |
| WO | 9952084 A1 | 10/1999 |
| WO | 0217567 A2 | 2/2002 |
| WO | WO 2002/017567 | 2/2002 |
| WO | 02102019 A2 | 12/2002 |
| WO | 2004/047046 A1 | 6/2004 |
| WO | 2004047046 A1 | 6/2004 |
| WO | 2006119854 A1 | 11/2006 |
| WO | 2007118221 A3 | 10/2007 |
| WO | 2008082779 A1 | 7/2008 |
| WO | 2008157618 A2 | 12/2008 |
| WO | 2009129957 A1 | 10/2009 |
| WO | 2010010409 A1 | 1/2010 |
| WO | WO 2010/010409 | 1/2010 |
| WO | 2011038269 A1 | 3/2011 |
| WO | 2011056044 A2 | 5/2011 |
| WO | 2011067741 A1 | 6/2011 |
| WO | WO 2011/067741 | 6/2011 |
| WO | 2011085145 A1 | 7/2011 |
| WO | 2012051359 A2 | 4/2012 |
| WO | WO 2012/051359 | 4/2012 |
| WO | 2012162100 A1 | 11/2012 |
| WO | 2013049408 A2 | 4/2013 |
| WO | WO 2013/049408 | 4/2013 |
| WO | 2014036330 | 3/2014 |
| WO | 2014036331 A1 | 3/2014 |
| WO | 2014036332 A1 | 3/2014 |
| WO | 2014036333 A1 | 3/2014 |
| WO | 2014036335 A1 | 3/2014 |
| WO | WO 2014/036330 | 3/2014 |
| WO | WO 2014/036331 | 3/2014 |

(56) References Cited

FOREIGN PATENT DOCUMENTS

| WO | WO 2014/036332 | 3/2014 |
|---|---|---|
| WO | WO 2014/036335 | 3/2014 |
| WO | 2013033468 A3 | 5/2014 |
| WO | 2013033470 A3 | 5/2014 |

OTHER PUBLICATIONS

Deaton, Jamie Page, "How Taxi Meters Work", Common Fares page <http://auto.howstuffworks.com/taxi-meter2.htm> (<http://web.archive.org/web/20110427093054/http://auto.howstuffworks.com/taxi-meter2.htm> captured on Apr. 27, 2011 using Wayback Machine) (Year: 2011).
Allen, Ben, "Another Look at Xtify", Jun. 24, 2010, 6 pages, http://www.locationawhere.com/24/06/2010/companies/xtify.
Baker, Rosie "London Cabs get Digital Screen Network", MarketingWeek, Sep. 1, 2011, 1 page, http://www.marketingweek.co.uk/sectors/travel-and-leisure/london-cabs-get-digital-screen-network/3029764.article.
California Public Utilities Commission, "Passenger Carriers Questions and Answers", as captured Feb. 26, 2011 in 4 pages, http://web.archive.org/web/20110226110944/http://www.cpuc.ca.gov/PUC/transportation/FAQs/psgfaqs.htm.
"MTData Handbook", Premier Cabs, Revision 1.0, Dec. 2009, © 2009 Mobile Tracking and Data Pty. Ltd., pp. 49.
NYC Taxi & Limousine Commission, "Current Licensees", as captured Jul. 19, 2012 in 3 pages, http://web.archive.org/web/20120719230728/http://www.nyc.gov/html/tlc/html/industry/current_licensees.shtml.
New York City Taxi & Limousine Commission, "Passenger Information | Taxicab Rate of Fare", as captured Aug. 4, 2011 in 3 pages, http://web.archive.org/web/20110804040339/http://www.nyc.gov/html/tlc/html/passenger/taxicab_rate.shtml.
Trademark Electronic Search System (TESS), Android, Printed Feb. 6, 2017, United States Patent and Trademark Office.
Trademark Electronic Search System (TESS), American Express, Printed Feb. 6, 2017, United States Patent and Trademark Office.
Trademark Electronic Search System (TESS), Blackberry, Printed Feb. 6, 2017, United States Patent and Trademark Office.
Trademark Electronic Search System (TESS), Bluetooth, Printed Feb. 6, 2017, United States Patent and Trademark Office.
Trademark Electronic Search System (TESS), Discover, Printed Feb. 6, 2017, United States Patent and Trademark Office.
Trademark Electronic Search System (TESS), Falconview, Printed Sep. 5, 2013, United States Patent and Trademark Office.
Trademark Electronic Search System (TESS), Flamingo, Printed Sep. 5, 2013, United States Patent and Trademark Office.
Trademark Electronic Search System (TESS), Google, Printed Feb. 6, 2017, United States Patent and Trademark Office.
Trademark Electronic Search System (TESS), IBM, Printed Feb. 6, 2017, United States Patent and Trademark Office.
Trademark Electronic Search System (TESS), MacIntosh, Printed Feb. 6, 2017, United States Patent and Trademark Office.
Trademark Electronic Search System (TESS), Mastercard, Printed Feb. 6, 2017, United States Patent and Trademark Office.
Trademark Electronic Search System (TESS), Perl, Printed Feb. 6, 2017, United States Patent and Trademark Office.
Trademark Electronic Search System (TESS), Python Printed Feb. 6, 2017, United States Patent and Trademark Office.
Trademark Electronic Search System (TESS), QR Code, Printed Feb. 6, 2017, United States Patent and Trademark Office.
Trademark Electronic Search System (TESS), Typed Drawing Linux, Printed Feb. 6, 2017, United States Patent and Trademark Office.
Trademark Electronic Search System (TESS), Typed Drawing Windows XP, Printed Feb. 6, 2017, United States Patent and Trademark Office.
Trademark Electronic Search System (TESS), Unix, Printed Feb. 6, 2017, United States Patent and Trademark Office.
Trademark Electronic Search System (TESS), Visa, Printed Feb. 6, 2017, United States Patent and Trademark Office.
Trademark Electronic Search System (TESS), Windows Vista, Printed Feb. 6, 2017, United States Patent and Trademark Office.
Official Communication in Pakistani Application No. 317/2012, dated Apr. 11, 2013.
International Search Report and Written Opinion in International Application No. PCT/US2012/38422, dated Aug. 17, 2012.
International Preliminary Report on Patentability in International Application No. PCT/US2012/38422, dated Dec. 5, 2013.
International Search Report and Written Opinion in International Application No. PCT/US2013/057405, dated Nov. 27, 2013.
International Preliminary Report and Written Opinion in International Application No. PCT/US2013/057405, dated Mar. 12, 2015.
International Search Report and Written Opinion in International Application No. PCT/US2013/057406, dated Nov. 27, 2013.
International Preliminary Report and Written Opinion in International Application No. PCT/US2013/057406, dated Mar. 12, 2015.
International Search Report and Written Opinion in International Application No. PCT/US2013/057407, dated Nov. 27, 2013.
International Preliminary Report and Written Opinion in International Application No. PCT/US2013/057407, dated Mar. 12, 2015.
International Search Report and Written Opinion in International Application No. PCT/US2013/057408, dated Nov. 27, 2013.
International Preliminary Report and Written Opinion in International Application No. PCT/US2013/057408, dated Mar. 12, 2015.
International Search Report and Written Opinion in International Application No. PCT/US2013/057411, dated Dec. 2, 2013.
International Preliminary Report and Written Opinion in International Application No. PCT/US2013/057411, dated Mar. 12, 2015.
"Pusar Technology Systems, Inc., Model 2030, Copyrights 2004", https://www.taxidepot.com/taxiproducts/9tx5n06w6uyz3vrlpi32c7zals5c9b, Downloaded Feb. 1, 2023, 2004.
Bryant, Eric D., et al., "A Survey of Anti-Tamper Technologies", Crosstalk The Journal of Defense Software Engineering, Nov. 2004, 12-16.
Islam, Md. Tofiqul, "Design and Fabrication of Fare Meter of Taxicab Using Microcontroller", Proceedings of the International Conference on Mechanical Engineering 2005 (ICME) 28-30, Dec. 2005, Dhaka, Bangladesh.
Rukhande, Smita, et al., "Implementation of GPS Enabled Car Pooling System", International Journal of Advances in Engineering & Technology, vol. 1, Issue 5, 2011, 318-328.
Centrodyne, Silent 620 Electronic Taximeter, https://centrodyne.com/index.php/en/products/taximeters/silent-620, Downloaded Jan. 27, 2023.
Dial-A-Ride Guide, Valley Metro, May 2010, in 10 pages.
Keinzle Argo Taxi International, Taximeter Kienzle Argo 1155 Product Sheet, 2 pages, www.kati.de.
Taximeter (EM-1), Qingdao Turina Electronic Co., Ltd., https://summerlee.en.ec21.com/EM_1_Taximeter--760735_3609479.html, Downloaded Jan. 23, 2023.
Taximeter (OM-1), Qingdao Turina Electronic Co., Ltd., https://summerlee.en.ec21.com/OM_1_Taximeter--760735_3137680.html, Downloaded Jan. 23, 2023.
Taximeter (TM-4), Qingdao Turina Electronic Co. Ltd., https://summerlee.en.ec21.com/TM_4_Taximeter--760735_4461770.html, Downloaded Jan. 23, 2023.
Taximeter Taxi Meter (TM-2); Qingdao Turina Electronic Co., Ltd.; https://summerlee.en.ec21.com/TM_2--760735_7967492.html, Downloaded Jan. 27, 2023.
The Philadelphia Parking Authority—Taxicab and Limousine Regulations; PPA Regs, pp. 1-74, Jul. 29, 2008 (Year: 2008).
"Centrodyne, Silent 610 Electronic Taximeter", https://centrodyne.com/index.php/en/products/taximeters/silent-610, Downloaded Jan. 27, 2023.
"Centrodyne, Silent 620 Electronic Taximeter", http://www.cnetrodyne.com/tax1page4.htm printed May 4, 2011 in 1 page.
"Centrodyne, Smart Features", httQ:/iwww.centrodyne.com/taxli;;age6.htm printed May 4, 2011 in 1 page.
"Current Licensees", NYC Taxi & Limousine Commission, as captured Jul. 19, 2012 in 3 pages.

(56) References Cited

OTHER PUBLICATIONS

"*Lexmark International Inc. v. Static Control Components, Inc.*", U.S. Sixth Circuit No. 03-5400 Decided Oct. 26, 2004.
"Passenger Carriers Questions and Answers", California Public Utilities Commission, as captured Feb. 26, 2011, 4 pages.
"Passenger Information | Taxicab Rate of Fare", NYC Taxi & Limousine Commission, as captured Aug. 4, 2011 in 3 pages.
"Pulsar Technology Systems, Inc., Model 2030, Copyrights 2004", https://www.taxidepot.com/taxiproducts/9tx5n06w6uyz3vrlpi32c7zals5c9b, Downloaded Feb. 1, 2023, 2004.
"Pulsar Technology Systems, Inc., Model 2030R, Copyrights 2004", https://www.taxisource.net/index.php?route=product/product&product_id=50, Downloaded Feb. 1, 2023, 2004.
Arieff, Allison, "All Tomorrow's Taxis", The New York Times Company, Jan. 13, 2011.
Baker, Rosie, "London Cabs Get Digital Screen Network", https://www.marketingweek.com/london-cabs-get-digital-screen-network/, Sep. 2011.
Bryant, Eric D., et al., "A Survey of Anti-Tamper Technologies", Crosstalk The Journal of Defense Software Engineering, Nov. 12-16, 2004.
Cagalj, Mario, et al., "Key agreement in peer-to-peer wireless networks", Proceedings of the IEEE, vol. 94, No. 2, Feb. 2006.
Cassias, et al., "Vehicle Telematics: A Literature Review", Technical Report, Oct. 30, 2007.
Deaton, Jamie Page, "How Taxi Meters Work", HowStuffWorks https://auto.howstuffworks.com/taxi-meter.htm/printable (Accessed Sep. 9, 21).
Deaton, Jamie, "How Taxi Meters Work", <http://auto.howstuffworks.com/taxi-meter.htm> (<http://web.archive.org/web/20110423034037/http://auto.howstuffworks.com/taxi-meter.htm> captured on Apr. 23, 2011 using Wayback Machine) (Year: 2011), 2011.
Deaton, Jamie, "How Taxi Meters Work", Common Fares page <http://auto.howstuffworks.com/taxi-meter2.htm> (<http://web.archive.org/web/20110427093054/http://auto.howstuffworks.com/taxi-meter2.htm> captured on Apr. 27, 2011 using Wayback Machine) (Year: 2011), 2011.
Dillow, Clay, "Nevada is the First State to Pass Driverless Car Legislation, Paving the Way for Autonomous Autos", https://www.popsci.com/cars/article/2011-06/nevada-passes-driverless-car-legislation-paving-way-autonomous-autos/, Downloaded Sep. 7, 21, Jun. 24, 2011.
Dodge, Martin, et al., "The automatic management of drivers and driving spaces", Elsevier Geoforum 38 (2007), 2007, 264-275.
Future Technology Devices Intl, "FTDI Chip, USB-Key Datasheet, Version 1.00", Jul. 17, 2008.
Gehrmann, Christian, et al., "Manual Authentication for Wireless Devices", RSA Laboratories CryptoBytes vol. 7, No. 1 Spring 2004, 2004.
Harris, Lee A., "Taxicab Economics: The Freedome to Contract for a Ride", 1 Geo, J.L. & Pub. Pol'y, 2003, 195-222.
Islam, Md. Tofiqul, "Design and Fabrication of Fare Meter of Taxicab Using Microcontroller", Proceedings of the International Conference on Mechanical Engineering 2005 (ICME) Dec. 28-30, 2005, Dhaka, Bangladesh.
Jantarang, et al., "A Low Cost Real-Time Intelligent Taximeter Sensor", Mahanakorn University of Technology, pp. 4, Bangkok, Thailand, 2002.
Rawley, Evan, "Information, Knowledge, and Asset Ownership in Taxicab Fleets", Columbia Business School Summer Conference, Jun. 2009.

\* cited by examiner

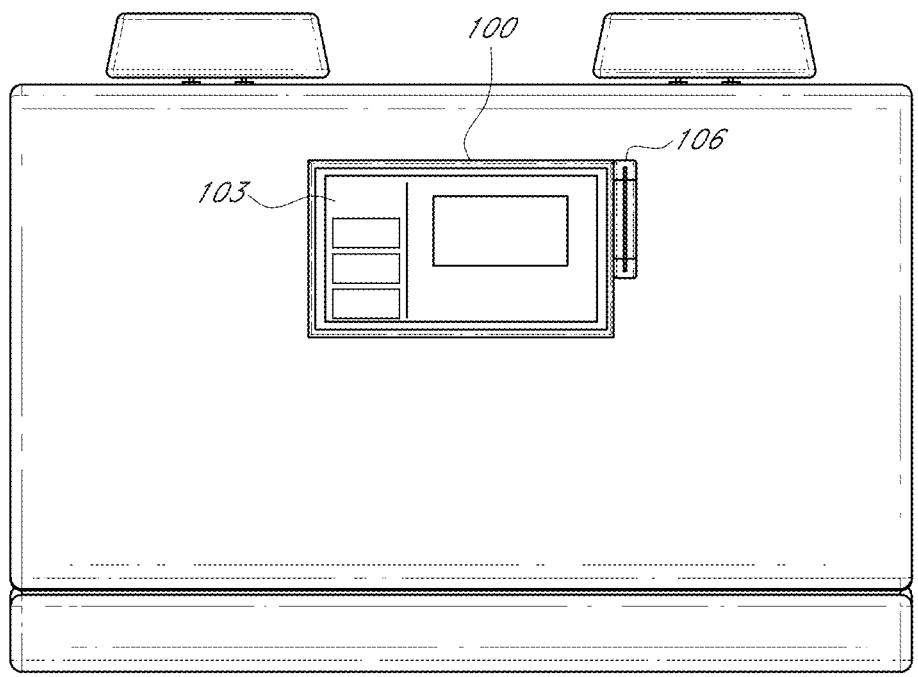
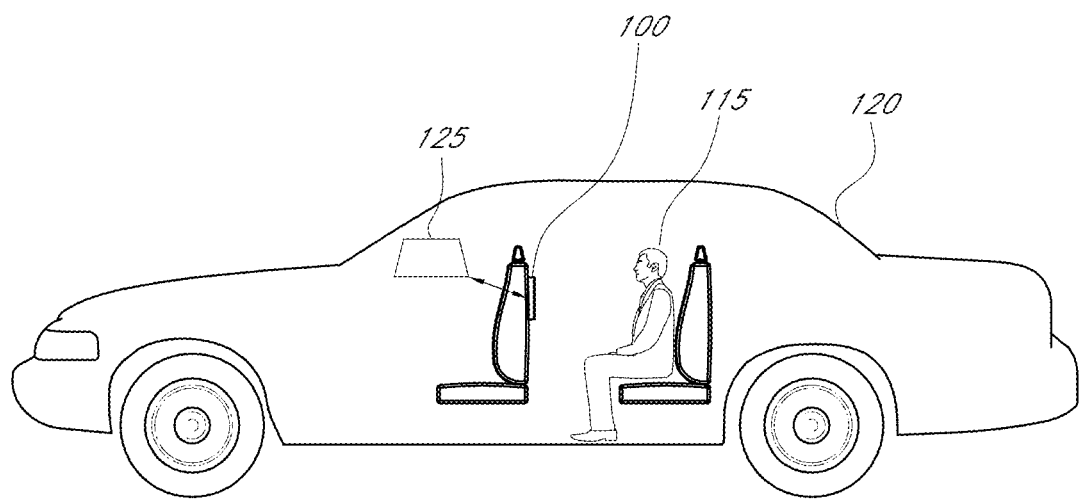
FIG. 1

Business Name*

First Name* | Last Name*

Address 1* | Address 2*

City* | State/Province* | Zip* | Country* — 610

Website*

Pick a Category:* — 615 | Review Link(s) e.g. Yelp, City Search, etc.

Where do you want your Promotion to run?* — 620

Email Address* | Phone Number*

Tell us a little bit about your business. — 630

SUBMIT

FIG. 6

Deal!

Adult entertainment deals are deals from establishments that have age restrictions on who may enter or purchase from the establishment.

You MUST be 18 or 21 years of age with proof of identity and and age on your person when entering an Adult Entertainment establishment. The deal will clearly describe the age requirement prior to purchase.

Are you at least 18 years of age?

| I am older than 18 | I am NOT 18 |

*FIG. 14*

FIG. 26

TRANSACTION AND COMMUNICATION SYSTEM AND METHOD FOR VENDORS AND PROMOTERS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

The present disclosure relates to the field of for-hire vehicles such as taxis, limousines, shuttles, buses or any other vehicle that provides shared transportation or transports one or more passengers between locations of the passengers' choice. The present disclosure also relates to the field of advertising, sales and promotion.

A for-hire vehicle (FHV) generally charges fares for transporting a passenger from one location to another. Some FHVs, such as taxicabs, operate with a meter, while others such as limos and shuttles transport passengers for a pre-trip negotiated rate. FHVs are common in tourist destinations, business traveler destinations (for example, where convention centers are prevalent) or in densely populated urban areas where vehicle ownership is relatively less common or impractical. Areas of high FHV use often offer numerous entertainment options. The entertainment options may include, among other things, shows, plays, concerts, dining, sporting events, or other special events. Travelers, business people and urban dwellers may frequent these entertainment options through the use of a FHV. For example, a business person in town for a convention may wish to dine at a restaurant and may hail a taxi to transport him to the restaurant. Individual service providers, such as taxi drivers, may be consulted for their recommendations regarding entertainment or dining options. Therefore, dining and entertainment venues may desire access to, or contact with, taxi drivers or other service providers in order to increase the likelihood that their goods or services will be recommended.

Many entertainment options are time, location and quantity sensitive; the entertainment options offer a service that is available for a fixed time, at a specific location and only for a fixed number of people. For example, a play may start at 8 PM (fixed time), be performed at the Downtown Theater (specific location) and have 200 seats available (fixed number of people). In some cases, the number of tickets sold for the event is less than the seats available. For example, only 150 tickets may have been sold for the play in the 200 seat venue. As the 8 PM start time approaches, it may become clear to the vendor operating the play at the venue that the remaining 50 seats will not be sold. Once the play starts, any empty seat in the venue is a lost revenue opportunity. Restaurant owners face a similar lost revenue opportunity, even though the restaurant option may not have strictly fixed time. Empty tables at a restaurant, when there is adequate staff to serve the tables, is also a lost revenue opportunity.

BRIEF DESCRIPTION OF THE DRAWINGS

FIG. 1 shows one illustrative embodiment of a deal presenter computing system in operation within for-hire vehicle.

FIG. 6 is an illustrative screenshot showing one embodiment of a vendor registration user interface.

FIG. 14 is an illustrative screenshot showing one embodiment of an age verification user interface.

FIG. 26 is a screenshot showing an embodiment of a promoter-registration user interface.

DESCRIPTION OF EMBODIMENTS

Figure 2:
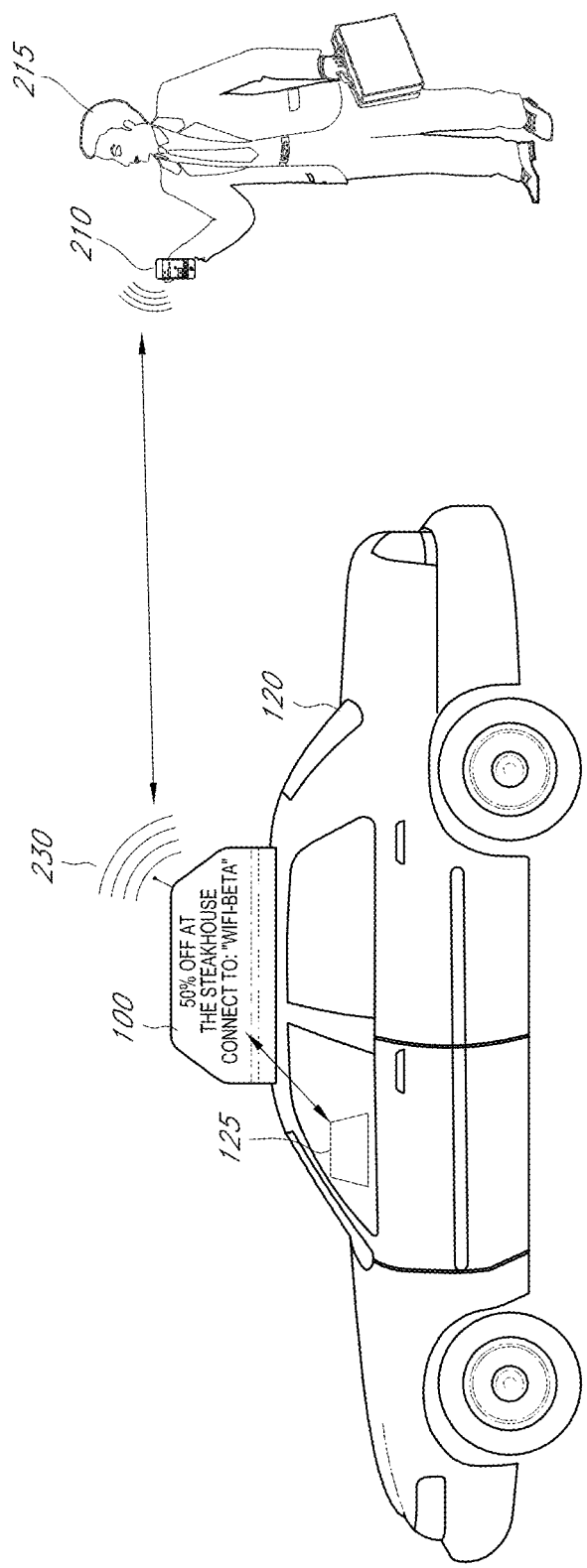
FIG. 2 shows an embodiment of a deal presenter computing system affixed to the roof of for-hire vehicle and in communication with a consumer computing device.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order for vendors offering entertainment options to maximize their revenue opportunity when dealing with a time, location and quantity sensitive asset, an opportunity arises to advertise, for a short period of time, the entertainment option at a discount. Furthermore, passengers of FHVs are a good target demographic for vendors; passengers are often travelers from out of town and may be looking for interesting and inexpensive entertainment options. The present disclosure recognizes this opportunity and that it is advantageous for vendors to offer discounted rates for their entertainment options to passengers of FHVs as they may be likely to purchase the offer at the discounted rate. Further, additional value may advantageously be added by including the fare to the venue in the discounted rate. It may also be advantageous for drivers of FHVs, or other individuals or entities, to be incentivized to promote offers to their passengers, customers, or whomever is within their sphere of contact. Furthermore, vendors may have an interest in receiving information related to the promotional activities of such individuals or entities. For example, a vendor may wish to provide some sort of benefit or promotional material to a subset of FHV drivers based on transactional or purchase data associated with the drivers' promotional activities.

Accordingly, embodiments of the present disclosure describe systems and methods for integrating product and service discounting with requests for the reservation and dispatch of for-hire vehicles. In one embodiment, a deal manager computer system (or "deal manager") manages deals offered by vendors and receives promotional offer (or "deal") data from a vendor computer system. The vendor computer system may advantageously permit the entry of the promotional offer data though the use of a web page or other user interface. Based on the received promotional offer information, the deal manager computer system generates a deal, or offer, which is then communicated to a deal presenter computer system that displays the deal. Once a consumer purchases the deal, the deal manager computer system receives a notification of acceptance of the deal, or promotional offer. The acceptance may include location data and payment data. The deal manager uses the location data to reserve and dispatch an FHV to pick up the person who accepted the deal, or to modify the trip information for a current passenger of an FHV. The deal manager computer system uses the payment information to process payment for the deal. In addition, the deal manager computer system may also communicate a confirmation message to the deal presenter computer system and may communicate a confirmation message to the vendor computer system. The confirmation message to the deal presentation computer system may include a voucher number, code, or scanable image that may be used to validate the deal with the vendor and the driver of the dispatched for-hire vehicle, if necessary. The confirmation message may also include pick-up location information informing the consumer as to where a for-hire vehicle may pick them up. Once the consumer arrives at the venue of the vendor who offered the deal, the vendor may validate the purchased deal In another embodiment, a deal presenter computer system is installed in a for-hire vehicle. The deal presenter computer system comprises a display that is affixed to the for-hire vehicle and a point-of-sale terminal for accepting payment instruments such as credit cards. The deal presenter computer system receives promotional offers (or "deals") from a deal manager computer system that manages deals for one or more vendors. The received deals are shown on the display. A consumer (or "user") may select one or more of the received deals and the deal presenter computer system may accept input indicating an acceptance of the deal. The deal presenter computer system may also accept payment information through the point-of-sale terminal. The promotional offer computer system may then transmit the acceptance and payment information to the deal manager computer system. The deal manager computer system may then process the received payment information and process a notification for the for-hire vehicle. The notification may contain location information associated with the vendor so that the for-hire vehicle computer system (or "trip computer") may update the trip information associated with the passenger's current trip and route the for-hire-vehicle to the vendor location.

In another embodiment, transactional data relating to the promotional activities of one or more drivers of FHVs (meaning, promoters) is maintained for various purposes. For example, such information may provide a mechanism for determining when and how to compensate promoters for promotional activities. Furthermore, in an embodiment, a system provides a means for vendors to receive transactional data and convey benefits and or promotional information to one or more promoters in response to receiving such data.

FIGS. 1 and 2 show two illustrative embodiments of deal presenter computer systems ("deal presenter"). The discussion of FIGS. 1 and 2 is meant to provide the reader with an overview of the systems and methods described herein and should not be construed as limiting in any way. The functionality described with respect to FIGS. 1 and 2, and throughout this application, may be embodied in various ways and still achieve the same desired result.

FIG. 1 illustrates one embodiment of a deal presenter 100 in operation within for-hire vehicle 120. In the illustrative embodiment of FIG. 1, deal presenter 100 may be connected to the back of the front seat of FHV 120. Deal presenter 100 may receive a plurality of advertisements, or deals, for special rates that may be offered by a vendor. For example, deal presenter 100 may receive a deal for providing a special rate, such as $20 off, for a variety show, or it may provide a 30% discount at an upscale restaurant at a particular time. Once the deal is received, deal presenter 100 advantageously displays the deal on display 103 so that passenger 115 may view it. The deal may include information related to the offer that may entice passenger 100 to accept the deal. For example, if the deal is for a variety show, favorable reviews of the show may be included in the deal information. For events with fixed seating, the deal may include seating location information, or may include the option to select from the seats available at the deal price. The deal may also include information related to the regular price of an event so that passenger 115 may know the quality of the current deal being offered to him. For example, if the deal is for one ticket to a show for $50, display 103 may provide information to passenger 115 that the usual price for the show is $100. Various other types of information may be shown on display 103 that may entice or persuade passenger 115 to accept the deal.

Display 103 may be, in some embodiments, a touchscreen that allows for passenger 115 to make input choices by touching display 103. For example, display 103 may generate graphical buttons for viewing another deal, accepting a deal, or inputting personal information upon accepting a deal. In some embodiments, instead of a touchscreen, display 103 may have a separate input device, such as a keyboard, attached to it so that deal presenter 100 may accept user input choices from passenger 115. Examples of the various user interfaces that may be shown on display 103 will be discussed below in greater detail with respect to FIGS. 13-17.

When passenger 115 wishes to accept a deal, the passenger may provide input to deal presenter 100 indicating acceptance of the deal. For example, display 103 may be a touchscreen, that generates an "accept" button that passenger 115 touches to accept the deal. By way of further example, deal presenter 100 may comprise an input button housed on the external surface of the deal presenter unit 100 thereby allowing passenger 115 to accept a deal by depressing the button. Once the deal has been accepted, deal presenter 100 will process the deal acceptance and request payment from passenger 115. Payment may be made, for example, with a credit card. The embodiment of FIG. 1 illustratively shows one method of accepting payment, that is point-of-sale ("POS") terminal 106. POS terminal 106 may be connected to deal presenter 100 and may accept a swipe from a credit card, debit card, gift card, or other form of payment as input. Deal presenter 100 may then process the payment information as described further with respect to FIG. 5 below.

In some embodiments, transportation to the venue providing the deal is included in the purchase price. That is, once passenger 115 accepts the deal and pays the purchase price, FHV 120 will change the passenger's 115 destination from her original destination to the venue offering the deal. In one embodiment, passenger 115 may be en route to a different location and once she accepts the deal, deal presenter 100 may communicate with trip computer system 125 to change the trip information to indicate that passenger 115 will now be traveling to the venue offering the deal. For example, passenger 115 may be traveling in FHV 120 en route to her hotel. Deal presenter 100 may then display a deal to go to a show. Passenger 115 accepts the deal, which includes transportation to the show. Once passenger 115 accepts and pays for the deal, deal presenter 100 may then communicate with trip computer system 125 to update the destination information and change it from the passenger's hotel, to the location of the show. The FHV would then change the passenger's desired destination the passenger from the hotel to the show. In one embodiment, deal presenter 100 is directly connected to trip computer 125 and updates to the passenger's trip occur through communications between deal presenter 100 and trip computer 125. In other embodiments, deal presenter 100 may send notification of the deal acceptance to deal manager 300 (discussed in FIG. 3A) which may then send a message to FHV 120 to update the passenger's trip information in trip computer system 125. Deal presenter 100 may, as discussed in greater detail below, adjust the offer price of the deal so that the current fare accumulated by passenger 115 is included within the deal.

Turning now to FIG. 2, another embodiment of deal presenter 100 is shown wherein deal presenter 100 is affixed to the roof of FHV 120 ("FHV-top display"). The FHV-top-display may be, for example, a programmable LCD screen that may advantageously display one or more deals on a rotating basis. For example, if deal presenter 100 receives two deals, a first offering 50% off at a steakhouse, and a second offering show tickets for $20, deal presenter may display the steakhouse offer for sixty seconds, display the show offer for sixty seconds and then display the steakhouse offer again. Through the use of the FHV-top-display, deal presenter may advantageously attract consumer 215 who may be walking on the street. Advantageously, deal presenter 100 may provide network connection point 230, which may be a wireless access point, or mobile hot-spot, so that consumer 215 may accept a deal using a Wi-Fi enabled mobile device 210, for example. In one embodiment, deal presenter 100 may display a deal along with connection information that consumer 215 may use to connect mobile device 210 to deal presenter 100 so that consumer 215 may accept the deal. For example, in the illustrative embodiment of FIG. 2, consumer 215 may connect to deal presenter 100 through the "Wifi-Beta" wifi network, Once connected, mobile device 210 may include a graphical display that may show user interfaces comprising deals and input means that allows consumer 215 to accept deals. The types of user interfaces shown on consumer computing device 215 may be similar to the user interfaces described with respect to FIGS. 11-17.

Once consumer 215 accepts the deal displayed by deal presenter 100, consumer 215 may pay for the deal with mobile device 210. For example, consumer 215 may enter their credit card information using the input devices and displays that are part of mobile device 210. In some embodiments, an acceptance message may then be sent from mobile device 210 to network connection point 230 of deal presenter 100. Upon receipt, deal presenter 100 may, as described in greater detail below, send an acceptance message to deal manager 300 (see FIG. 5). Deal manager 300 may manage payment processing associated with the deal and may interface with reservation and dispatch computing system 350 so that transportation for consumer may be arranged, for example through making a for-hire vehicle request on behalf of the consumer. (In one embodiment, deal manager 300 may comprise modules that handle the reservation and dispatch of FHVs as shown in FIG. 3B). In some embodiments, deal presenter 100 may be connected to trip computer 125, and once deal presenter 100 receives notification that a deal has been accepted, it may send a dispatch message to trip computer 125 so that the FHV may be directly dispatched to pick up consumer 215 and transport him to the venue offering the deal.

In one embodiment, consumer 215 may install a dedicated deal application on mobile device 210. The deal application may be configured to receive deal offers and display them on screen so that consumer 215 may accept them, thereby making consumer computing system 210 an embodiment of deal presenter 100. The deal application may advantageously allow for consumer 215 to browse currently available deals, and may permit consumer 215 to accept a deal without being in the presence of FHV 120. Once consumer 215 accepts the deal through the application, mobile device 210 (acting as a deal presenter 100) may then communicate the acceptance to deal manager 300. Deal manager 300 may then reserve an FHV to transport the consumer 215 to venue offering the deal. In some embodiments, deal manager 300 may be in communication with reservation and dispatch computing system 350. In other embodiments, deal manager 300 may comprise modules that handle the reservation and dispatch of for-hire vehicles (as shown with respect to FIG. 3B). In one embodiment, deal presenter 100 may leverage the location features of consumer computing device to communicate the location of consumer 215 when reserving the FHV. For example, if consumer computing system 210 is a mobile phone, deal presenter 100 may use the GPS chip of the mobile phone to communicate geospatial location information to the FHV reservation computing system.

Figure 3A:
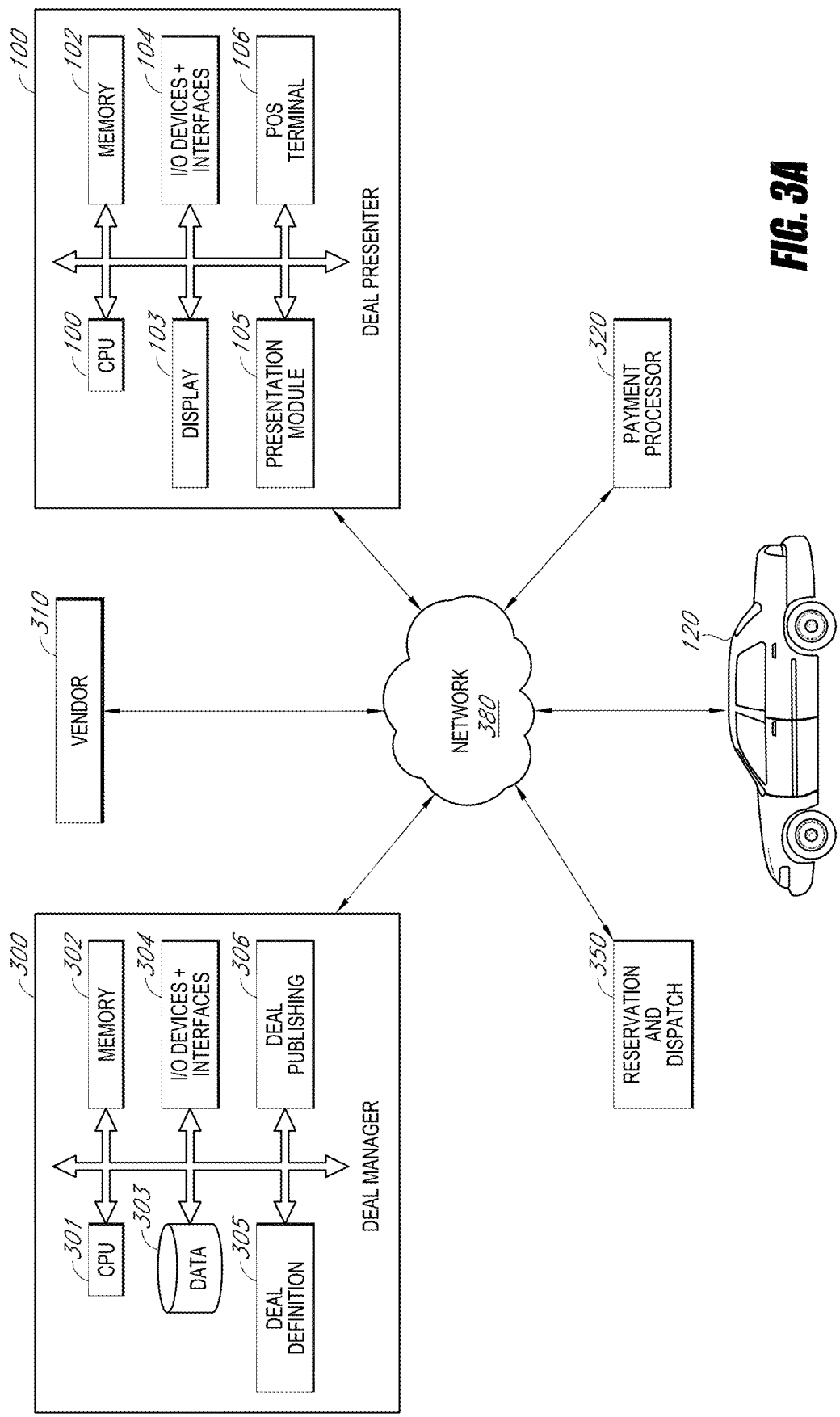
FIG. 3A is a block diagram illustrative of one embodiment of a deal manager computing system in communication over a network with a deal presenter computing system, a vendor computing system, a payment processor computing system, a reservation and dispatch computing system and a for-hire vehicle which may comprise one or more computing systems controlling its operation.
Figure 3B:
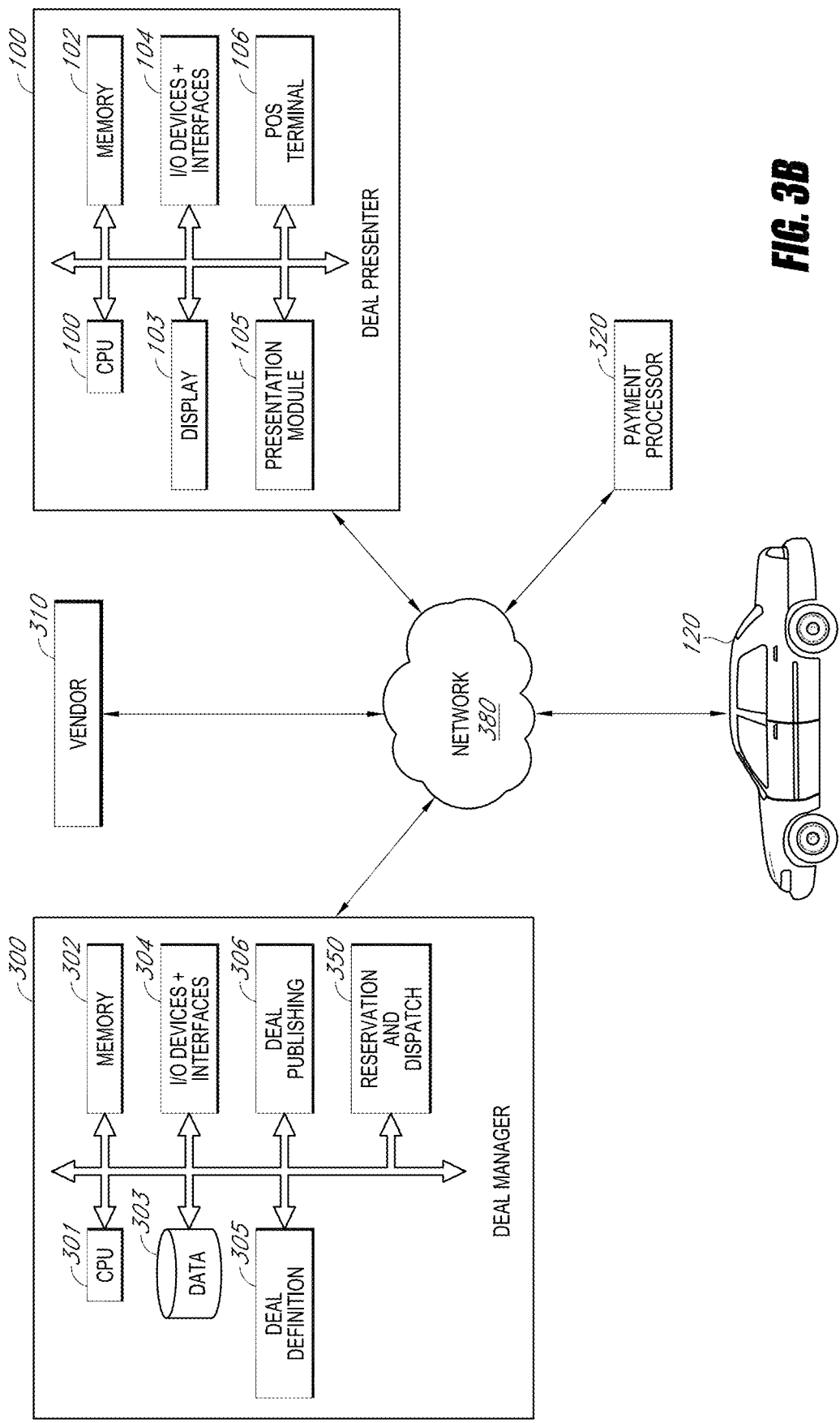
FIG. 3B is a block diagram illustrative of one embodiment of a deal manager computing system in communication over a network with a deal presenter computing system, a vendor computing system, a payment processor computing system, and a for-hire vehicle which may comprise one or more computing systems controlling its operation. The deal manager computing system of FIG. 3B comprises a reservation and dispatch module.
Figure 5:
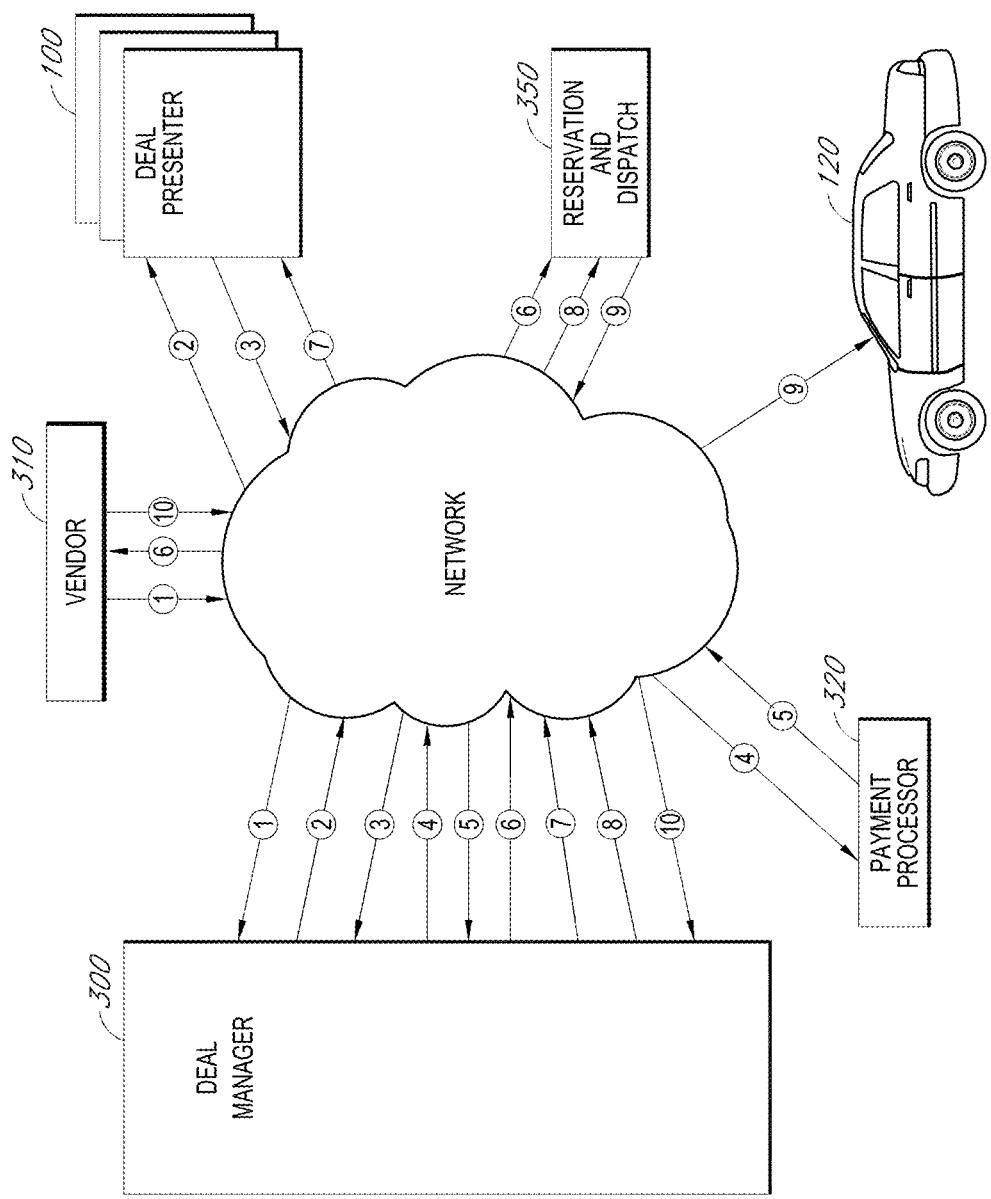
FIG. 5 is a block diagram illustrating the temporal flow of data for the lifecycle of a deal through deal definition through deal confirmation between a deal presenter computing system, a vendor computing system, a payment processor computing system, a reservation and dispatch computing system and a for-hire vehicle which may comprise one or more computing systems controlling its operation.

FIG. 3A is a block diagram illustrative of one embodiment of a deal manager computer system ("deal manager") 300 in communication over network 380 with a deal presenter computer system ("deal presenter") 100, a vendor computer system ("vendor system") 310, a payment processor 320, a reservation and dispatch computer system ("reservation and dispatch") 350 and for-hire vehicle 120 ("FHV"), which may comprise one or more computing systems controlling its operation. While FIG. 3A may illustrate deal manager 300, deal presenter 100, vendor system 310, payment processor 320, reservation and dispatch 350 and FHV 120 as separate computing systems or modules, the functionality provided for in the systems and modules of FIG. 3A may be combined into fewer components and modules or further separated into additional components and modules. For example, while deal manager 300 and reservation and dispatch 350 are shown as separate computing systems, their respective functionality may be embodied as modules within the same computing system, as shown in FIG. 3B. By way of further example, the functionality of deal presenter 100 may be split among more than one computing system as is shown in the illustrative embodiment of FIG. 3A. In addition, while the blocks of FIG. 3A are described in the singular for ease of reference, embodiments may include more than one of each block. For example, in one embodiment, there may be a plurality of deal presenters 100 (as shown in FIG. 5) or there may be a plurality of FHVs 120.

In one embodiment, deal manager 300 is a computing system responsible for managing deals. Deal manager 300 advantageously provides interfaces for vendors to define deals and may accept deal definitions created by vendors. Deal manager 300 also handles the publication of deals to deal presenter 100 and may monitor the currently defined deals for publication. For example, deals may be time restricted, that is, they may only be offered during a fixed period of time defined by a start time and an end time. For example, a deal may run on Oct. 1, 2011 from 5 PM (start time) to 8 PM (end time). Deal manager 300 may execute a process that checks the currently defined deals in the system and publishes them to deal presenter 100 at the start time of the deal. The deal manager advantageously is in periodic communication with the vendor system to confirm that the deals listed are still current, and when a deal is sold the vendor system is updated. The frequency of this periodic communication will depend on the type of deal. For example if seats to a show are being offered then the communication with the vendor system needs to be sufficient to prevent the sale of two identical seats. It is contemplated that this communication can be accomplished automatically without the need for human intervention. The Deal manager 300 may also handle the acceptance of the deal. Once deal manager 300 receives notification from deal presenter 100 that a deal has been accepted, deal manager 300 may interface with reservation and dispatch 350 to request a FHV, and it may also interface with payment processor 320 to process payment. Deal manager 300 may also maintain historical data of past deal campaigns for reporting purposes to vendor system 310.

In one embodiment, deal manager 300, is a computing system that is IBM, MACINTOSH® or LINUX®/Unix compatible. Deal manager 300 may, in some embodiments, include one or more central processing units ("CPU") 301, which may include one or more conventional or proprietary microprocessors. Deal manager 300 may further include memory 302, such as random access memory ("RAM") for temporary storage of information and read only memory ("ROM") for permanent storage of information, and data store 303, such as a hard drive, diskette, or optical media storage device. In certain embodiments, data store 303 stores data needed for managing and maintaining deals. In other embodiments, data store 303 might store historical deal information. Embodiments of data store 303 may store data in databases, flat files, spreadsheets, or any other data structure known in the art. Typically, the modules of deal manager 300 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, deal manager 300 leverages computing and storage services available over the Internet (cloud computing).

Deal manager 300 is generally controlled and coordinated by operating system software, such as the WINDOWS® 95, 98, NT, 2000, XP, VISTA®, LINUX®, SunOS, SOLARIS®, PalmOS, BLACKBERRY® OS, or other compatible operating systems. In Macintosh systems, the operating system may be any available operating system, such as MAC OS X. In another embodiment, deal manager may be controlled by a proprietary operating system, that is one that had been custom made for the purposes of embodying the systems and methods described herein. Conventional operating systems control and schedule computer processes for execution, perform memory management, provide file system, networking, and I/O services, and may provide a user interface, such as a graphical user interface ("GUI") for display, among other things.

Deal manager 300 may also include one or more commonly available I/O devices and interfaces 304, such as for example, a printer, buttons, a keyboard, a LED display, a monitor, a touchpad, a USB port, a RS 232 port and the like. In one embodiment, I/O devices and interfaces 304 include one or more display devices, such as a monitor, that allows the visual presentation of data, such as fare and operation data, to a user. In the embodiment of FIG. 3A, I/O devices and interfaces 304 provide a communication interface to various external devices. For example, in the illustrative embodiment of FIG. 3A deal manager 300 is in communication with network 380, such as any combination of one or more LANs, WANs, or the Internet, for example, via a wired, wireless, or combination of wired and wireless, connections via a network interface of I/O devices and interfaces 304. The communications interface may also include, for example, ports for sending and receiving data such as a USB port or an RS 232 port.

Deal manager 300 may also include several application modules that may be executed by CPU 301. The software code of the modules may be stored on a tangible computer-readable medium such as for example, RAM or ROM. More particularly, the application modules may include deal definition module 305 and deal publishing module 306.

In general, the word module, as used herein, refers to logic embodied in hardware or firmware, or to a collection of software instructions stored on a non-transitory and/or tangible computer-readable storage, possibly having entry and exit points, written in a programming language, such as, for example, C, C++, C #, or JAVA®. A software module may be compiled and linked into an executable program, installed in a dynamic link library, or may be written in an interpreted programming language such as, for example, BASIC, PERL®, or Python. It will be appreciated that software modules may be callable from other modules or from themselves, and/or may be invoked in response to detected events or interrupts. Software modules may be stored in any type of computer-readable storage, such as a memory device (for example, random access, flash memory, and the like), an optical medium (for example, a CD, DVD, BluRay, and the like), firmware (for example, an EPROM), or any other storage medium. The software modules may be configured for execution by one or more CPUs in order to cause computing systems described herein, such as deal presenter 100 and deal manager 300, to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Deal manager 300 may include, in some embodiments, deal definition module 305. Deal definition module 305 may comprise code executed by CPU 301 that is responsible for the definition of deals. For example, deal definition module 305 may generate user interfaces, such as the illustrative user interfaces of FIGS. 6-10, that may be used by a vendor to define a deal. Deal definition module 305 may also handle the processing of deals received by vendor systems 310 and store data associated with the deals in data store 303. Deal definition module 305 may also retrieve deal related data and populate it in the user interface so that vendor may modify deal information. In some embodiments, deal definition module 305 may be programmed with standard options or standard deal parameters that may be used by vendors to facilitate deal definition or provide a template for vendors to define a deal. For example, deal definition module 305 may maintain a list of presentation device types, such as, in-vehicle display, for-hire vehicle display or mobile application so that a vendor may select the presentation devices on which the vendor's defined deal will be published.

In some embodiments, deals may be defined as part of an advertising campaign, that is, a vendor may define a series of deals it may offer, or standard deals it may offer on a regular basis, that are related to the same set of condition parameters triggering the deal offer. For example, if a vendor offers a show in a venue that seats 200 people, the vendor may define a standard deal offering tickets at 50% off if less than 150 seats have been sold by thirty minutes before the show's scheduled start time. Alternatively, a steakhouse may define an all you can eat campaign, that offers a deal for an all you can eat buffet at a special price on Tuesdays. Deal definition module 305 may provide user interfaces or other means for allowing vendors to define a deal campaign. Deal definition module 305 may also comprise code for execution that stores and retrieves data related to vendor campaign.

Figure 10:
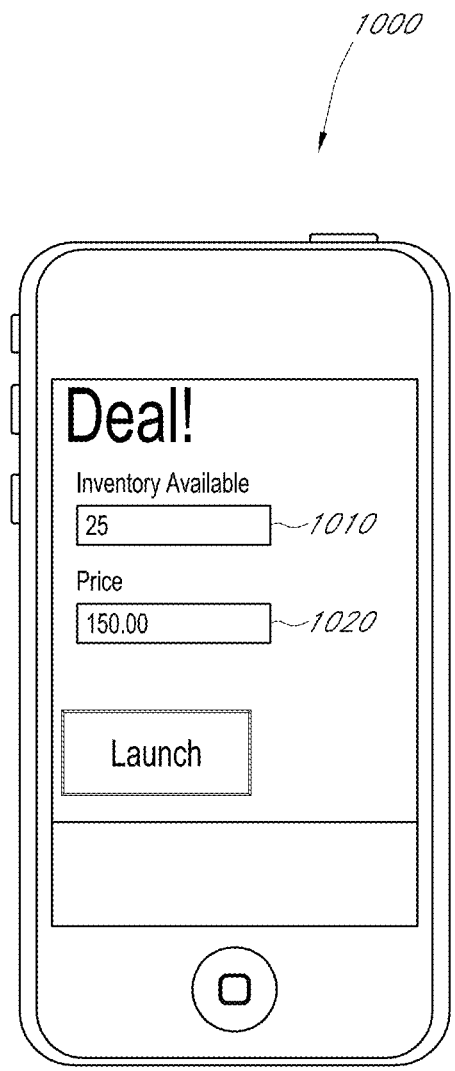
FIG. 10 is an illustrative screenshot showing one embodiment of a user interface for updating a predefined deal using a mobile application.

In one embodiment, vendor system 310 may launch a predefined deal by sending a message to deal manager 300, or more specifically to deal definition module 305, to launch the particular deal. For example, if a vendor predefines a standard deal offering an all you can eat buffet for $10, the vendor system 310 may launch the predefined deal by sending a command to deal manager 300 that the deal should be executed immediately. Vendor system 310 may command the deal manager 300 through a web interface provided by deal manager 300. In other embodiments, vendor system 310 may have installed on it a deal queue application that lists the vendor's predefined deals and may contain options for launching the deal. The application may be a mobile application as shown in FIG. 10 for example, or in other embodiments, may be an application executed on a desktop, laptop, tablet, or other general purpose computing device. In some embodiments, the vendor may define its deal to run for a specific time interval. For example, an all you can eat buffet for $10 may be offered for 45 minutes once it launches. In another embodiment, the deal queue application may provide commands for starting and stopping a deal thereby allowing the vendor flexibility to control deal presentation based on the vendor's needs. For example, a vendor offering an all you can eat buffet may be not be servicing customers at maximum capacity and may therefore wish to offer a 40% discount on the buffet. The vendor may launch the deal queue application and select the predefined deal offering the 40% discount. Using the deal queue application, the vendor system 310 may send a command to deal manager 300 to begin publishing the deal. The deal may result in an increase in business that exceeds the capacity of the vendor. The vendor system may then re-launch the deal queue application, select the currently running deal, and issue a command to deal manager 300 to stop offering the deal.

In another embodiments, deal definition module 305 advantageously allows vendor systems to define deal triggers. A deal trigger is a predefined deal with deal offer conditions that must be satisfied before the deal is to be published. The deal offer conditions may relate to the time the deal is offered, the location of where the deal is offered, the current inventory of the vendor, a combination of conditions, or other deal conditions that may be defined by the vendor. For example, a vendor may wish to fill most of its seats for a show prior to show time. The vendor may create a predefined deal that offers the show tickets at 50% off. The vendor may create deal offer conditions associated with predefined deal that will trigger the deal once the conditions are satisfied. The deal conditions may be, for example, "(1) if there are less than 100 seats sold, (2) at 30 minutes before show time, (3) offer the deal for the next 40 minutes." Once interest is shown in particular seats for example by making the appropriate selection through the deal presenter 100 then the seats are held for a limited time (maybe 5 to 10 minutes) to give the customer the opportunity to complete the payment process. The deal conditions may also be location based. For example, hotels may only wish to present deals to passengers being picked up at the airport, train station, or bus station. In such instances, the vendor may associate a deal condition with their predefined deal indicating the deal should only be presented on deal presenters that are at the airport, train station or bus station. The vendor may create location based deal offer conditions using, for example, a map interface such as the map interface shown in FIG. 9.

In some embodiments, deal manager 300 may comprise deal publishing module 306. Deal publishing module 306 advantageously comprises code that when executed handles the publication of deals and processing of deals once published. For example, deal publishing module 306 may execute a looped process that checks the contents of data store 303 to determine if any defined deals based on time should be published, or if any deal conditions related to deal triggers have been satisfied. Deal publishing module 306 may check the current time and then compare that to the publishing time of a particular deal. If deal publishing module 306 determines a deal should be published, it may then send a message containing the deal, or a "deal packet" out over network 380 that may be consumed by deal presenter 100. Deal packets may contain data related to the deal, such as price of the deal, details of the deal (time, location and/or event information about the deal), and display and formatting information about the deal (such as, for example, HTML code defining how the deal should be displayed on deal presenter 100). The deal packet may also contain code for execution upon passenger 115 or consumer 215 accepting the deal. The code may contain, for example, network information defining where the data should be sent.

In some embodiments, deal publishing module 306 may take a "snapshot" of the current passengers riding in FHVs. The snapshot may include information and data describing the passengers at a particular instant in time. For example, the snapshot may include information about where passengers where picked up or where they may be dropped off and identification information identifying the deal presenter 100 that is affixed to the FHV in which the passengers are traveling. The deal publishing module 306 may then compare the information and data from the snapshot to potential customer attributes defined by a vendor which may define to whom the vendor would like to present deals. If the information and data from the snapshot indicates that some passengers may be interested in the deal, deal publishing module 306 may publish a deal to those passengers. For example, suppose a vendor wants to attract passengers who are staying at luxury hotel. The vendor may set up a customer attribute that indicates they would like to present deals to those passengers who were picked up at the luxury hotel. When there is a need to offer deals, deal publishing module 306 may take a snapshot of the current passengers of FHVs in a location close to the venue of the vendor. If any of those passengers were picked up from the luxury hotel, deal publishing module 306 may publish a deal to those passengers.

In addition, deal publishing module 306 advantageously processes accepted deals. As described in greater detail below, deal publishing module 306 generally processes payment, generates FHV fulfillments (which may include reserving a FHV or communicated updated trip information to a FHV), generates voucher information, sends confirmations, and then waits for a message indicating a voucher has been redeemed. The processing involved upon deal acceptance is discussed in greater detail with respect to FIG. 19.

Returning to FIG. 3A, deal presenter 100 may be computing system that in responsible for receiving deals, displaying deals and managing the consumer/passenger end of a deal transaction. For example, deal presenter 100 may receive a deal published by deal manager 300. Once received, deal presenter 100 may display the deal so that passenger 115 or consumer 215 may view it. If consumer 215 (or passenger 115) decides to purchase the deal, deal presenter 100 may accept an input criteria indicating deal acceptance and may also collect data such as consumer 215's name, address, current location and payment instrument (such as a credit card) information. Deal presenter 100 may then transmit that information to deal manager 300. Deal presenter 100 may also receive a confirmation message and display the message along with voucher information for consumer 215.

In one embodiment, deal presenter 100, is a computing system that is IBM, MACINTOSH® or LINUX®/Unix compatible. Deal manager 300 may, in some embodiments, include one or more central processing units ("CPU") 101, which may include one or more conventional or proprietary microprocessors. deal presenter 100 may further include memory 102, such as random access memory ("RAM") temporary storage of information and read only memory ("ROM") for permanent storage of information. Typically, the modules of deal manager 300 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, deal manager 300 leverages computing and storage services available over the Internet (cloud computing).

As described above, deal presenter 100 may be a dedicated computing system specifically designed to display deals. For example, deal presenter 100 may be a custom in-vehicle display, or it may be computing system that is part of a FHV-top display. In other embodiments, deal presenter 100 may be an application module that executes on a general-purpose computer such as a mobile phone, tablet computing device, laptop computer or desktop computer. In other embodiments, deal presenter 100 may be a module that executes with another application such as a web browser.

Deal presenter 100 is generally controlled and coordinated by operating system software, such as the WINDOWS® 95, 98, NT, 2000, XP, Vista, LINUX® SunOS, Solaris, PalmOS, BLACKBERRY® OS, iOS, or other compatible operating systems. In MACINTOSH® systems, the operating system may be any available operating system, such as MAC OS X. In another embodiment, deal manager may be controlled by a proprietary operating system, that is one that had been custom made for the purposes of embodying the systems and methods described herein. Conventional operating systems control and schedule computer processes for execution, perform memory management, provide file system, networking, and I/O services, and may provide a user interface, such as a graphical user interface ("GUI") for display, among other things.

Deal presenter 100 may also include one or more commonly available I/O devices and interfaces 104, such as for example, a printer, buttons, a keyboard, a monitor, a touchpad, a USB port, a RS 232 port and the like. In the embodiment of FIG. 3A, I/O devices and interfaces 104 provide a communication interface to various external devices. For example, in the illustrative embodiment of FIG. 3A deal presenter 100 is in communication with network 380, such as any combination of one or more LANs, WANs, or the Internet, for example, via a wired, wireless, or combination of wired and wireless, connections via a network interface of I/O devices and interfaces 104. The communications interface may also include, for example, ports for sending and receiving data such as a USB port or an RS 232 port.

Deal presenter 100 may also include several application modules that may be executed by CPU 301. The software code of the modules may be stored on a tangible computer-readable medium such as for example, RAM or ROM. More particularly, the application modules may include presentation module 105 and POS terminal 106.

In one embodiment, presentation module 105 may include code that determines whether deals should be displayed and may also contain code for generating user interfaces that will be shown on display 103. In some embodiments, the decision logic that determines whether a deal should be displayed may take into account the current time, the current location of deal presenter 100, the current fare accumulated by passenger 115, and demographic information about passenger 115 or consumer 215. Presentation module 105 may maintain in memory 102 a data structure (the "monitor queue") that stores all published deals it receives and may periodically review the deals in the monitor queue to determine if it should display the deal. The manner in which the monitor queue and the presentation module 105 operate to determine if a deal should be presented is explained in connection with FIG. 21.

In some embodiments, deal presenter 100 may be connected to or include a GPS receiver. The GPS receiver may, for example, be an external GPS receiver that provides GPS coordinates to deal presenter 100 via I/O devices and interfaces 104. In another embodiment, deal presenter may comprise an on board GPS receiver that communicates with the modules and other components of deal presenter 100. In some embodiments, presentation module 105 may correlate received GPS coordinates with known points of interest for the purpose of determining whether to display a deal. For example, presentation module 105 may contain logic for correlating a GPS coordinate with the airport or a particular high-end hotel.

In one embodiment, deal presenter 100 may include POS terminal 106. POS terminal 106 may include hardware and software capable of accepting a payment instrument, such as credit card, debit card or gift card. In some embodiments POS terminal 106 may be a "card swipe" device, for example, a device that reads the payment instrument when a user runs the magnetic stripe of the payment instrument through a grove of POS terminal 106. In another embodiment, POS terminal may include a keypad where a user may input a payment instrument account number. Many commercially available POS terminals exist and such POS terminals may be connected to deal presenter 100 by any means known in the art for connecting POS terminals to computing systems, such as for example, USB.

Turning back to FIG. 3A, reservation and dispatch 350 may be a computing system that is responsible for the reservation and dispatch of FHVs. In one embodiment, reservation and dispatch 350 receives messages from deal manager 300 to request a FHV. The reservation message may contain, for example, the time a FHV should be dispatched, the location where the consumer is to be picked up, and a fixed fare amount for travel. In some embodiments, the FHV should be dispatched immediately, while in other embodiments, the request may be for some time in the future. Once a request message is received, and the time to dispatch a FHV has occurred, reservation and dispatch 350 may send a dispatch message to FHV 120 so that consumer 215 may be picked up at their current location, or a their reserved location, which ever is appropriate for the accepted deal.

In some embodiments, FHV 120 may include dispatch module 125 which has been configured to handle receiving dispatch messages. Dispatch module 125 may be, in some embodiments, a dedicated dispatch computing system. In other embodiments, it may be an application module running on a general purpose computer such as, for example, a mobile phone, tablet, laptop, or other general purpose computing device suitable for in-vehicle use. FHV 120 may also contain a meter, that is, a device used for calculating and reporting fares. In some embodiments, the meter of FHV 120 is advantageously connected to deal presenter 100 to facilitate the accurate calculation of deals based on the current fare accumulated by passenger 115. FHV 120 may also contain a POS terminal for accepting credit card payments for trip fares. The POS terminal may also be connected to deal presenter 100 so that passenger 115 may use the POS terminal to pay for deals in addition to paying for trip fares.

Vendor system 310 may be a computing system that is owned and operated by a vendor that is offering a deal. Vendor system 310 advantageously includes a web browser allowing vendors to register their business (for example, using the illustrative user interface of FIG. 6), or to define deals (for example, using the illustrative user interfaces of FIGS. 7-9). Vendor system 310 may, in some embodiments, be a mobile device, tablet, laptop of desktop. In addition to a web browser facilitating deal definition, vendor system 310 may also contain a dedicated application that is configured to execute on vendor 310 and allow for deal definition using user interface similar to show in FIGS. 6-10.

In some embodiments, vendor system 310 may also include a validation module. The validation module advantageously handled voucher redemption. The validation module may interface with a peripheral device such as UPC code or QR code scanner. In some embodiments, vendor system 310 may be a mobile device, such as a cell phone, that may be equipped with a QR code reader. In such embodiments, the validation module may interface with the QR code reader to receive voucher data from the QR code. In other embodiments, the validation module may interface with a keyboard. A user of vendor system 310 may enter in a voucher number, or serial number, for the voucher using the keyboard in order to redeem the voucher. The keyboard may, in some embodiments, be a virtual keyboard displayed on a touchscreen device such as a tablet computing device. Vendor system 310 may also interface with an interactive voice response (IVR) application in order to validate vouchers. A user may, for example, call the IVR application and read the voucher or serialized identifier over the phone in order to validate the voucher.

Payment processor 320 may, in some embodiments, be a computing system operated by a party appointed by a merchant to handle credit card transactions. For example, payment processor 320 may be a third party entity that handles the credit card transactions entered into POS terminal 106. Generally, payment processor 320 may expose an application program interface (API) that permits outside computer systems, such as deal manager 300, to process credit transactions.

FIG. 3B is a block diagram illustrative of one embodiment of deal manager 300 in communication over network 380 with a deal presenter 100, vendor system 310, payment processor computing system 320, and for-hire vehicle 120 which may comprise one or more computing systems controlling its operation. In the embodiment of FIG. 3B, deal manager 300 comprises reservation and dispatch module 350 which performs the functions of the reservation and dispatch computing system 350 of FIG. 3A. For example, reservation and dispatch module 350 may receive reservations for FHVs and dispatch the FHVs according to received reservations. In addition, reservation and dispatch module 350 may update the trip computers of FHV 120 if passenger 115 accepts a deal while traveling in FHV 120. As references herein, "reservation and dispatch" may refer to either the embodiment illustrated with respect to FIG. 3A or the embodiment illustrated with respect to FIG. 3B.

Figure 4:
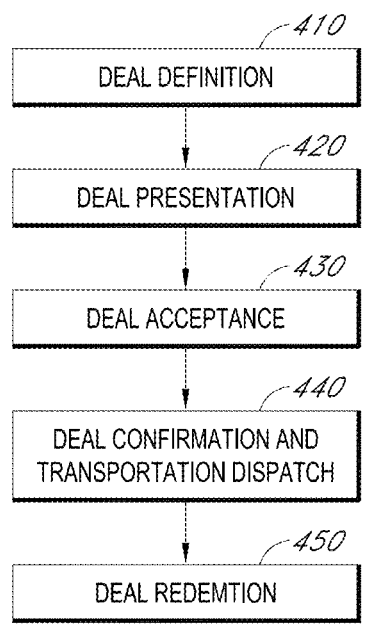
FIG. 4 is a flowchart illustrating a high level view of the lifecycle of a deal.

FIGS. 4 and 5 illustrate embodiments of the lifecycle and data flow for a deal from its definition to its redemption. FIG. 4 is a flowchart illustrating a high level view of the lifecycle of a deal. FIG. 5 is a block diagram illustrating the temporal flow of data for the lifecycle of deal from deal definition through deal confirmation.

In FIG. 4, a high level view of the lifecycle of one embodiment of a deal is illustratively described. The high level view of FIG. 4 is meant to provide an overview of the states of a deal. The operations associated with each stage of the deal is described in greater detail below. The lifecycle of a deal begins in block 410 with the definition of the deal. Generally, deals may be defined by those offering the deal such as vendor. Once defined, the deal is presented at block 420. Deal presentation typically involves deal manager 300 communicating deal information to deal presenter 100. Deal presenter 100 may then display the deal. Once displayed, consumer 215 may accept the deal at block 430. Deal acceptance typically comprises the steps of receiving a user input to accept the deal and deal presenter 100 communicating the acceptance to deal manager 300. Once accepted, the deal is confirmed at block 440. Generally, a deal is confirmed by processing payment for the deal, generating a voucher that may be redeemed at venue of the vendor and transmitting the voucher to deal presenter 100, and deal manager 300 reserving a FHV for transporting consumer 215 to the venue of the vendor by communicating with reservation and dispatch 350. Finally, at block 450, the deal is redeemed at the venue. Redemption may also include vendor system 310 communicating validation or redemption data to deal manager 300.

The high level view of the deal lifecycle described in FIG. 4 may now be explained in greater detail using the temporal flow diagram of FIG. 5. FIG. 5 depicts the temporal flow of data between one embodiment of deal presenter 100, deal manager 300, vendor system 310, a payment processor 320, reservation and dispatch 350 and for-hire vehicle 120 (which may comprise one or more computing systems controlling its operation). In particular, the circled numerals of FIG. 5 illustrate the order in which data flows between the various components of FIG. 5 according to one embodiment. In another embodiment, the steps outlined by the circled numerals may be performed in a different order, and the method may include fewer or additional steps.

Generally, the temporal flow of data starts with step 1 where vendor system 310 transmits deal definition data to deal manager 300. Next, at step 2, deal manager 300 publishes deals to deal presenter 100. At step 3, deal presenter transmits a deal acceptance back to deal manager 300. In response, deal manager 300 processes the payment associated with the deal acceptance at step 4 by transmitting payment information to payment processor 320. At step 5, payment processor 320 transmits a confirmation back to deal manager 300 that the payment transaction was successful. Upon receipt of successful payment processing, deal manager 300, at step 6, verifies that the transportation request associated with the deal may be fulfilled by sending a message to reservation and dispatch 350 to insure that a FHV is available to transport the consumer 215 to the venue of the vendor. Once the transportation request has been fulfilled, deal manager 300 transmits a confirmation message containing a voucher for the deal to deal presenter 100 at step 7, and at step 8 transmits a message reserving a FHV to reservation and dispatch 350. Reservation and dispatch 350 then automatically transmits a dispatch notice to FHV 120 thereby dispatching FHV 120 for picking up the consumer who purchased the deal, at step 9. Finally, at step 10, the voucher generated and sent to deal presenter 100 at step 7 is validated and redeemed by vendor system 310 by transmitting a redemption message to deal manager 300.

In step 1 of FIG. 5, vendor system 310 sends information defining a deal to deal manager 300. In one embodiment, vendor system 310 may execute a custom client-based computer application allowing for the user of vendor system 310 to input data defining a deal. Once the data has been entered, the client-based computer application may connect to deal manager 300 and communicate the entered data to deal manager 300, thereby defining the deal. In another embodiment, vendor system 310 may have a web browser application installed and deal manager 300 may comprise a web server that offers web pages to vendor system 310 to input data defining a deal, thereby allowing vendor system 310 to communicate deal definition data to deal manager 300.

FIGS. 6-10 illustrate various user interfaces that may be used to define deals. The user interfaces of FIG. 6-10 may be web pages or user interfaces of a computer application that executes on vendor system 310 that may be in communication with deal manager 300. The user interfaces of FIG. 6-10 are meant as examples and may include more or less user interface elements as desired.

Figure 17:
FIG. 17 is an illustrative screenshot showing one embodiment of a deal being displayed on a deal presenter computing system that is a mobile device.

In some embodiments, vendors may register with deal manager 300. Registration may facilitate deal definition so that data related to the vendor is shared among the deals its offers thereby allowing for a more streamlined deal definition process. For example, the address of venue of the vendor may be communicated to deal manager 300 at the time of registration. When the vendor submits deals in the future, the address of the venue need not be entered. FIG. 6 shows one illustrative embodiment of vendor registration user interface 600. Vendor registration user interface 600 advantageously includes vendor information fields 610. Vendor information fields 610 may include, for example, a text field for business name entry, a text field for the first and last name of the contact of the vendor, the address of the venue of the vendor and the website of the vendor. Vendor registration user interface 600 may also include category drop down list 615 which allows for the input of the vendor's category. For example, category drop down list 615 may include categories for selection such as Adult Entertainment, Hotel/Resort, Clubs, Shows, Restaurants, or other categories of vendors. The category may be used to filter deals displayed on deal presenter 100 to passenger 115 or consumer 215. Vendor registration user interface 600 may also include presentation type drop down 620. Presentation type drop down 620 may include the types of deal presenters on which the deal will be displayed. For example, a deal may be presented on a mobile device such as a cell phone, an embodiment of a mobile user interface 1700 is illustrated in FIG. 17, on a FHV-top display or a in-vehicle display. Presentation type drop down 620 may include these deal presentation types, among others. Vendor registration user interface 600 may also include vendor information block 630. Vendor information block 630 allows for vendor 310 to provide additional information about the vendor's business. Deal manager 300 may use the text entered into vendor information block 630 to provide additional services to the vendor or to target advertisements to the vendor, for example.

In some embodiments, the data entered into vendor information block 630 by the vendor may be used by deal manager 300 to generate targeted deals. Targeted deals are deals that may be targeted to certain passengers or consumers based on demographic information or behavior that may be gleaned from their use of FHVs or other information. Data entered into the vendor information block 630 may be used to generate targeted deals by including some of the data in deals that are generated and communicated to deal presenter 100. In another embodiment, the data entered into vendor information block 630 may be used to associate a consumer category with the vendor and the deals the vendor offers. A consumer category may be an indicator of a consumer type. For example, a consumer category may be "affluent traveler", "businessman", "family", "adult entertainment", "frequent dinner." Deal manager 300 may use keywords entered into vendor information block 630 to create an association with a consumer category. For example, if the vendor enters "We are an upscale dinning establishment serving fine French cuisine prepared by a world-class chef," deal manager may detect the keywords "upscale", "French cuisine" and "world-class chef" to associate the vendor with the "affluent traveler" consumer category. As the vendor defines deals, the deals may be tagged, or associated with the "affluent traveler" category. When the deals are published and communicated to deal presenter 100, the "affluent traveler" consumer category may be included in the deal information. Deal presenter 100 may then use the consumer category as part of its decision to display the deal. For example, as explained with respect to FIG. 21, deal presenter 100 may determine that the current passenger is an "affluent traveler" and as a result, display the deal. In addition or alternatively the vendor input screens may permit the vendor to identify the consumer categories that the vendor has decided that it wants to target.

In some embodiments, the vendor may define deals. The definition of a deal may comprise a title, a description, a price, and a retail price. For example, if the deal is for a show called "Great Show", the title may be "Deal on Great Show!", the description may be "The Great Show is an exciting mix of circus arts set to dramatic classical music", the price may be $25 and the retail price may be $60. A deal definition may also include custom graphics, images, or videos that allow vendor 310 to create an attractive and persuasive deal advertisement for display on deal presenter 100. In some embodiments, deals may be time restricted, that is, they may only run between a first time and a second time. In such embodiments, the deal definition includes the start time and end time of the deal. The vendor may also restrict the areas where deals may run. For example, if the vendor wishes to run their deals on a FHV-top display or on in-vehicle displays, they may limit the display of the deal to a particular predefined area. In such embodiments, the deal definition may also include geospatial parameters that define the area where the deal will run.

Figure 7:
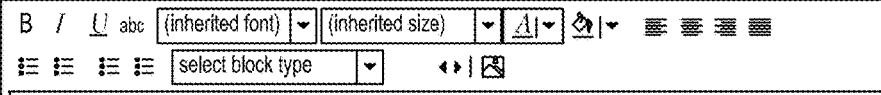
FIG. 7 is an illustrative screenshot showing one embodiment of an offer detail user interface.

Deals may be defined by the vendor using user interfaces provided by deal manager 300, or in other embodiments, by a custom client application executing on vendor 310 that is communication with deal manager 300. FIG. 7 shows one illustrative embodiment of offer detail user interface 700 that may be used by the vendor to define a deal. Offer detail user interface 700 may include, for example, text fields 705, 710 for inputting the name and header text of the deal. The offer detail user interface 700 may also include body text area 715. Body text area 700 may provide a tool bar for formatting and aligning text in the deal. In some embodiments, body text area 700 may accept HTML code as text thereby allowing vendor 310 to format the text that will be displayed in their deal. Body text area may include features that allow bulleted and numbered lists, hyperlink and image dialogs, support across web browsers, or other features known in the art for formatting text. Offer detail user interface 700 may also include presentation type drop down 720. Presentation type drop down 720 may permit the vendor to selection on what type of deal presenter display the deal will be shown. For example, the presentation type drop down may include options such as "In-vehicle Display", "Vehicle Top", "Mobile Device" Or "all of the above." Offer detail user interface 700 may also include a product name text field 725 for inputting a product name. Offer detail user interface 700 may also include a retail price text field 730 which may be used to highlight to passenger 115 or consumer 215 the size of the deal. For example, consumer 215 may recognize that a deal is good if the retail price is $100 and the deal is being offered for $50. In some embodiments, the deal may include an indication that there is a limited supply of deals. For example, for a show, a vendor may only offer 10 seats to the show as a deal. Text field 735 advantageously allows the vendor to input the number of available deals, or inventory, for the deal.

Figure 8:
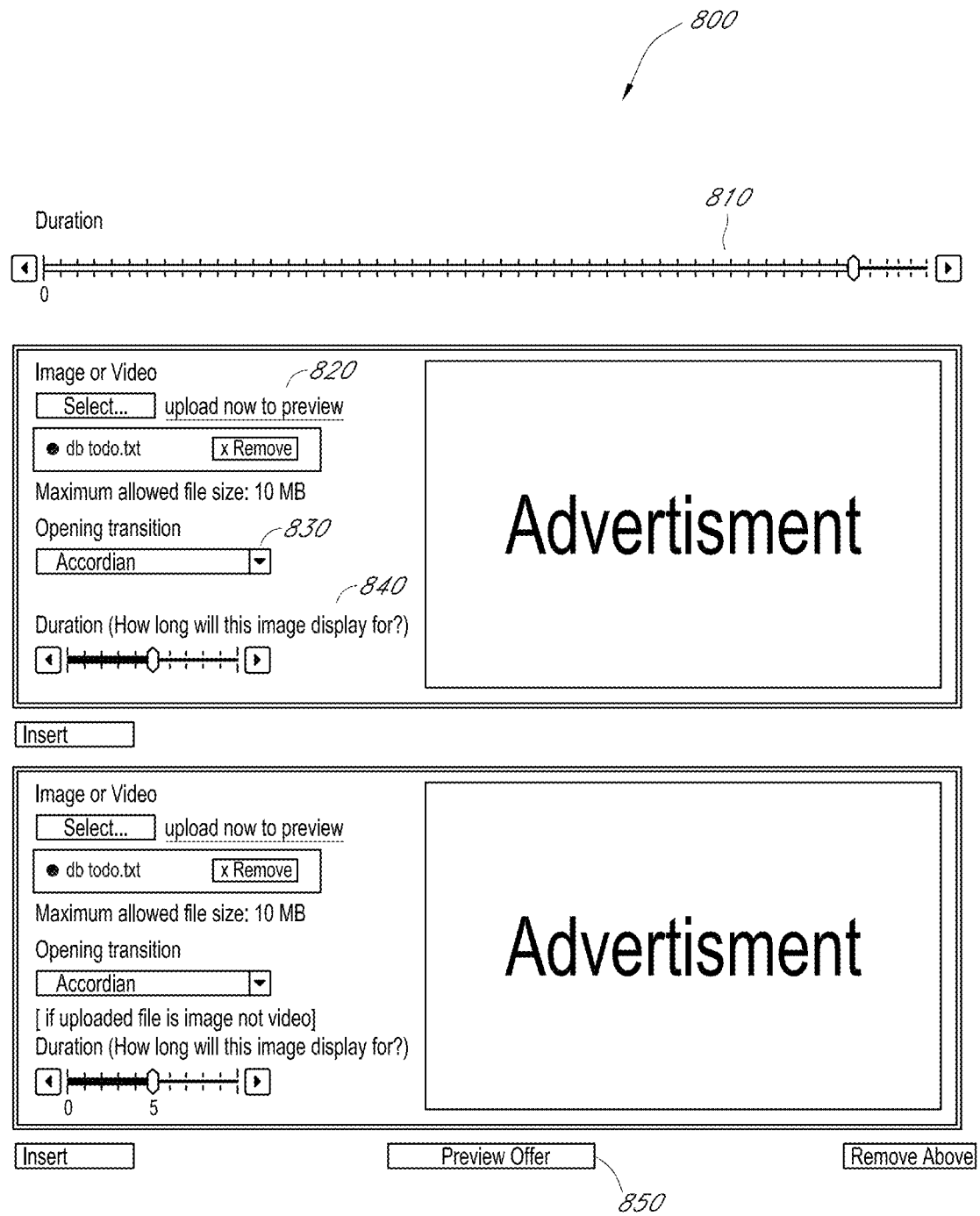
FIG. 8 is an illustrative screenshot showing one embodiment of a media upload user interface.

In some embodiments, vendor system 310 may upload media such as images and/or video so that the deal may be more attractive to those that view it. FIG. 8 illustrates one embodiment of media upload interface 800 which advantageously provides user interface elements for uploading media content to deal manager 300 so that the media may be included in the defined deals of the vendor. Media upload interface 800 may include a deal duration slider 810 allowing for the vendor to set the duration for displaying the deal. For example, in the illustrative embodiment of FIG. 8, the slider may be set so that the deal appears for a duration between 0 and 30 seconds. In another embodiment, media upload interface 800 may not include a slider, but rather, may include a text field for entering the duration for displaying the deal. Media upload interface 8 may also include upload element 820. Upload element 820 may be any user interface known in the art permitting upload of files to a server. Upload element 820 may provide a "Select" button. When the user clicks on the "Select" button, a file system dialog block may appear allowing the user to navigate to a directory that may contain a media file for uploading. Once the user selects the appropriate media, the name of the file may appear in text area of upload element 820. In some embodiments, deal manager 300 may only permit files up to a maximum file size. Upload element 820 advantageously informs the user of the max file size. Media upload interface 800 may also include transition drop down block 830. Transition drop down block 830 may contain a list of standard transitions from one image of a deal to the next image of the deal. For example, transition drop down block 830 may include transitions such as accordion (simulating the look and feel of an accordion), blinds (simulating the look and feel of horizontal or vertical blinds) or sweep (simulating the look and feel of the deal sweeping in from the top, bottom, left or right). Media upload interface 800 may also include media duration slider 840 that allows a user to enter the display duration for which the media (as opposed to the entire deal) may be displayed.

In some embodiments, more than one media may be uploaded and included as part of deal. For example, a deal may include several still images, several videos, or a mixture of images and videos. Media upload interface 800 may include buttons for adding additional media. As media is added, the vendor may set the transition and the display duration for each piece of media. In one embodiment, the order the media will be displayed to passenger 115 or consumer 215 is based upon the order the uploaded media appears in media upload interface 800. For example, if image 1 appears at the top of media upload interface 800, and image 2 appears at the bottom of media upload interface 800, consumer 215 will first see image 1 for the length of time set in the media duration slider associated with image 1, and then consumer 215 may see image 2 for the length of time set in the media duration slider associated with image 2. Media upload user interface 800 may also include a preview offer button 850 that allows the vendor to preview the deal thereby allowing the vendor to adjust the media, display duration of media, or transitions between media as needed.

Figure 9:
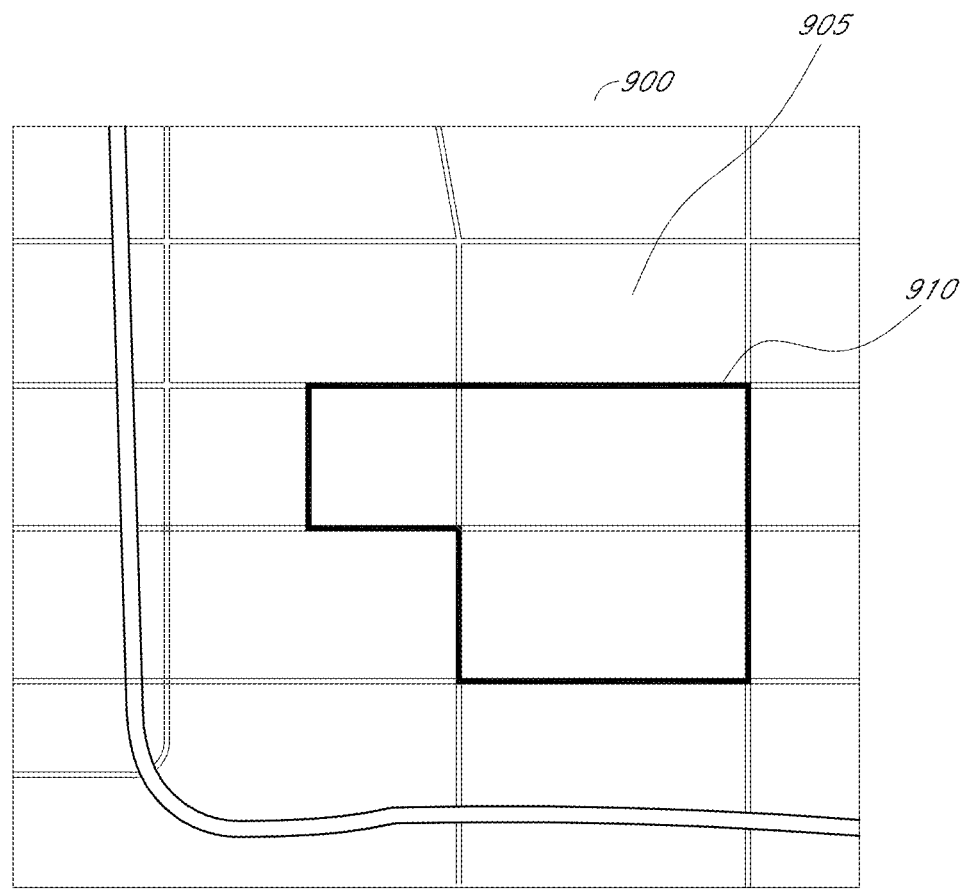
FIG. 9 is an illustrative screenshot showing one embodiment of a geographic restriction user interface.

In some embodiments, the vendor may wish to geographically restrict where deals may be presented. FIG. 9 shows one embodiment of geographic restriction user interface 900. Geographic restriction user interface 900 advantageously allows a user to select regions where deals may run, or exclude regions where deals may not run. Geographic restriction interface 900 may permit more than one region of inclusion of exclusion. Geographic restriction user interface 900 may include map element 905. Map element 905 may, in some embodiments, be implemented using a well known mapping tool or API, such as, for example, Google Maps, FALCONVIEW®, or any other readily available mapping tool that allows for overlay of graphics. Map element 905 may provide for zoom tools and navigation tools that allows a user to manipulate the map so that they may view the location for where they would like to place a geographic restriction. A user may, for example, select a region of the map with a selection tool and draw border 910 around a region of the map. Once the border has been drawn on the map, the user may select whether the region is to be inclusive or exclusive using radio buttons 920. For example, if the user would like the deal to run only within inside the selected region, then the user would select the "Inclusive" radio button. Geographic restriction interface 900, in some embodiments, may allow for the user to create multiple regions for where deals should be displayed. For example, the user may define a large "inclusive" region, and then define a smaller "exclusive" region inside the large "inclusive" region where the deal would not be offered, if the user (vendor) desired not to present the deal in a particular neighborhood or business area.

In one embodiment, once the vendor has completed entering the deal information using the user interfaces of FIGS. 6-9, the deal information may be communicated by vendor system 310 to deal manager 300 where deal definition module 305 may process the deal definition and store it in data store 303. In some embodiments, deals may be updated. The vendor may access a saved deal through user interface similar to the ones illustrated in FIGS. 6-9. The user interface used for creating a new deal definition may also be used for modifying a deal definition by pre-populating the user interfaces with a saved deal definition information. Deal manager 300 may provide a list in the user interface for the vendor that allows the vendor to select from predefined deals, and may allow the vendor to modify those predefined deals. In some embodiments, vendor system 310 may execute an application for updating a deal definition. Vendor system 310 may be, for example, a mobile computing device with a mobile application. The mobile application may provide the ability to alter details of the deal, such as the price, the time the deal should launch, or deal text. In some embodiments, a predefined deal may be launched on demand. For example, the user of vendor system 310 may wish to launch a deal to stimulate business. FIG. 10 shows one embodiment of user interface 1000 for launching a deal on-demand. User interface 1000 allows for the input of the number of deals available in text field 1010 and the price of the deal in text field 1020. The user interface 1000 also provides launch button 103 which will launch the deal "on-demand." In another embodiment the functions of the vendor system 310 may advantageously be made a part of the deal manager 300 and the input from the vendor as well as communication with the vendor's in-house inventory management system may be provided through the internet and a browser interface.

Returning to FIG. 5, at step 2, deal manager 300 publishes the deal. Deal manager 300 may publish the deal in response to a real-time immediate publication request (such as the one issued by the illustrative embodiment of FIG. 10, or it may publish a deal that was defined at an earlier time and stored in data store 303. Deal manager 300 may publish deals by communicating deal information across network 380. In one embodiment, deal manager 300 may publish deals in a broadcast paradigm, that is, deal manager 300 may publish deals without directing the deals to a particular target deal presenter 100, and it is up to deal presenter 100 to determine whether to display the deal. In another embodiment, deal manager 300 may maintain a list of registered deal presenters and may direct deal publication to those deal presenters that satisfy the deal definition. The processes for publishing and displaying deals is discussed further with respect to FIGS. 19 and 20.

Figure 11:
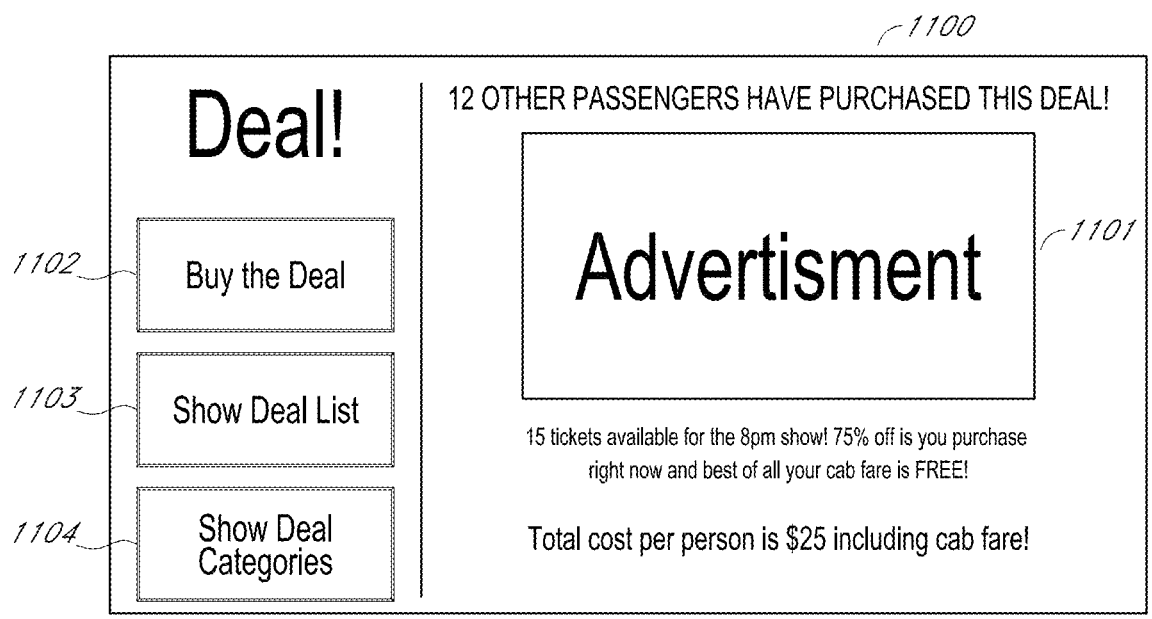
FIG. 11 is an illustrative screenshot showing one embodiment of a deal being displayed on a deal presenter computing system.

Once deal presenter 100 receives the deal, it may display the deal on display 103. FIG. 11 illustrates one embodiment of deal display 1100 that may be displayed showing a promotional offer, or deal, that may be offered to passenger 115 or consumer 215. Deal display 1100 may include deal information 1101. Deal information 1101 may be information related to the deal including the deal name, the deal description, the deal cost, media for the deal (such as images and video), or any other information that was part of the deal definition created by vendor system 310. For example, in the illustrative embodiment of FIG. 11, deal information 1101 includes an indication of how many other passengers have purchased the deal, an image displaying the deal, the number of tickets (deals) available, and the price of the deal. Deal display 1100 may also include a series of graphical buttons 1102, 1103, and 1104 that are configured to receive user input selections. For example, if passenger 115 wishes to purchase the deal, they may select button 1102. If passenger 115 is not interested in the current deal, but rather would like to view other deals, passenger 115 may select button 1103, to see all deals in a list form, or may select button 1104 to show the categories of available deals.

Figure 12:
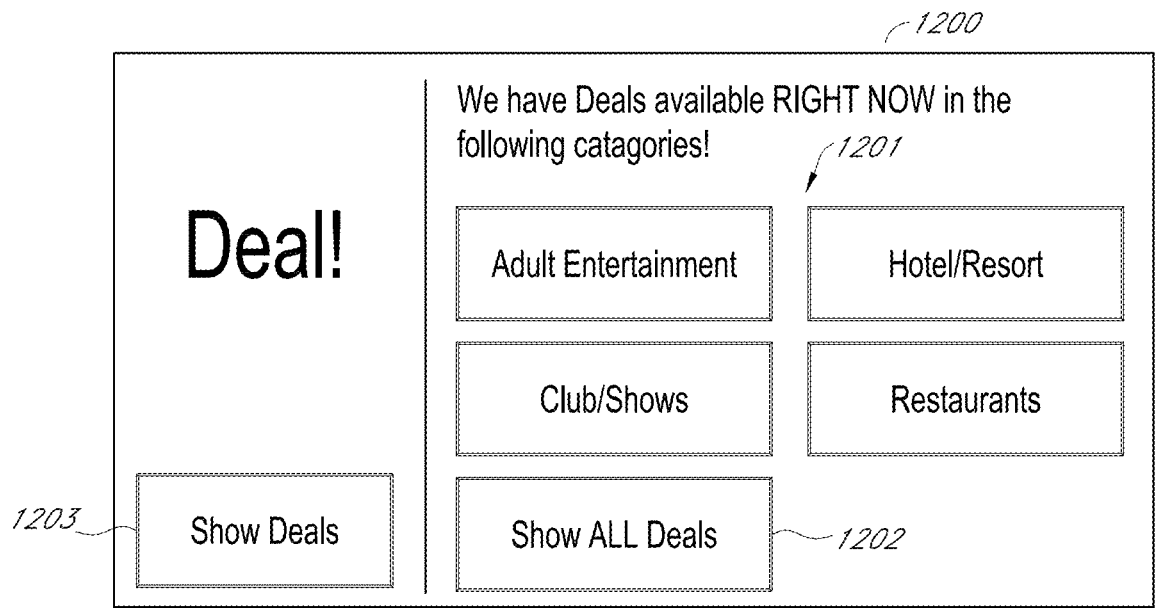
FIG. 12 is an illustrative screenshot showing one embodiment of a user interface for selecting a category of deals thereby allowing a consumer or passenger to filter deals based on category.
Figure 13:
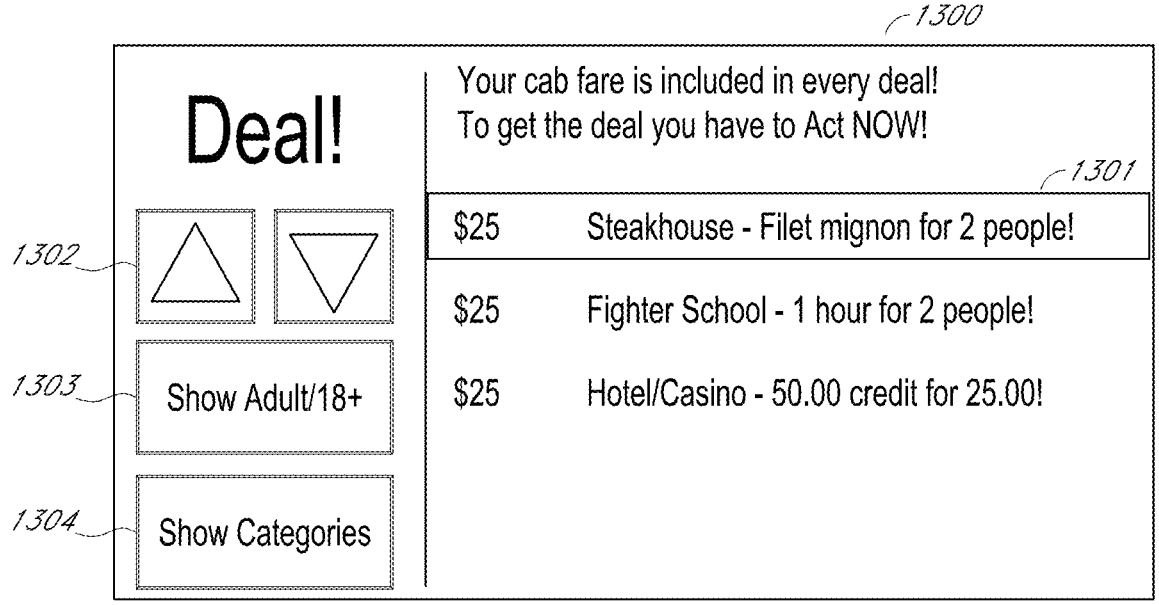
FIG. 13 is an illustrative screenshot showing available deals in a selectable list view.
Figure 15:
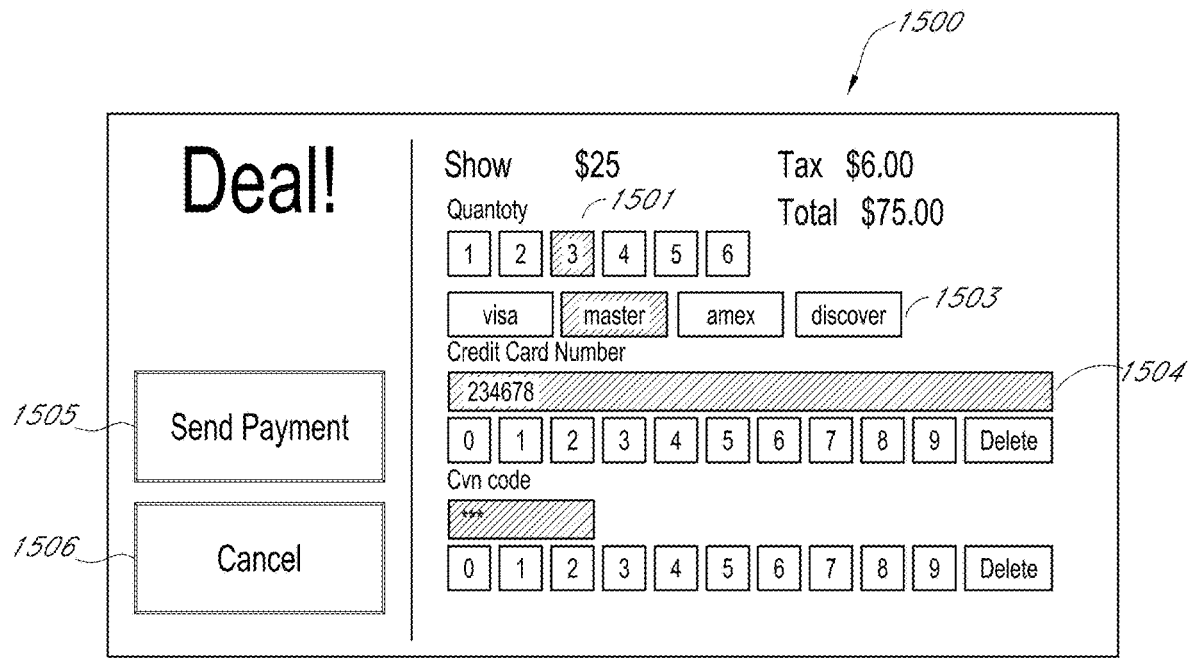
FIG. 15 is an illustrative screenshot showing one embodiment of a payment information user interface.

In one embodiment, deal presenter 100 may provide a user interface that allows passenger 115 to browse available deals. FIG. 12 shows one embodiment of category interface 1200 that may be displayed on deal presenter 100. Category interface 1200 may include category buttons 1201. Once selected, category buttons 1201 may show the deals available in a category in a list form (as shown in FIG. 13). Category buttons 1201 advantageously act as a filter, that is, once selected, the deals displayed may be limited to the selected category. For example, if passenger 115 selects the restaurants button, only those deals of the restaurants category (as defined in vendor registration user interface 600, for example) may be displayed. Category interface 1200 may also include a show all deals button 1202. Show all deals button 1202 may show all deals in a list form without filtering the list by category. Category interface 1200 may also provide show deals button 1203 that will return user to deal display 1100, which advantageously displays one deal at a time.

FIG. 13 illustrates one embodiment of deal list interface 1300. Deal list interface 1300 advantageously lists the available deals in list format 1301, thereby allowing passenger 115 to quickly browse the available deals that are currently available for purchase. The deal list interface 1300 may include inputs 1302 for navigation and selection of the available deals. The In one embodiment, the deals in the list are selectable, that is, a user may touch or select the deals in the list and the deal information may then be displayed in a user interface similar to the illustrative user interface illustrated in FIG. 11. The deals displayed in the list may be filtered by category or, in other embodiments, may be filtered based upon whether adult deals have been enabled. Filtering may be canceled through the selection of cancel button 1303. Deal list interface 1300 may also include adult entertainment enablement button 1303 that when selected may display the illustrative user interface of FIG. 14. FIG. 14 illustrates one embodiment of a user interface for enabling display of adult entertainment related deals. The illustrative user interface of FIG. 14 advantageously provides buttons for verifying that passenger 115 is older than 18. Deal list interface 1300 may also comprise Show Categories button 1304 that may return the user to category user interface 1200 when pressed.

In one embodiment, once passenger 115, or consumer 215, selects purchase button 1102, deal presenter 100 may display payment information user interface 1500. Payment information screen 1500 may contain, for example, quantity selection buttons 1501, advantageously allowing Passenger 115 may select the number of tickets he would like to purchase in the deal. The quantity selection may affect payment summary 1502, that is, as the quantity is changed, the total in payment summary 1502 may update. Payment information screen 1500 may also include payment instrument selector 1503, advantageously allowing for the selection of a payment instrument, such as, for example, a VISA® card, a MASTERCARD®, an AMERICAN EXPRESS® card or a DISCOVER® card. Payment information screen may also comprise credit card information entry user interface elements 1504 for entry of credit card numbers and CVN codes. Once passenger 115 has entered the appropriate data, passenger 115 may purchase the deal by selecting purchase button 1505. In some embodiments, purchase button 1505 may be disabled, or grayed out, until the passenger 115 has entered the required data for payment processing. If, however, passenger 115 does not wish to purchase the deal, they may exit payment information screen 1500 by pressing cancel button 1506.

Returning to FIG. 5, once passenger 115 indicates they would like to purchase a deal and enters the appropriate payment information, deal presenter 100 communicates the deal acceptance and the payment information to deal manager at step 3. The deal acceptance may also include location information indicating the location of passenger 115 or consumer 215 when accepting the deal. In embodiments where passenger 115 accepts the deal as a result of in-vehicle deal presentation, the location information may not be the absolute physical location of passenger 115, but rather, may be an identifier associated with the FHV in which passenger 115 is traveling. In embodiments where consumer 215 has accepted the deal as a result of a FHV-top display presentation, or personal computing device presentation, the current location of consumer 215 may be communicated to deal manager 300. The current location may be in the form of GPS coordinates obtained from the on-board GPS processor of the mobile device, for example Once deal manager 300 receives the acceptance from deal presenter 100, deal manager 300 may attempt to process payment in step 4. Deal manager 300 may extract from the acceptance data, payment information that was part of the acceptance. For example, deal manager 300 may extract the payment instrument type selected with payment instrument selector 1503 and may also extract the credit card number and CVN code from the acceptance data. In some embodiments, this data may be encrypted using an encryption algorithm known in the art. In such embodiments, deal manager 300 may decrypt the payment information before packaging it to send to payment processor 320. Payment processor 320 may expose an API allowing payment information to be sent to it. Deal manager 300 and payment processor 320 may communicate using commonly understood methods of communication between computing systems.

Once payment processor 320 receives the payment information it may process it and return the result of processing to deal manager 300 at step 5. If the result of payment processing was successful, deal manager 300 may generate a voucher, voucher number or serialized number ("voucher") that may be used to redeem the deal at the vendor system 310. The voucher advantageously represents a unique code or key that may be used by passenger 115 or consumer 215 to redeem the deal at the venue of the vendor. The voucher may be a string of alpha-numeric characters, or in other embodiments, may be a UPC code or QR code that will be scanned at the venue. Deal manager 300 may store a record of the voucher creation in data store 303. In embodiments where deals are limited by a fixed inventory, deal manager 300 may also conduct inventory management processing through the use of deal publishing module 306. Deal manager 300 may, for example, decrement an inventory value associated with the deal. For example, if a deal was defined as only having 10 tickets available, the number of tickets available may be adjusted to 9, to indicate that one ticket has been purchased. Deal manager 300 may also broadcast a message to deal presenters indicating that for that deal the number of available tickets has decreased by one thereby allowing deal presenters to update their deal displays.

Once payment has been verified, deal manager 300 may then determine, at step 6, if there is a for-hire vehicle available for transporting consumer 215 to the venue where the deal may be redeemed. Some deals, such as deals for shows or events, are time sensitive. As a result, deal manager 300 may, in some embodiments, make a request of reservation and dispatch 350 to determine if the consumer's transportation request can be fulfilled the estimated pick up time consumer 215. Once the estimated pick-up time is received, deal manager 300 may then use the location information of consumer 215 to estimate the time needed to travel to the venue offering the deal. Using the estimated pick-up time, and the estimated travel time, deal manager 300 may then estimate the length of time it would take for consumer 215 to get to the venue. Once the travel time is determined, it is added to the current time to ensure that consumer 215 will arrive on time for her deal. In the event that a FHV cannot pick up consumer 215 in time for the show or event, deal manager 300 may cancel the deal and refund the consumer's purchase of the deal. In some embodiments, the request to determine if consumer's transportation request can be fulfilled is completed prior to payment processing.

Figure 16:
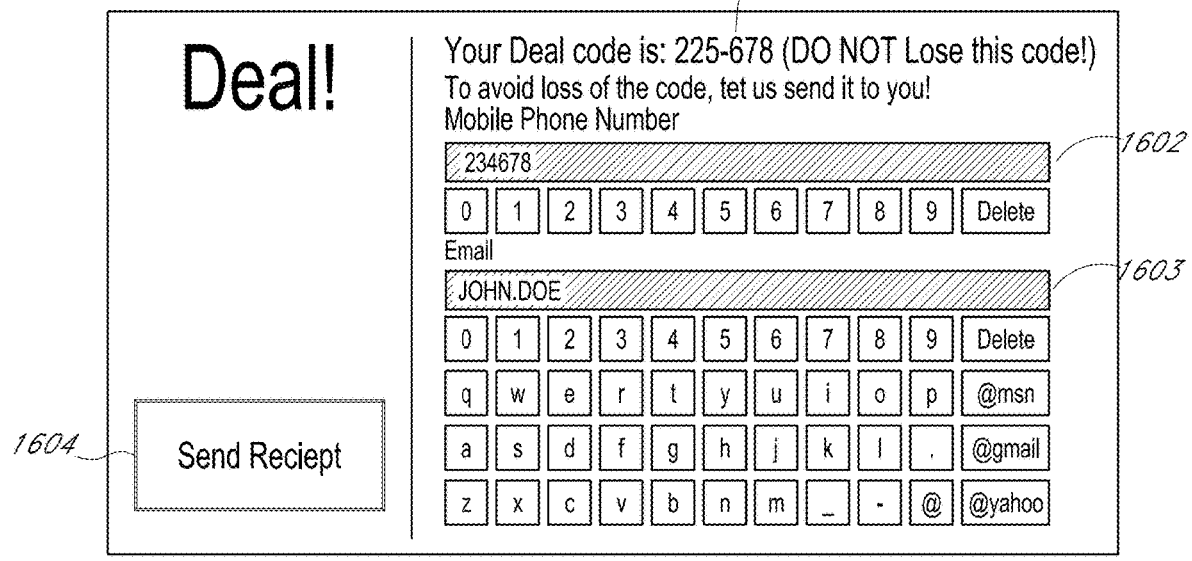
FIG. 16 is an illustrative screenshot showing one embodiment of a deal confirmation user interface.

The flow of data then proceeds to step 7 where deal manager 300 then sends the voucher and purchase confirmation to deal presenter 100. FIG. 16 shows one embodiment of deal confirmation user interface 1600. Deal confirmation user interface 1600 advantageously includes voucher 1601. As shown in FIG. 16, voucher 1602 may be an alpha-numeric code, for example "225-678". In addition to providing the voucher on the display of deal presenter 100, deal confirmation user interface 1600 may also include user interface elements that provide a means for passenger 115 to input contact information so that the voucher may be sent directly to the computing device of passenger 115. For example, deal confirmation user interface 1600 may provide phone number text field 1602 for entry of a phone number corresponding to a mobile phone capable of receiving a text message. In addition, deal confirmation user interface 1600 may also provide email text field 1603 for entry of an email address. Passenger 115 may then a copy of the voucher, along with receipt information, to their personal computing device by selecting send button 1604. In some embodiments, the deal confirmation may include an indication of where consumer 215 is to expect FHV 120 to pick them up to take them to the venue. For example, the deal confirmation may indicate a particular intersection, taxi stand or address where consumer 215 should wait for the FHV to pick her up.

In some embodiments, deal manager 300 may generate a voucher coupon and send it to deal presenter 100. The voucher coupon may be, for example, an image file containing the voucher number and a UPC or QR code. The voucher coupon may also contain information related to the event for which the deal is was purchased. For example, the event name may be on the voucher coupon, and the deal amount may be on the voucher coupon. In some embodiments, deal presenter 100 may have a printer connected to it. For example, if deal presenter 100 is an in-vehicle display, a thermal printer may be connected to deal presenter 100 for printing the received voucher image. In embodiments where deal presenter 100 may be a mobile device, an image may be displayed on the mobile device so that vendor system 310 may scan the UPC code or QR code for redemption. In some embodiments, deal manager 300 may send the generated coupon image in an email to passenger 115 or consumer 215 to the email address entered in email text field 1603.

Also in step 7, deal manager 300 may send to vendor system 310 a confirmation message indication that deal has been purchased. The confirmation message may include identification information of passenger 115 or consumer 215, if available. The vendor may then use the information of the confirmation message as a further check with the validation of the voucher as a means of further preventing fraud. In addition, the confirmation message may indicate, if appropriate, a seat number, position number, or other customer unique identifier to prevent the vendor from double selling a unique item. For example, suppose the vendor is providing a show with fixed seating. The vendor offers several seats for sale, including seat 5A. Seat 5A is then sold in a deal presented on deal presenter 100. The vendor receives confirmation that Seat 5A was sold and as a result, will not then resell Seat 5A to another customer who may walk up to the venue and wish to purchase a seat without a pre-purchased deal. To make sure that two seats are not sold to different customers at the same time the seats are held for short time period (for example 5 to 10 minutes) when the customer has taken the first step to accept the deal. Then if the seat is not purchased within this time period the seat is released.

Moving to step 8, deal manager 300 advantageously sends a FHV request to reservation and dispatch 350 following the communication of the voucher to deal presenter 100 and the confirmation message to vendor system 310. The request may contain the location of consumer 215 and request an FHV to be dispatched to pick up consumer 215. For example, if consumer 215 received a deal on their mobile device at Las Vegas Blvd and Fremont for an event at Las Vegas Blvd and Flamingo, the request may indicate that the passenger is to be picked up at Las Vegas and Fremont and then transported to Las Vegas and Flamingo. The request may also indicate that the fare for the trip has already be paid and will be credited to the driver accepting the fare.

In some embodiments, deal presenter 100 may be an in-vehicle display and passenger 115 may be traveling to a first destination when the deal is displayed and accepted. In this embodiment, the request message may indicate that the request is not for a new dispatch, but rather to edit a current trip sheet. The request may contain the location of passenger 115 and request that the trip destination of passenger 115 be updated to reflect the location of the venue as the new destination. For example, if passenger 115 is traveling in a FHV to Las Vegas and Fremont when he accepts a deal for an event at Las Vegas and Flamingo, deal manager 300 may send a request to reservation and dispatch 350 that the trip taken by passenger 115 be altered so that the destination of Las Vegas and Fremont be changed to Las Vegas and Flamingo.

Once reservation and dispatch 350 receives the request, it may then send a dispatch message to FHV 120 at step 9. The dispatch message may, in some embodiments, be a dispatch to initiate a new passenger fare. In other embodiments, the dispatch message may be a message to update the trip sheet for passenger 115. Once dispatched, the driver of FHV 120 may pick up the passenger and take them to the venue of the vendor.

Figure 18:
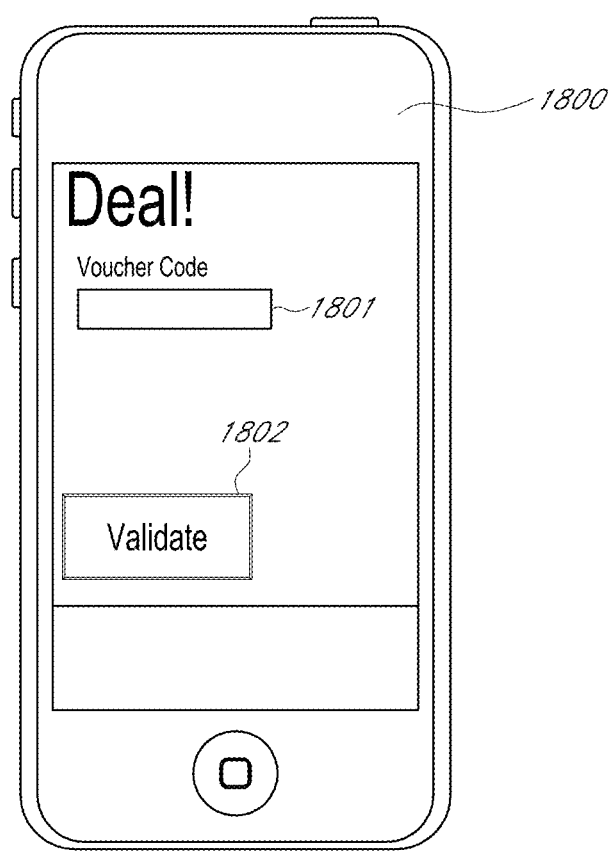
FIG. 18 is an illustrative screenshot showing one embodiment of a deal validation user interface.

Finally, at step 10, the voucher sent to passenger 115 or consumer 215 may be validated. In some embodiments, vendor system 310 and FHV 120 may have a specialized reader device that may scan UPC or QR codes from voucher coupons. In other embodiments, the voucher code may be submitted by vendor system 310 or the driver of FHV 120 to deal manager 300 through the use of web portal, mobile or IVR application. For example, FIG. 18 illustrates one embodiment voucher redemption interface 1800. In one embodiment, a user may enter an alpha-numeric code into voucher code text field 1801. Once entered, the user may submit the voucher code to deal manager 300 by pressing validate button 1802. In another embodiment, the voucher code may be validated through the use of an IVR application that interfaces with deal manager 300. A user may call a phone number associated with deal manager 300 and read the alpha-numeric voucher code. The IVR application advantageously interprets the voucher code and sends the voucher code information to deal manager 300.

Once deal manager 300 receives the voucher code, deal manager 300 may validate and redeem the deal. In one embodiment, deal publishing module 306 may mark a row in data store 303 corresponding to the voucher indicating that is was redeemed and can no longer be redeemed if the voucher code is valid. In some embodiments, vouchers may be redeemed by drivers (as part of transportation fulfillment) and may also be redeemed by vendors. As a result, deal manager 300 may maintain separate data structures for a voucher code indicating that it has been redeemed once by the driver of FHV 120, and once by the vendor system 310. If the voucher code is not valid, deal manager 300 may send a validation failed message back to vendor system 310 or the driver of FHV 120 indicating that the voucher is invalid.

Figure 19:
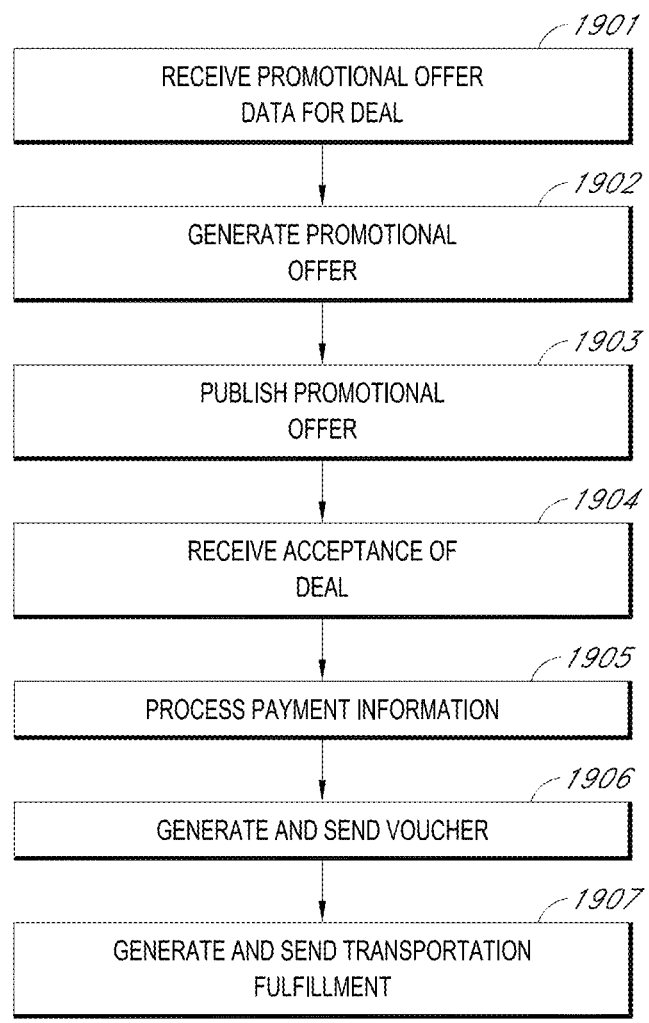
FIG. 19 is a flow chart depicting the process flow of one embodiment of a deal manager computing system.

FIG. 19 is a flow chart depicting the process flow of one embodiment of a deal manager 300. At block 1901, deal manager 300 may receive promotional offer data for a deal from a vendor system 310. The promotional offer data may include deal data as described above with respect to FIGS. 6-10. For example, the promotional offer data may include deal information describing the deal, time restrictions, location restrictions, the number available at that price (checked in real time), a retail price, images, or other data that may define a deal. The deal information may, for example, contain a description of the deal being offered to the consumer. Time restrictions may indicate the time a deal is to run. A time restriction may include a start time, such as 6 PM on Jul. 1, 2011 and an end time, such as 10 PM Jul. 1, 2011. Location restrictions may comprise a plurality of GPS coordinated defining a region where the deal should be presented ("inclusive restrictions"), or defining a region where the deal should not be presented ("exclusive restrictions"). The retail price may be an indication of the regular price of the item offered in the deal.

In response to the received promotional offer data, deal manager 300 may generate a promotion offer, or deal, at block 1902. The deal or promotional offer may include some of the promotional offer data. In addition, the promotional offer may include a consumer category. The consumer category may describe the type of customer that may be interested in purchasing the deal. For example, a consumer category may be "affluent traveler", "businessman", "family", "adult entertainment", "frequent dinner." Once the promotional offer is generated, at block 1903 the deal manager 300 may publish the deal according to methods described in the present disclosure. For example, deal manager 300 may publish the deal in a broadcast paradigm. Once the promotional offer publishes, deal manager 300 may wait for one or more acceptances of the promotional offer.

At block 1904, deal manager 300 receives the acceptance of a deal. Once the acceptance is received, deal manager 300 extracts location information and payment information from the acceptance. The location information indicates the location of deal presenter 100 at the time of acceptance. The payment information includes data related to the amount paid and the account number of the payment instrument. Deal manager 300 then, at block 1905, sends the payment information to payment processor 320 for processing. Once the payment successfully processes, deal manager 300 may generate a voucher and send it to deal presenter 100 at block 1906. Finally, at block 1907, deal manager 300 may generate and send a transportation request to reservation and dispatch 350 based on the extracted location information.

Figure 20:
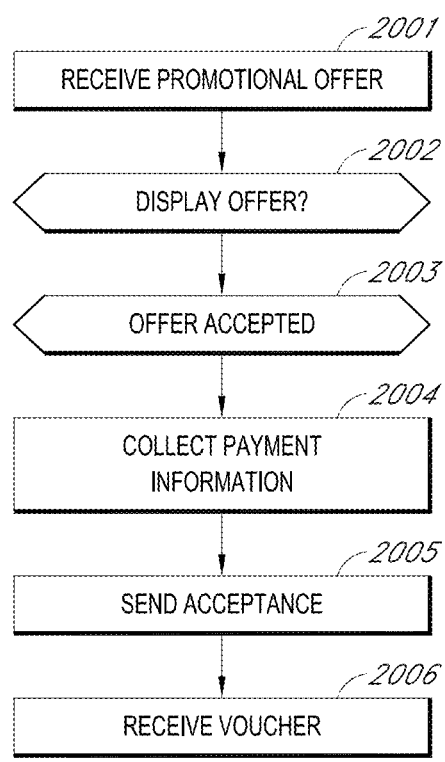
FIG. 20 is a flow chart depicting the process flow for one embodiment of a deal presenter computing system.

FIG. 20 is a flow chart depicting the process flow for one embodiment of a deal presenter 100. At block 2001, deal presenter 100 receives a promotional offer. Once received deal presenter 100 may add the promotional offer, or deal, to a monitor queue. The monitor queue may be a list of received deals that are analyzed on a periodic basis to determine if all the restrictions, such as time and location based restrictions for example, associated with the deal are satisfied. In some embodiments, the received deal may be added immediately to the monitor queue before being analyzed, while in other embodiments, the deal is analyzed to determine if it should displayed immediately or added to the monitor queue. Once the deal is added to the monitor queue, deal presenter 100 may periodically analyze the deals in the monitor queue to determine if they should be displayed. At block 2002, the deal presenter 100 determines if it should display the offer.

Figure 21:
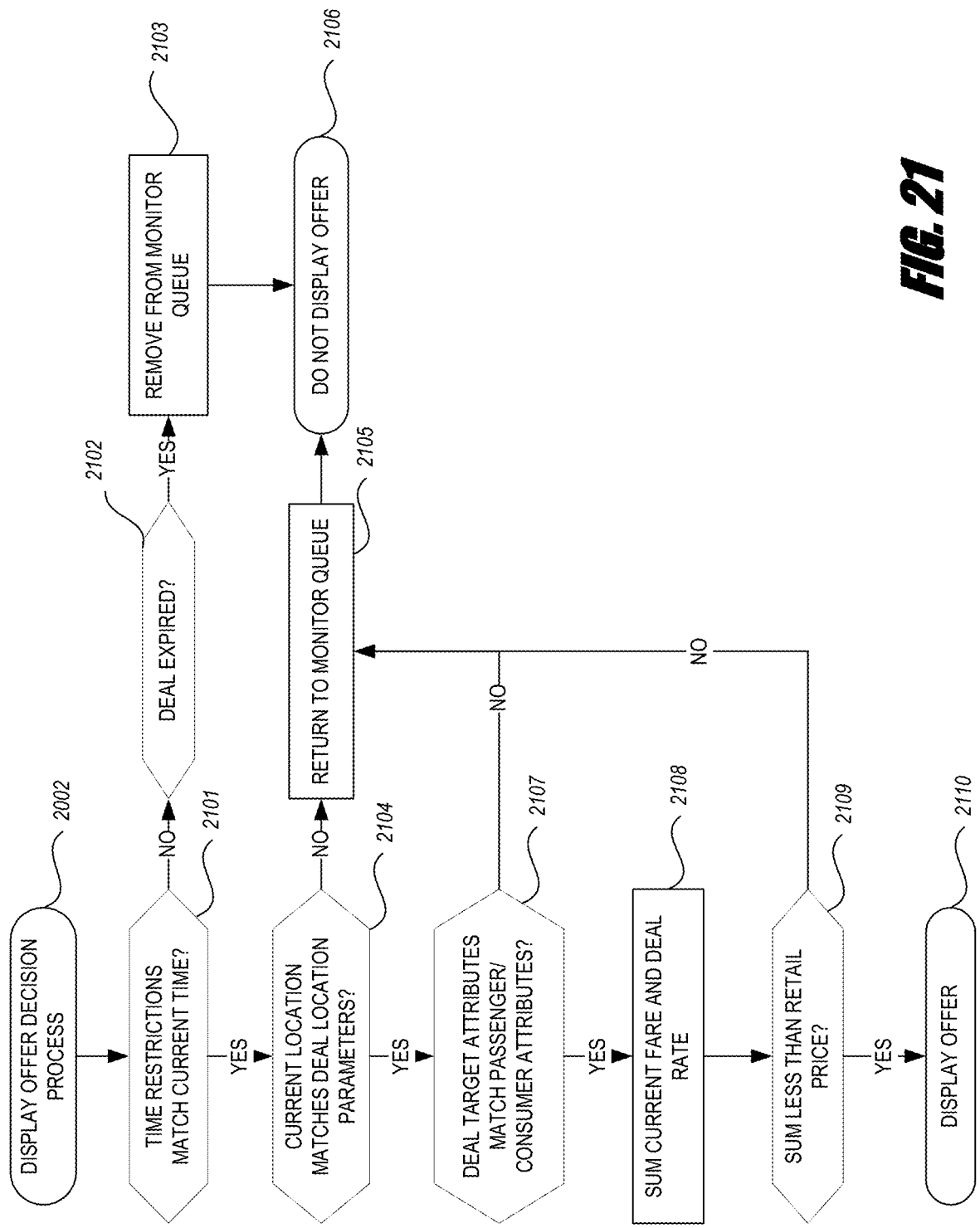
FIG. 21 is a flow chart depicting one illustrative example of decision process for displaying a deal.

FIG. 21 is a flow chart depicting the process flow for one embodiment of a deal presenter 100 showing one illustrative example of a display offer decision process. The process shown in FIG. 21 describes just one process for determining whether to display a deal on deal presenter 100 and it should be understood that other processes and methods may be used to determine when deals should be displayed. For example, another method of determining whether deals should be displayed may be for deal presenter 100 to display all deals it receives. It should also be understood that in some embodiments, some steps of the process depicted in FIG. 21 may not be performed. For example, in some embodiments, deals may not be matched to passengers or consumers based on target attributes as described with respect to block 2107. In one embodiment, the process shown in FIG. 21 is advantageously performed by presentation module 105.

At block 2101, presentation module 105 determines if the time restrictions match the current time. If the time restrictions match the current time, then processing moves to block 2104. For example, a deal may have a time based restriction that it is to run from 1 PM on April 4 to 10 PM on April 5. Presentation module 105 may determine that the current time is 1:01 PM on April 4. As a result, processing may move to block 2104. If, however, the time restrictions do not match the current time, processing moves to block 2102, where the presentation module 105 determines if the deal has expired and should be removed from the monitor queue. Using the above example, if the current time is 10:03 PM on April 5, the deal has expired. As a result, presentation module 105 will remove the deal from the queue at block 2103. If, however, the current time is earlier than the start time, for example, 12:30 PM on April 4, the deal is returned to the monitor queue at block 2105 and is not displayed at block 2106. Another example is that the deal would be removed from the monitor queue if all the inventory (of seats for example) have been sold.

When the time restrictions are satisfied, processing moves to block 2104 where presentation module 105 determines if the current location matches the deal location parameters. The determination may depend on the current location of deal presenter 100. For example, suppose deal presenter 100 receives a deal that is geographically restricted to areas north of Interstate 215. The deal would enter the monitor queue along with other received deals. When presentation module 105 examines the deal from the queue, it will determine the current location of deal presenter 100. Presentation module 105 may, for example, determine its location through the use of a GPS unit connected to deal presenter 100 (in the case, for example, of an in-vehicle deal presenter) or it may use a GPS that is part of deal presenter 100 (in the case of a mobile phone application deal presenter or an in-vehicle deal presenter, for example). If deal presentation module determines that deal presenter 100 is in a FHV that is south of Interstate 215, presentation module 105 may not display the deal, but instead leave the deal in the monitor queue to be re examined later at block 2105. In some embodiments, presentation module 105 may store the deal in memory and then display the deal when deal presenter 100 travels north of Interstate 215, and processing may continue to block 2107.

At block 2107, the presentation module 105 determines if the deal target attributes match the attributes of the passenger or consumer viewing the deal presenter 100. The deal target attributes may, in some embodiments, be a consumer category. The deal may contain a consumer category that described a target consumer to which the deal should be displayed. The presentation module 105 may also decide whether the current consumer or passenger is of the same consumer category. In embodiments where deal presenter 100 is installed in a FHV, presentation module 105 may determine the passenger's consumer category based on information related to the passenger's trip. For example, if the FHV is a limo, as opposed to a shuttle or taxi, presentation module 105 may determine that the passenger is of the consumer class "affluent traveler" or if the FHV is a minivan, as opposed to sedan, the presentation module 105 may determine the passenger is of the consumer class "family." Presentation module 105 may also use the pick-up location, or current destination location, to glean information about the passenger that may be used to determine the consumer class for the passenger. For example, if the passenger is picked up at a high end hotel and is planning on traveling to a sushi restaurant, presentation module 105 may determine that the passenger is of the "affluent traveler" and "frequent diner" consumer categories. In embodiments where deal presenter 100 is a mobile device or other general purpose computing system, a consumer category may be determined from the consumer's prior deal purchase history, or consumer entered attributes. In some embodiments, instead of or in addition to consumer categories, destination information may be used to match deals with a passenger. For example, if the passenger is traveling to an adult entertainment venue, presentation module 105 may match the passenger with deals for other adult entertainment venues in the hope of the passenger changing his or her desired destination.

Once presentation module 105 determines that the deal target attributes match the passenger or consumer attributes, processing continues to block 2108. At block 2108, the total cost of the deal is determined. In some embodiments, deal presenter 100 may not present a deal if the deal does not provide a discount once the current accumulated fare is included in the deal. Accordingly, presentation module 105 sums the current accumulated fare and the deal rate at block 2108 after which processing moves to block 2109 to determine if the summed value is less than the retail price of the deal. For example, deal presenter 100 may receive a deal for $20 tickets for $10. If, however, passenger 115 has accumulated a fare of $12, the accumulated fare, plus the cost of the deal of $10 may result in a cost of $22 to accept the deal. Thus, presentation module 105 may not display the deal because the cost of accepting the deal for the ticket exceeds what the ticket would normally cost and the deal is returned to the monitor queue at block 2105. If, however, presentation module 105 determines that the accumulated fare plus the deal rate results in a deal price that is lower than the retail price, processing may move to block 2010, and the deal may be displayed. In another embodiment the functions of the presentation module 105 of the deal presenter may advantageously be handled as part of the deal manager 300. In this embodiment the deal manager would keep track of all the current information about the for-hire-vehicles in the overall system including for example location and fare status as well as what ever information is known about the passenger(s). This information would then be used to make the decision about where and when to present the offers available.

Returning to FIG. 20, if deal presenter 100 decides to display the promotional offer, it may then determine if the promotional offer has been accepted at block 2003. If the offer is accepted, payment information is collected at block 2004. The payment information may be collected, in some embodiments, through the use of a POS terminal. Once the payment information has been received, deal presenter 100 may send the acceptance to deal manager 300 at block 2005. Finally, at block 2006, deal presenter 100 may receive confirmation that the promotional offer has been processed and deal presenter 100 may receive a voucher that can be redeemed at venue 310.

Figure 22:
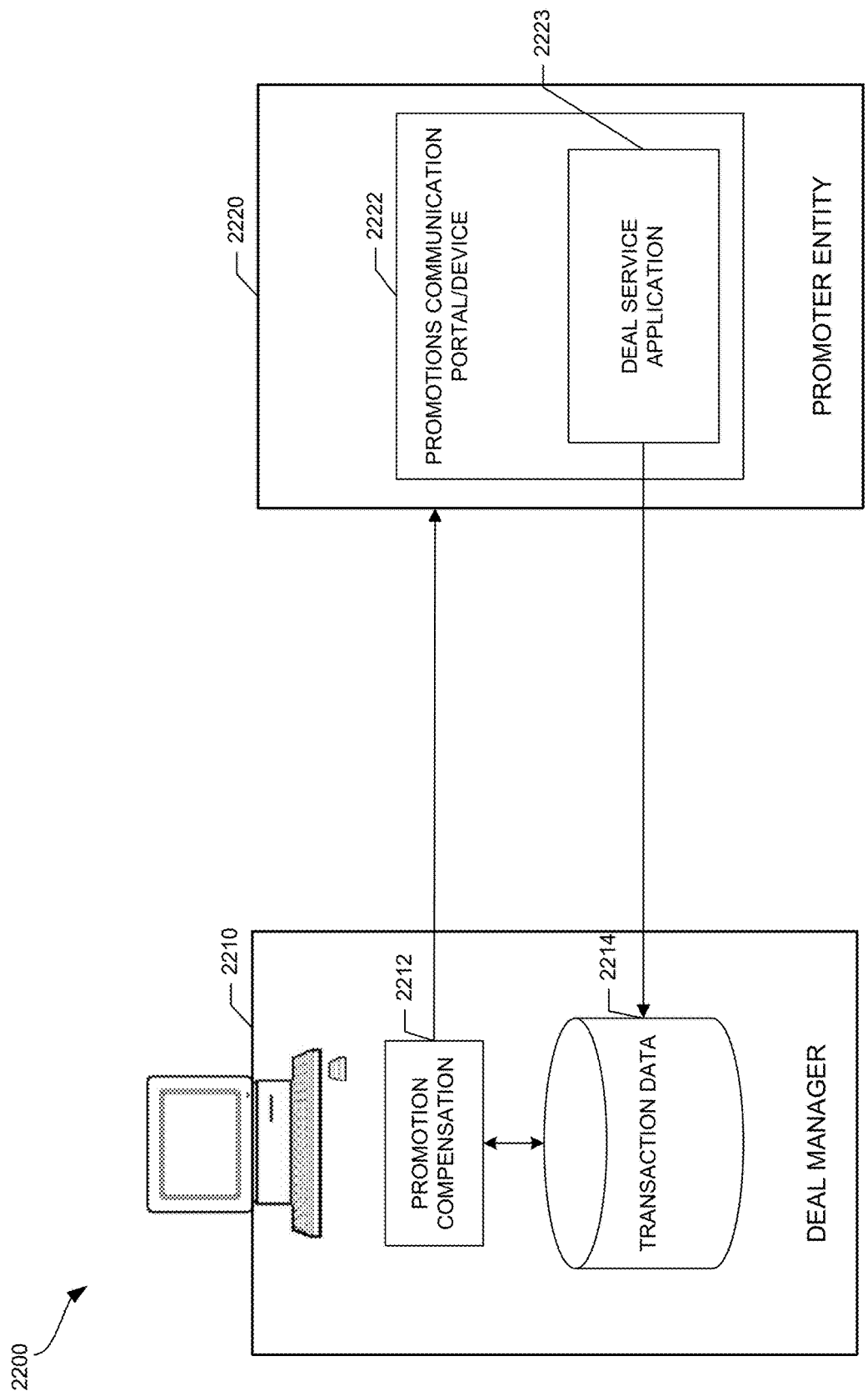
FIG. 22 illustrates an embodiment of a deal manager computing system.

FIG. 22 illustrates an embodiment of a deal manager computing system 2200 in data communication with a promoter entity 2220, over a computer network (for example, the Internet). In certain embodiments, the deal manager 2210 and/or promoter entity 2220 comprise one or more computer processors for processing data. The promoter entity may be an individual, such as a driver of an FHV, a business, company, or other entity. The promoter entity 2220 is associated with a promotions communication device 2222 that is outfitted with a deal service application 2223. The deal service application 2223 may be electronic, such as a downloaded software application, or may be physical, such as an advertising poster, leaflet, sticker, etc. Example electronic deal service applications may include software applications, such as for use on a computer or smart phone. In the case of a physical application, the application may be a print advertisement, or the like. For example, the application may be a poster or billboard that serves to promote one or more deals, wherein the poster or billboard displays an identifier, or code, uniquely associated with the promoter entity 220. A consumer may purchase a deal, or conduct a transaction promoted by the print material, in response to viewing the material. In certain embodiments, the identifier displayed may be input in connection with such a purchase or transaction, thereby providing information to the deal manager 2200 which is used by the promotion compensation module 2212 in calculating a benefit to provide to the promoter entity 2220 as compensation for promoting the deal or service. The deal service application 2223 may promote one or more specific deals provided by a deal service, or the deal services generally.

In one embodiment, deal manager 2200, is a computing system that is IBM, MACINTOSH® or LINUX®/Unix compatible. Deal manager 2200 may, in some embodiments, include one or more processors, which may include one or more conventional or proprietary microprocessors. Deal manager 2200 may further include memory, such as random access memory ("RAM") for temporary storage of information and/or read only memory ("ROM") for permanent storage of information, and/or other data storage, such as a hard drive, diskette, or optical media storage device. In certain embodiments, the deal manager includes data storage needed for managing and maintaining deals, or for storing historical deal information. Such storage may store data in databases, flat files, spreadsheets, or any other data structure known in the art.

The deal manager 2210 may be generally controlled and coordinated by operating system software, such as the WINDOWS® 95, 98, NT, 2000, XP, VISTA®, LINUX®, SunOS, SOLARIS®, PalmOS, BLACKBERRY® OS, IPHONE® OS, Google Android, or other compatible operating systems. In MACINTOSH® systems, the operating system may be any available operating system, such as MAC OS X. In another embodiment, deal manager may be controlled by a proprietary operating system, that is, one that had been custom made for the purposes of embodying certain of the systems and methods described herein. Conventional operating systems control and schedule computer processes for execution, perform memory management, provide file system architecture, networking, and I/O services, and may provide a user interface, such as a graphical user interface ("GUI") for display, among other things.

The deal manager 2210 may also include one or more commonly available I/O devices, such as for example, a printer, buttons, a keyboard, a display, a touchpad, a USB port, and the like. In certain embodiments, the deal manager 2210 includes I/O devices and/or interfaces that provide a communication interface to various external devices. For example, the deal manager 2210 may be in communication with a computer network, such as any combination of one or more LANs, WANs, or the Internet, for example, via a wired, wireless, or combination of wired and wireless, connections via a network interface of I/O devices and/or interfaces. The deal manager 2210 may also include several application modules that may be executed by one or more processors. Software code associated with one or more modules included in the deal manager 2210 may be stored on a tangible computer-readable medium such as for example, RAM or ROM.

The modules represented as promoter entity 2220, promotions communication portal/device 2222, and deal service application 2223 may comprise many forms or attributes, as suitable or desirable. For example, in an embodiment, the promoter entity is an individual or company associated with an FHV, the FHV including a promotions computer display, or other promotional tool. In an embodiment comprising a computer display (such as the deal presenter described above), the computer display may prompt or allow access to a passenger of the FHV to view or interact with deal services, such as by using a downloaded, installed, or firmware-based deal services application.

In certain embodiments, the promoter entity is an individual or business entity that controls or operates a billboard that displays deal service content. The display may include an identifier, or code, associated with the promoter entity, that may be input to the deal manager 2210 in connection with a purchase or transaction made by a consumer. The identifier may be used by the promotion compensation module 2212 in calculating a benefit to provide to the promoter entity in compensation for promoting the deal service content. In another embodiment, the promoter entity is a commercial or residential building, such as an apartment building, hotel, office building, etc., including an elevator, or other conveyance device, such as an escalator, associated with a display screen, print media, or the like that displays deal service content. For example, the deal service content may be in the form of an interactive, or non-interactive, application on a display screen, such as a display screen of a computer device connected to the display screen either locally, or over a network. In another embodiment, the promoter entity 2220 is a retail or wholesale establishment, such as a grocery store or department store, associated with an advertisement module (meaning, promotions communication portal) that displays deal service content (meaning, deal service application). For example, the advertisement module may be associated with a self-checkout display, or other in-store module (such as the displays often seen at cash registers with displays, which may advantageously be interactive, permitting touch screen entry by the user). In certain embodiments, as an individual is engaged in a checkout transaction, a device prompts or allows the individual to access or view a deal service application contained on or within the device, such as by selecting an icon on a screen. In some embodiments, the promoter entity is an individual or business entity associated with a billboard (meaning, promotions communication portal) that displays deal service content (meaning, deal service application). The embodiments described above are intended as examples only, and the promoter entity 2220, promotions communication portal/device 2222 and deal service application 2223 may take on any suitable or desirable form, or may be used in any suitable or desirable context.

The promotions communication portal/device 2222 and/or deal service application 2223 may include functionality or promote functionality allowing for data related to a consumer's attention to or solicitation of deals or services promoted by the promotions communication device to be transferred to a deal manager system 2210. Such transfer may be facilitated, for example, by entering a promotional code by a consumer or the promoter entity 2220, such as a code that identifies a particular promoter entity 2220, either locally, or at a remote location. In certain embodiments, transfer of transactional data is facilitated by connecting the promotions communication portal 22 to the deal manager system 2210, such as over a network.

In certain embodiments, the deal manager system comprises one or more computer servers, processors, I/O devices, or other computing functionality. The promotions communication portal and/or deal service application may provide the transaction data to the deal manager system 2210 over a network, such as the Internet, or a telephone network, or through some other transmission medium, whether electronic or physical, such as the postal service. The deal manager system 2210 may be configured such that transactional data from the promotions communication portal 2222 is stored in a transaction data database 2214. Transaction data may include, for example, date and/or time information associated with a deal service transaction.

The deal manager system 2210 includes a promotion compensation module 2212. The promotion compensation module 2212 may include one or more processors and/or memory devices, and may be in data communication with the transaction data database 2214. In certain embodiments, the promotion compensation module 2212 includes data associated with payment preferences or methods associated with one or more promoter entities. Payment preferences or methods may include, for example, designation of a bank account for direct-deposit, or payment by check or cash, or other method of payment.

In certain embodiments, the deal manager 2210 and/or transaction data module 2214 include data that allows for distinguishing between different promoter entity types. For example, the deal manager 2210 may include functionality to distinguish between taxi drivers, limo drivers, and/or other FHV drivers. In certain embodiments, the deal manager 2210 includes functionality to distinguish between drivers in a certain geographic area, or drivers in service a certain time. Such functionality may advantageously allow for communication or interaction with selective groups of promoters.

The promotion compensation module 2212 facilitates the transfer of compensation or other benefit to the promoter entity 2220, or to an account or entity associated with, or designated by, the promoter entity. Example types of benefits may include money payments, "in-kind" transfers, or a voucher, or other type of benefit or combination of benefits) For example, the promotion compensation module may transfer compensation to the promoter entity automatically or otherwise based on transactional information received from the promotions communication portal 2222. Compensation may include any combination of money, vouchers, awards, recognition, or any other form of consideration or compensation. In certain embodiments, when a consumer conducts a transaction in connection with, or based on, the promotions communication portal 2222, the promotion compensation module 2212 receives data associated with such transaction from the transaction data database 2214, and, based at least partly on such transaction, transfers, or causes the transfer of, compensation to the promoter entity 2220. In certain embodiments, compensation is transferred by mail, such as in the form of a check.

Figure 23:
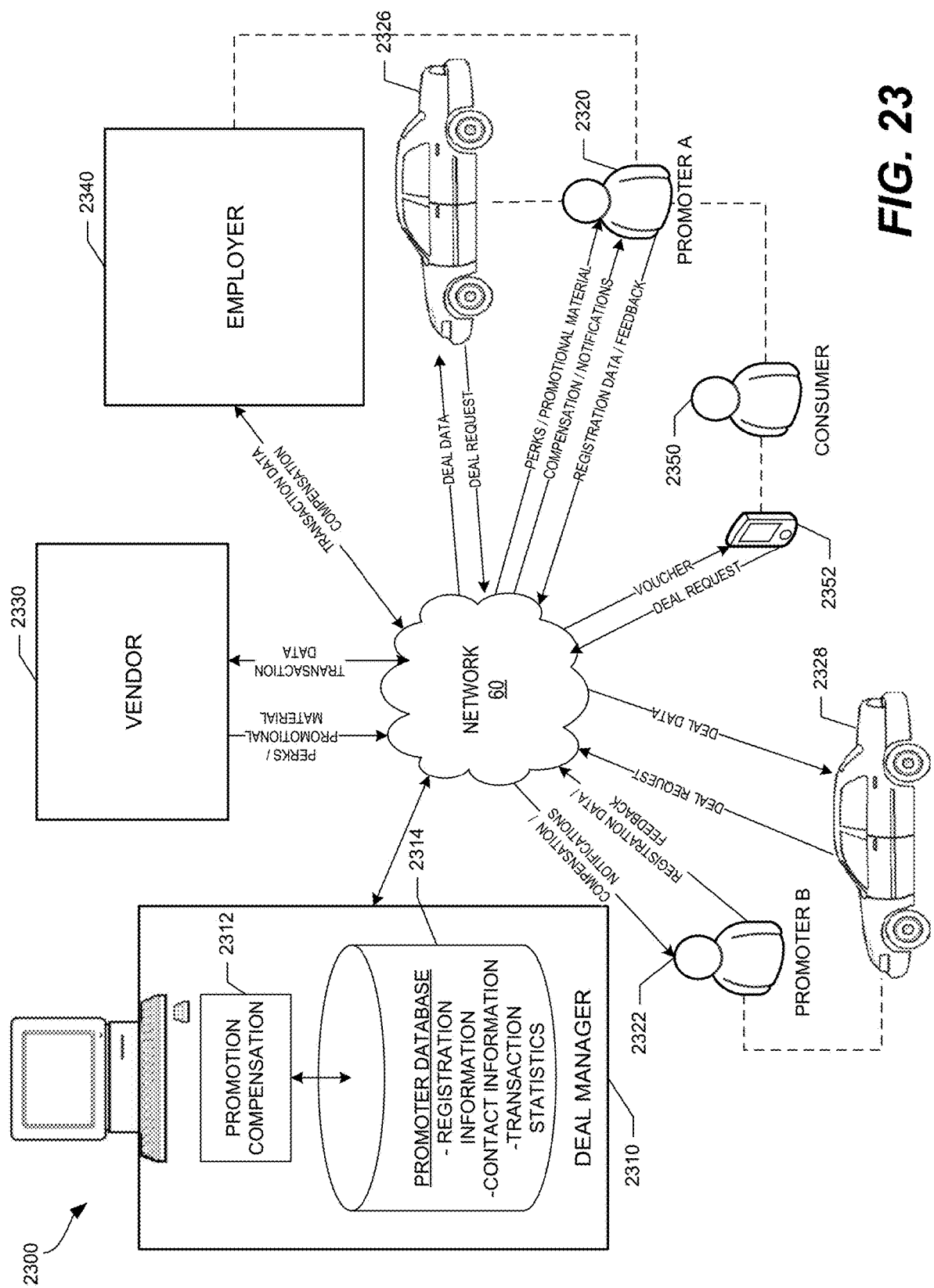
FIG. 23 is a block diagram illustrative of one embodiment of a deal manager computer system.

FIG. 23 is a block diagram illustrative of an embodiment of a deal manager computer system 2310, which may comprise one or more computing systems controlling its operation, in communication over network 2360 with an employer entity 2340 and/or one or more venues 30, among possibly other entities or devices, as illustrated. While FIG. 23 may illustrate various components of the system 2300 as separate computing systems or modules, the functionality provided for in the systems and modules of FIG. 23 may be combined into fewer components and modules or further separated into additional components and modules. In addition, while the blocks of FIG. 23 are described in the singular for ease of reference, embodiments may include more than one of any of the various blocks. For example, in one embodiment, there will advantageously be a plurality of venues/vendors 2330, employer entities 2340, consumers 2350, and/or promoters 2320, 2322, and/or a plurality of FHV's 2326, 2328. The various components of the system 2300 may be related or connected, such as through ownership, social or business interaction, employment, or otherwise. As illustrated in the figure, solid lines indicate data communication between two or more components, while dashed lines represent some type of association or relationship between components that does not necessarily correspond to a data communication link between them.

In an embodiment, the deal manager 2310 is a computing system responsible for managing deals. The deal manager 2310 may advantageously provide interfaces for vendors to define deals and may accept deal definitions created by vendors. The deal manager 2310 may also assist in the publication of deals to one or more promoters 2320, 2322. The deal manager 2310 may also receive information relating to the acceptance of a deal, for example by a consumer 2350. In certain embodiments, when deal manager 10 receives information from a promoter, for example, promoter A 2320, that a deal service transaction has taken place, the deal manager 2310 may facilitate the transfer of compensation to the promoter and/or an employer entity associated with the promoter based at least in part on the transaction information. For example, a promoter may receive compensation a per-transaction basis.

The system 2300 includes one or more promoters (for example, promoter A and promoter B) engaged in promotional activities related to deal services provided through the deal manager 2310. As described herein, promoters may be individuals, businesses, or any other type of entity. Once a promoter has registered with the deal manager 2310, such as through an online registration process (see FIG. 26), or any other suitable registration process, certain information relating to the promoter is contained within the promoter database 2312. Such information may include, for example, information relating to method of transferring compensation to the promoter, such as bank account information, physical address, and/or the like. Examples of types of promoters may include taxi drivers, venue doormen, concierges, or other service providers. The promoter 2320 may also provide feedback information to the deal manager system 2310, such as information related to vendors, or experiences or comments related to the deal manager's deal services.

In certain embodiments, a promoter can promote deal services provided through the deal manager 2310 to one or more consumers 2350. For example, a promoter may be a driver of an FHV, and a consumer 2350 may be a passenger of the FHV 60. In certain embodiments, the promoter 2320 promotes deal services to the consumer 2350, for example, while the consumer 2350 is a passenger in an FHV 26 driven by the promoter 2320. When the promoter 2320 is successful in promoting deal services, that is, the consumer 2350 engages in a transaction in connection with promotional efforts of the promoter 2320, then the promoter and/or the promoter's employer or affiliated company, may receive compensation from the deal manager 2310. A transaction may be connected to a promoter's promotional efforts if, for example, the consumer 2350 inputs a code uniquely identifiable with the promoter 2320 when making the transaction. Other information may also demonstrate a connection between the promoter's efforts and a transaction, such as a network address of a device used in the transaction, a time-stamp of the transaction, a location of the transaction, or other information. Certain embodiments provide a system 2300 that permits access by vendors to people such taxi drivers, limo drivers, doormen, and/or others that provide recommendations for venues such as shows, clubs and restaurants.

In certain embodiments, the consumer 2350 may download a deal service application from the deal manager 2310 to an electronic device 2352, which may be a mobile device. Such a download may be considered a transaction for purposes of prompting compensation of the promoter 2320. In certain embodiments, downloading of the deal service application may be done in connection with entering a code or other identifier associated with the promoter, thereby linking the consumer 2350 to the promoter 2320. In certain embodiments, future transactions using the downloaded application may also prompt compensation of the promoter 2320 and/or an employer 2340. For example, employer 2340 may be a company owning or leasing one or more FHV's. Compensation of the promoter 2320 in connection with use of the downloaded application may continue indefinitely, or for a certain period of time. For example, the promoter 2320 may be able to receive compensation in connection with use of the downloaded application, or for transactions associated with the promoter's identifier, while the promoter's registration information is current or valid with respect to the promoter database 2312. In certain embodiments, when promoter 2320 switches company/employer or geographic affiliation, the promoter's registration information may become invalid, and further transactions will not result in any compensation being paid to the promoter.

The system 2300 may be configured such that the promoter 2320 is notified, for example, via text message, email, or other mechanism, when the consumer 2350 conducts a transaction using the downloaded application or in connection with the promoter's identifier. Such notification may provide incentive or encouragement for the promoter to engage in continued promotional activities. As described in greater detail above in connection with FIG. 4, for example, consumer transactions using the downloaded application may involve the consumer transmitting a deal request/acceptance to the deal manager 2310 over a network 2360 and receiving a deal voucher, either electronically or otherwise, in response from the deal manager 2310.

In addition to, or in alternative to, promoting the downloading of deal service applications, the promoter 2320 may be compensated for various other promotional efforts. For example, the promoter 2320 may be the driver of an FHV 26 that contains a promotions communication portal/device, as described above in connection with FIG. 22. In certain embodiments, FHV 26 contains a computer device including a display visible to passengers of the FHV, as described above with respect to FIG. 1. The consumer 2350 may advantageously conduct a deal transaction using the computer device in the vehicle. In certain embodiments, such a transaction may be linked with the promoter 2320, such that the promotion compensation module 2312 is configured to calculate the benefit or amount due to the promoter 2320 based on the transaction. For example, the deal manager 2310 may include information related to FHV/driver association, such as driving schedules, vehicle identifiers, or any suitable means of identifying the promoter 2320 as the driver of the FHV 2326 at the time of a transaction. In an embodiment, the consumer inputs the promoter's identifier into the computer device at the time of the transaction. This may advantageously be done by taking a scan or photo of a bar code or QR code, for example, which is in the vehicle, or on a card. In certain embodiments, a distribution card provided by the driver includes a magnetic strip that may be scanned using a card reading device, the magnetic strip containing the driver's identifier. In another embodiment, the drivers identification code is automatically included based on the driver's identification input by the driver when the driver begins his shift.

The system 2300 may include one or more additional promoters and/or FHV's (for example, promoter B 22, FHV 28), which may or may not be associated with promoter A, FHV 26, and/or promoter A's employer. Promoter database 2314 may include registration information related to both promoter A and promoter B and may advantageously include functionality to compare performance, such as the number of associated transactions, between a large number of promoters stored in the promoter database 2312. In certain embodiments, the promoter database 2314 may include functionality to sort promoter performance by venue. For example, promoter database 2312 may include functionality to provide a list of top performers with respect to deals offered by a specific vendor. Such information may be of interest to the venue for promotional reasons.

As described above, deal manager 2310 includes a promoter database 2312 that includes various information related to one or more promoters, such as promoters who are registered with the deal manager 2310 as participating promoters. The system 2300 may provide a means for a promoter to register with the deal manager 2310 in order to facilitate receiving compensation from deal manager 2310 for promotional activities, among other things. The promoter database may include such information as registration information (described in greater detail below with reference to FIG. 26) and transaction data associated with deal transactions facilitated or promoted by one or more promoters. The transaction data may include, for example, information relating to the number of transactions a given promoter or promoters are involved with, or associated with. This information may facilitate identification of promoters who are relatively successful in their promotional activities (for example, a "top performers" subset of the total set of registered promoters), for purposes of, for example, performance evaluation. Performance evaluation may be based on a number of types of information. For example, performance evaluation may be based on the quantity or quality of transactions, location of transactions, type of deals involved in the transactions, time of day during which transactions are conducted, or other information. In an embodiment, performance is measured by, for example, the number of transactions or purchases a given promoter was responsible for over a given period of time, such as a week or month. For example, a top performers group may include all promoters who were the source of at least ten purchases/downloads in a week. In another embodiment, a top performers group may include a percentage of registered promoters with the highest volume of purchases/downloads. For example, the top performers group may include the top 10% or 20% of promoters, or some other percentage.

The system 2300 may be configured such that transaction data stored by the deal manager 2310 may be provided to one or more entities, such as, for example, a vendor 2330, or an employer or potential employer 2340. For example, the deal manager 2310 may provide transaction data to venue 2330, possibly in response to a data request. The venue 2330 may provide promotional materials or secondary incentives to the deal manager 2310 based on the data, for example, to be conveyed to a subset of the promoters (taxi and limo drivers, for example) who have been especially helpful in receiving a relatively large number of purchases by the venue. Secondary incentives may include some type of compensation, such as a voucher for use in connection with the venue 2330, or some type of award or recognition. In an embodiment, the data received by the venue 2330 does not contain personal identification information relating to promoters. For example, the data may merely comprise general notice of promotional activity of registered promoters, such as information related to top performers among the registered promoters. In certain embodiments, the deal manager 2310 stores information relating to one or more vendors, the deal manager 2310 including functionality to separate information relating to promoters and information relating to vendors.

The system 2300 may advantageously allow for indirect communication between vendors 2330 and promoters 2320, 2322, while maintaining complete confidentiality of the promoters. In certain embodiments, the system 2300 does not provide a mechanism by which vendors can reach out to promoters directly or discover names, addresses, or other personal information of promoters.

Likewise, the employer (such as a taxi fleet operator) may receive transaction data, for example, through a network 2360, either on a periodic basis or in response to a request or other event. For example, an employer may wish to convey employment materials to one or more promoters by transferring such material to the deal manager 2310, and the deal manager 2310 transferring the material to one or more registered promoters. In certain embodiments, the registration information contained in the promoter database provides information for use by the deal manager 2310 in contacting registered promoters. The vendor may send materials, via the deal manager 2310, to specific subsets of promoters. For example, a vendor may wish to send materials to promoters (as opposed to sending material only to deal presenters in particular FHVs) that fit specific criteria, such as being in a particular place at a particular time, or the like. Such information may be available in promoter database 2314.

In certain embodiments, the deal manager 2310 transfers information using a mass-communication mechanism, such as a blast email or text message, to all or a selected subset of the registered promoters. For example, the deal manager 2310 may use a mass-communication mechanism to convey information or material to promoters that was provided by a venue 2330 or employer entity 2340. The subset could be drivers who will be working on a particular night, drivers working in a particular territory, or drivers available at a particular time.

Figure 24:
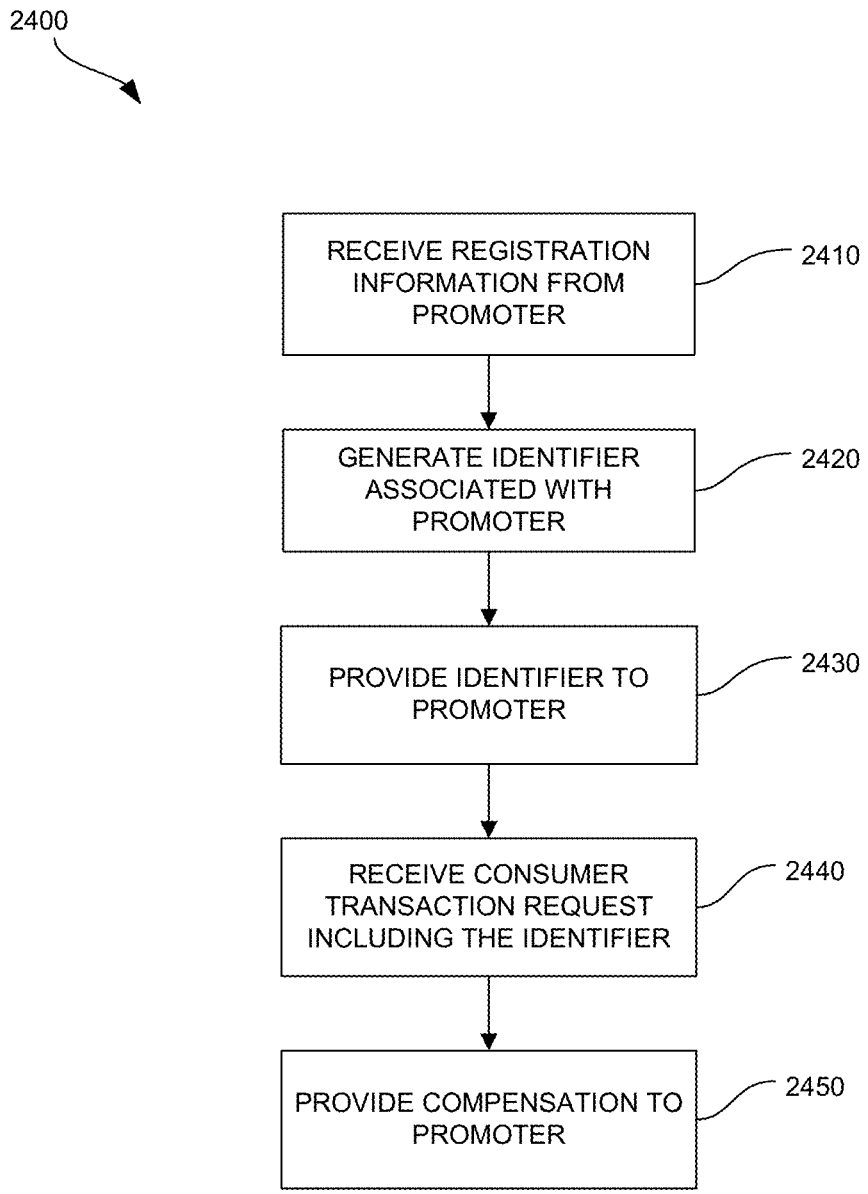
FIG. 24 illustrates a flow chart for a method for promoting a deal using information related to a promoter and calculating compensatory benefit for promotional efforts.

FIG. 24 illustrates a flow chart for a method 2400 for promoting a deal using information related to a promoter and compensating the promoter for promotional efforts. At block 2410, a deal manager system receives promoter registration information (for example, using the promoter-user interface of FIG. 26). In certain embodiments, the registration information is input using a user interface of a computer system by an individual, such as an FHV driver, who is interested in promoting deals and being compensated therefore. Upon receipt of the promoter registration information, at block 2420 the deal manager system generates a promoter identifier associated with the promoter. This takes place at block 2430. For example, the identifier may be a unique identifier associated with the promoter and may include one or more alpha-numeric characters. In certain embodiments, the identifier is a five-digit number. In certain embodiments, registration information is received in hard-copy form and processed by a processor system in the deal manager system.

Once the promoter identifier has been generated, it is provided, electronically or otherwise, to the promoter. This step is performed at block 2430. For example, the promoter identifier may be provided via email or text message, or may be printed on physical business cards which are provided to the promoter (see FIG. 28). Such cards may be designed to be distributed by the promoter in order to promote one or more deals, a deal service, and/or the promoter identifier of the promoter to potential consumers. Furthermore, cards may have a barcode, a QR code, and/or magnetic strip to permit easy transfer of the code.

At block 2440, the data manager system receives a request from a customer to download a mobile application associated with a deal program. In certain embodiments, the deal manager system is configured to receive along with the request a promoter code input. For example, a customer may enter the promoter code in connection with the download request. In an embodiment, a promoter code field is automatically populated based on driver schedule information, or other information indicating the identity of the promoter driver (such as the driver's login at the start of his shift). For example, an electronic device of the driver may communicate wirelessly with a point-of-sale device or application to identify the driver. Upon receiving the request, a controller of the deal manager system facilitates the download of the mobile application from the deal manager system to a customer device over a network.

At block 2450, based on the promoter code included with the download request, the deal manager system determines a fee or other compensation (such as free tickets or vouchers) to be paid to the promoter associated with the promoter code, and provides the fee payment to the promoter through some means. In certain embodiments, the promoter registration information provides payment preference information upon which the payment transfer is based. For example, the deal manager system may wire or otherwise transfer a money payment to an account identified by the promoter, or payment may be transferred to the promoter's employer, who may further direct the payment, or a portion thereof, to the promoter through the employee pay check. The fee payment may serve as compensation for promotion by the promoter of one or more deals or services to the customer.

Figure 25:
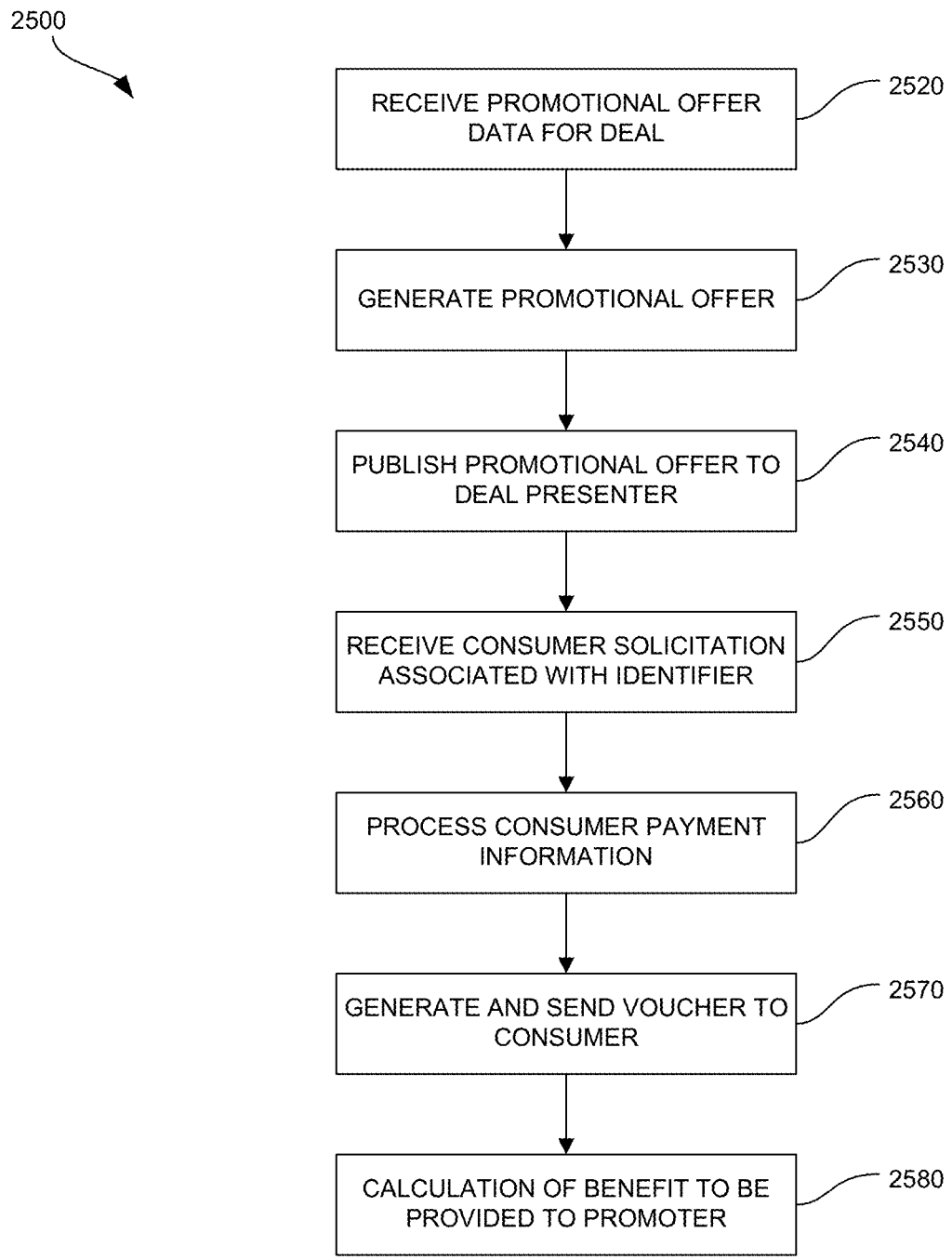
FIG. 25 is a flow chart depicting an embodiment of a method of processing a deal and compensating a promoter therefore.

FIG. 25 is a flow chart depicting the process flow of an embodiment of a process 2500 of processing a deal and compensating a promoter therefore. At block 2510 2520, a deal manager may receive promotional offer data for a deal from a vendor system. The promotional offer data may include deal data as described above with respect to FIGS. 6-8 2510. For example, the promotional offer data may include deal information describing the deal, time restrictions, location restrictions, the number available at that price (checked in real time), a retail price, images, or other data that may define a deal. The deal information may, for example, contain a description of the deal being offered to the consumer. Time restrictions may indicate the time a deal is to run. A time restriction may include a start time, such as 6 PM on Jul. 1, 2012 and an end time, such as 10 PM Jul. 1, 2012. Location restrictions may comprise a plurality of GPS coordinates defining a region where the deal should be presented ("inclusive restrictions"), or defining a region where the deal should not be presented ("exclusive restrictions"). The retail price may be an indication of the regular price of the item offered in the deal.

In response to the received promotional offer data, the deal manager may generate a promotion offer, or deal, at block 2530. The deal or promotional offer may include some of the promotional offer data. In certain embodiments, the deal manager may provide access to consumers to exclusive deals unavailable with other deal sources. In addition, the promotional offer may include a consumer category. The consumer category may describe the type of customer that may be interested in purchasing the deal. For example, a consumer category may be "affluent traveler," "businessman," "family," "adult entertainment," "frequent diner." Upon receiving the promotional offer data, the deal manager system may be configured to query the vendor, or a local database, to determine whether the promotional offer is the best currently available offer offered by the vendor. For example, the deal manager may provide notification to the vendor if it is determined that the deal is not the best current offer available to advertise, and may encourage the vendor to provide an alternative deal. At block 2540, the promotional offer publishes. Once the promotional offer publishes, such as on an in-vehicle deal presenter, as described above with respect to FIG. 1, among others, the deal manager may wait for one or more acceptances of the promotional offer.

In response to the received promotional offer data, the deal manager may generate a promotion offer, or deal, at block 2520. The deal or promotional offer may include some of the promotional offer data. In certain embodiments, the deal manager may provide access to consumers to exclusive deals unavailable with other deal sources. In addition, the promotional offer may include a consumer category. The consumer category may describe the type of customer that may be interested in purchasing the deal. For example, a consumer category may be "affluent traveler," "businessman," "family," "adult entertainment," "frequent diner." Upon receiving the promotional offer data, the deal manager system may be configured to query the vendor, or a local database, to determine whether the promotional offer is the best currently available offer offered by the vendor. For example, the deal manager may provide notification to the vendor if it is determined that the deal is not the best current offer available to advertise, and may encourage the vendor to provide an alternative deal. Once the promotional offer publishes, such as on an in-vehicle deal presenter, as described above with respect to FIG. 1, among others, the deal manager may wait for one or more acceptances of the promotional offer.

At block 2550, the deal manager receives an acceptance of a deal in the form of a solicitation from a consumer. The solicitation may include information associating the solicitation with a specific promoter identifier. At block 2560, the deal manager processes payment information of the consumer and generates and sends a voucher to the consumer related to the deal at block 2570. Transmission of the voucher may be contingent on successful processing of the payment information. The payment information may include data related to the amount paid and the account number of the payment instrument.

At block 2580, the deal manager calculates a benefit to be provided to the promoter. In certain embodiments, the compensation is of the form of a money payment, such as, for example, a small percentage (advantageously between 0.01% and 2%) or a flat payment in an amount between $0.01-0.49, $0.50-0.99, $1.00-5.00, or higher. The calculated value may diminish as the time since the consumer was contacted increases, such that over the course of a year, the value may be, for example, reduced to zero. In certain embodiments, recurrent contact with the consumer increases the benefit value, or prevents the benefit value from decreasing.

FIG. 26 is a screenshot showing an embodiment of a promoter-registration user interface 2600. The user interface of FIG. 26 may advantageously be a web page or user interface of a computer application that executes on a system that may be in communication with a deal manager system.

In some embodiments, a promoter may register with a deal manager. Registration may facilitate compensation of a promoter for promotional services provided. Various types of information related to the promoter may be required, or desired, in association with registration of the promoter. Examples, as shown, include name, physical address, email address, phone number, gender, date of birth, employer, login password. After registering, a promoter may be able to login to a server managed by the deal manager to perform various tasks, enter or revise or update previously submitted information, or view content provided on the server. For example, server content may include promotional material related to promoter compensation and/or various deals and promotions directed to all promoters or to particular categories of promoters, such as drivers, or to subcategories of drivers, for example, all drivers that are currently located in a particular geographical area.

In some embodiments, the data entered into the user interface by the promoter may be used by the deal manager system to generate one or more identifiers associated with the promoter. The term "identifier," is used herein according to its broad and ordinary meaning and may include, for example, a unique code comprising one or more alphanumeric characters.

Figure 27:
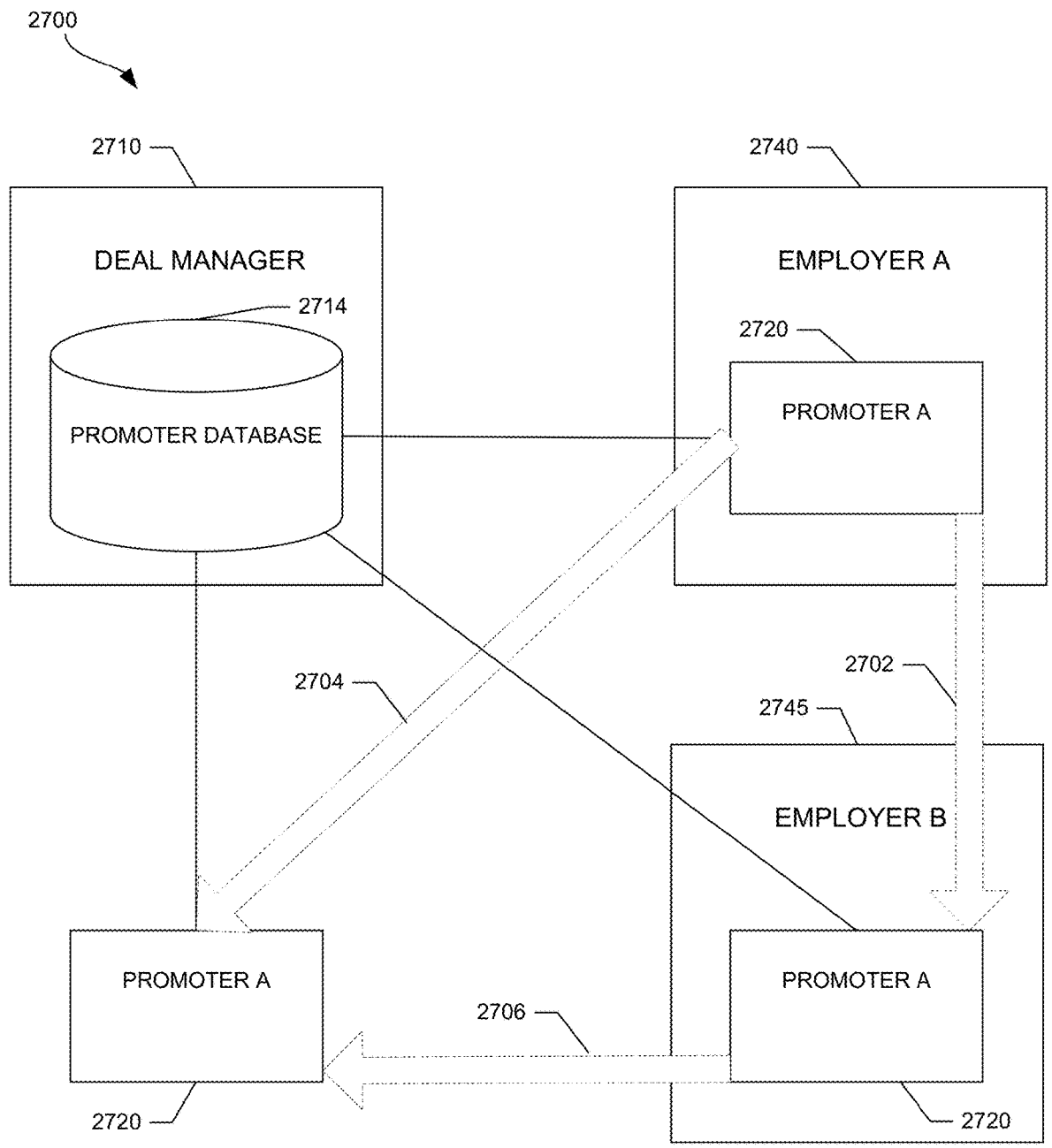
FIG. 27 illustrates an embodiment of a portable promoter registration system in accordance with one or more embodiments of the present disclosure.

FIG. 27 illustrates an embodiment of a portable promoter registration system 2700 in accordance with one or more embodiments of the present disclosure. The registration system 2700 includes a deal manager system 2710 including a promoter database 2714. In certain embodiments, a promoter 2720 can register with the deal manager system 2710. Promoter 2720 may be, for example, an employee of employer A 2740 at the time of registration with the deal manager system 2710. Employer A may be a participating company and have a relationship or affiliation of some kind with the deal manager system 2710.

At some point, promoter 2720 may leave the employ of employer A. For example, promoter 2720 may leave employer A and become employed by employer B (illustrated by line 2702). In certain embodiments, the promoter's registration is portable in the sense that, in certain circumstances, the promoter 2720 can maintain its registration and relationship with the deal manager system 2710 when changing employment positions. That is, it is not necessary for the promoter 2720 to re-register with the deal manager system 2710. In certain embodiments, in order for the promoter's registration to be maintained through a change of employment, employer B must also have a relationship with the deal manager 2710, for example, as a participating company or entity. In certain embodiments, as long as employer B is a current/active owner or operator in the deal service program and maintains deal presenter devices in at least some FHV's owned by the employer.

The promoter 2720 may leave employer A or B and work independently of an employer (as illustrated by arrows 2704 and 2706), or work for an employer that does not have a relationship with the deal manager 2710. In certain embodiments, the promoter 2720 may still be able to maintain its registration. Furthermore, in certain embodiments, the promoter 2720 may relocate to a geographic region that is outside the scope of the promoter's employer's relationship with the deal manager 2710. However, the promoter 2720, depending on the embodiment, may still maintain its registration with the deal manager 2710 and exploit the deal manager's associated compensation program as a revenue stream. In this sense, the portability aspect of certain embodiments effectively allows a promoter to maintain a side-business comprising its promotional activities and income associated with its status as a registered promoter and presence in the promoter database 2714. When the promoter changes employment from employer A 2740 to employer B 2745 (illustrated by arrow 2702), the promoter's registration information contained in the promoter database may be updated by the deal manager 2710 to remove or modify information relating to the association between the promoter 2720 and employer A. Furthermore, the promoter's registration information may be updated to reflect an association between the promoter 2820 and employer B 2745. In certain embodiments, other registration information is unaltered by the change in employment.

Figure 28:
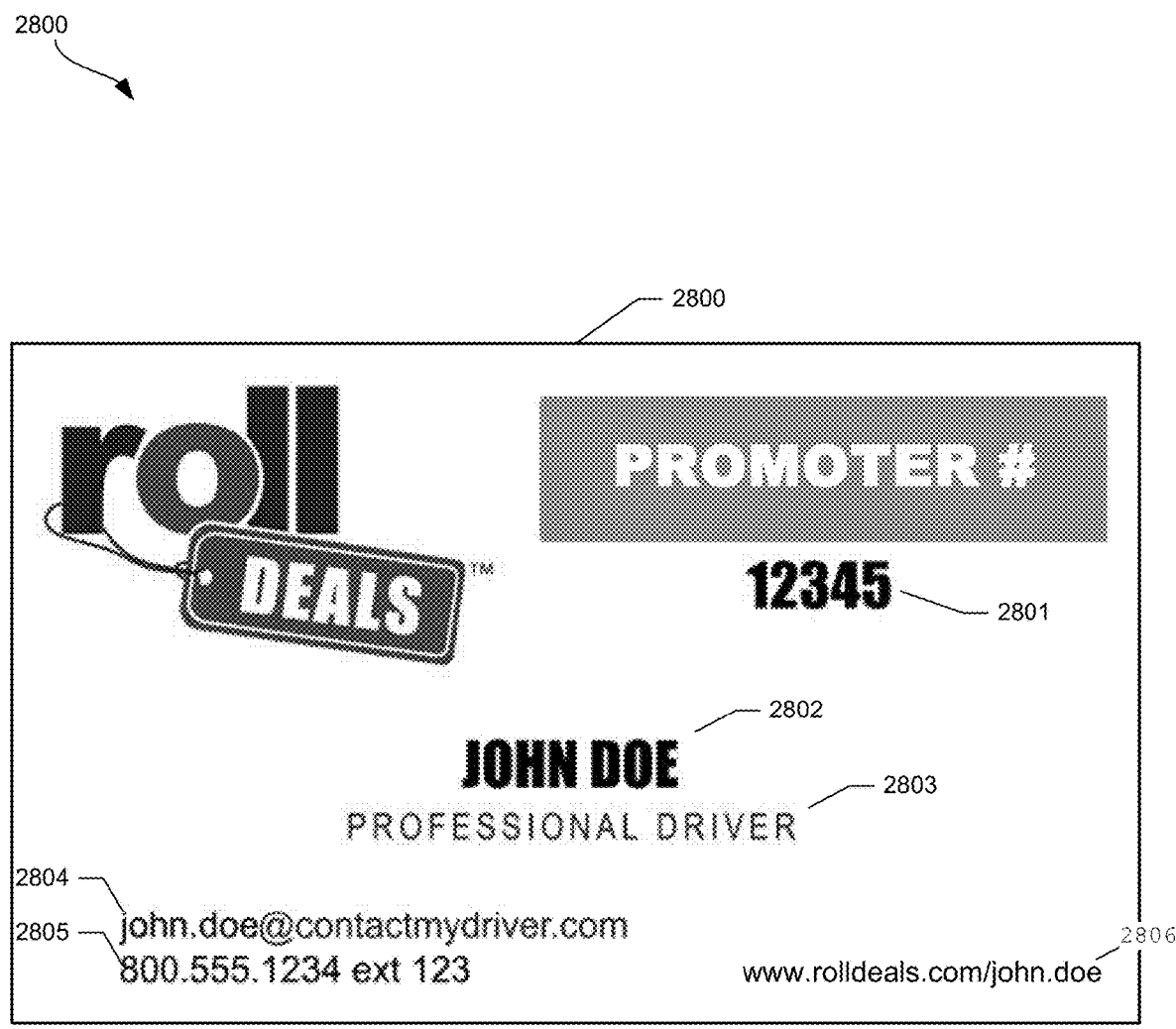
FIG. 28 illustrates an embodiment of a promoter identifier communication tool.

FIG. 28 is an embodiment of a promoter identifier communication tool 2800. In certain embodiments, the communication tool is a physical or electronic copy of a business card that may be distributed in various ways, such as by personally handing to a potential consumer. For example, business cards may include a magnetic strip or RFID technology for communicating a promoter identifier. A deal manager may provide such materials to a promoter in order to facilitate the promotional activities of the promoter. In the depicted embodiment, the card 2800 includes the promoter's name 2802, title 2803, email address 2804, phone number 2805, and promoter identifier 2801. Furthermore, the card 2800 may comprise a web address 2806 for a website or webpage associated with the promoter. The website may be, for example, accessible only to customer's of that promoter and included as a private portion of the overall content maintained by the deal manager. Furthermore, the website may provide a mechanism for the promoter to receive benefits in compensation for promoting deal services. For example, the webpage may include advertisements for viewing by the promoter's customers. The promoter may receive compensation in connection with advertisement views on his or her webpage. The webpage may include information, such as recommendations, or may provide an interface for exchanging information, such as direct communication functionality, or concierge-type questions. In certain embodiments, the card 2800 includes one or more additional pieces of information, or omits one or more of the pieces of information depicted in FIG. 28.

Distribution of a card or the like may provide a mechanism for a promoter to communicate its identifier to a consumer. However, any suitable means for communicating the identifier may be implemented. For example, a promoter may transmit the identifier via some wireless connection protocol or media, such as BlueTooth, WiFi, RFID, infrared, inductive coupling, or the like. Such transmission may be from a card, phone, or may be from an intelligent system component that is able to identify that the promoter is operating the FHV. Text messages and/or emails, which may contain a website link, may also provide a means to communicate the identifier.

Figure 29:
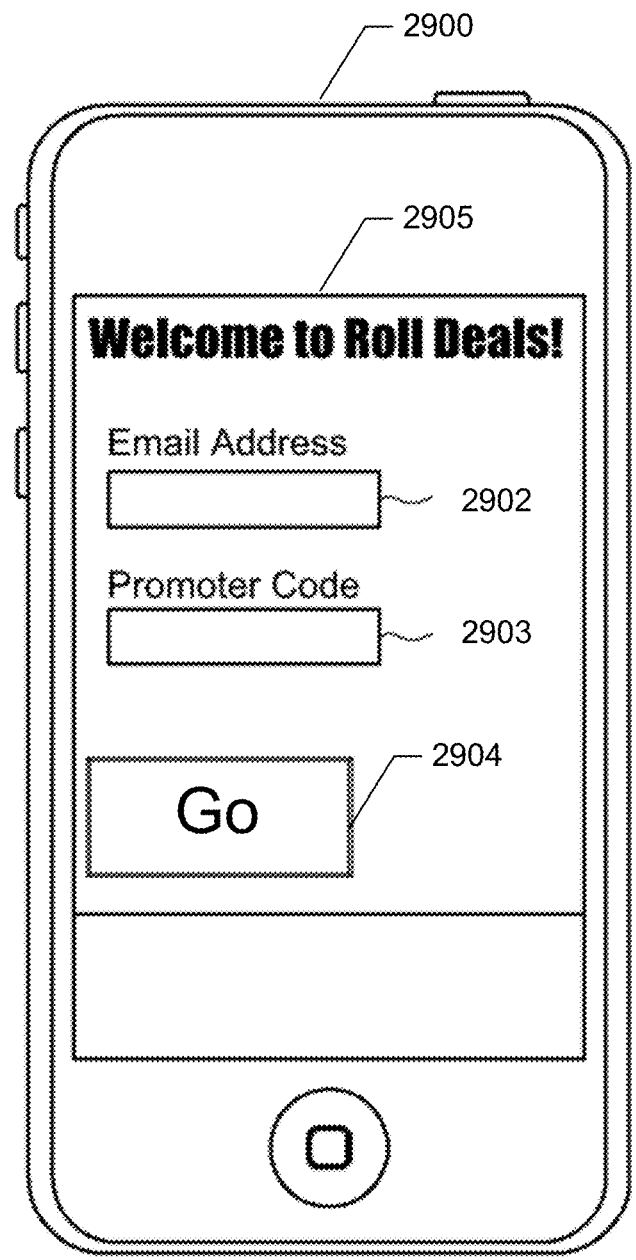
FIG. 29 illustrates an embodiment of an electronic device utilizing a deal service downloadable application.

FIG. 29 illustrates an embodiment of an electronic device utilizing a deal service downloadable application. The device 2900 includes a display for providing a visual interface for a user. The electronic device 2900 may be a handheld mobile device, such as a smart phone (for example, an IPHONE® or Android phone), or any other type of electronic device comprising a display and having the ability to communicate electronically with the World-Wide-Web. In certain embodiments, when a user, such as a consumer, downloads the deal service application to his or her electronic device, an interface is presented to the user. The interface may serve as a means to allow a user to input a promoter identifier and transmit the same to a deal manager system over a network. The promoter identifier, for example, may be associated with a promoter who directed or suggested the customer to download the application. Such download may occur at any location, such as in the passenger compartment of an FHV over a wireless network. In certain embodiments, the promoter code field 2903 is automatically populated. Furthermore, in certain embodiments, the application/smartphone 2900 allows for input of promoter identification through the use of a camera image capture of an identification number or symbol The application may present the interface 2905 shown in FIG. 29 when the application is initially launched, and not necessarily thereafter. In certain embodiments, it may be optional to enter some or all of the information requested on the interface shown. For example, it may be possible for a user to enter the application by pressing a button 2904 or otherwise without entering certain requested information. In certain embodiments, only the email address 2902 is required to be input by the user before the user may proceed by pressing, or clicking the button 2904, which causes the application to proceed past the interface shown in FIG. 29. In some embodiments, when the user presses the button 2904, the application proceeds past the depicted interface regardless of what information has been entered.

Figure 30:
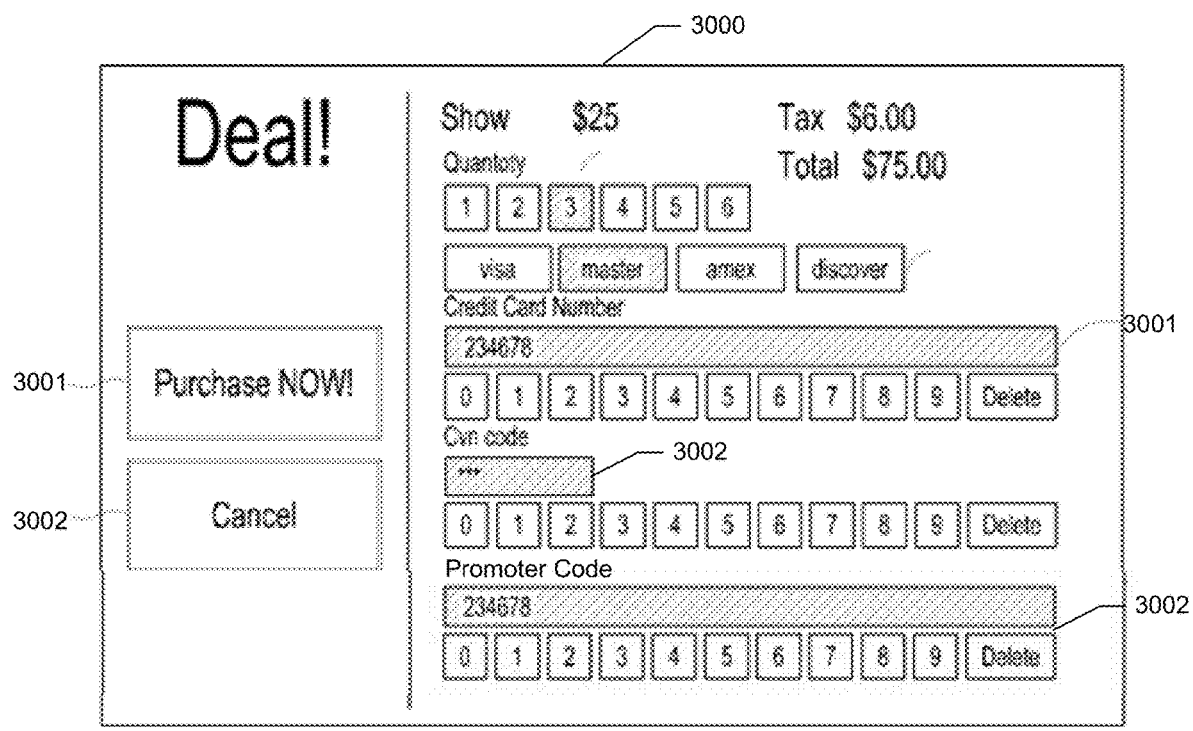
FIG. 30 is an illustrative screenshot showing an embodiment of a deal purchase user interface including a promoter identifier input field.

FIG. 30 is an illustrative screenshot showing an embodiment of a deal purchase user interface including a promoter identifier input field. As described above with reference to FIGS. 11-15, a deal may be presented on a deal presenter, such as an electronic device located within an FHV. However, screenshot 3000 may be part of any type of promotions communication portal or device, such as is described above with reference to FIG. 22. In an embodiment, once a consumer selects a deal for purchase, the electronic device may display a payment information user interface 3000. Interface screen 3000 may include a field for entering payment information 3001, 3002. In certain embodiments the electronic device includes a field for entering a promoter code associated with, for example, the driver of an FHV in which the electronic device is disposed.

In certain embodiments, it may not be required to enter the promoter code in order to complete the transaction. However, if the code is not entered, the associated promoter may not be compensated as in the case where the code is properly entered. In certain embodiments, it is unnecessary for the consumer to enter a promoter code in such an electronic device, as information associated with the device provides adequate identification of the associated promoter. Various other way for inputting promoter identification may be used other than that depicted in FIG. 30 or other embodiments disclosed herein, including, for example, scanning a bar code or QR code. As shown, the screen 3000 includes a button 3001 for completing the purchase, as well as a button 3002 for cancelling the purchase.

Figure 31:
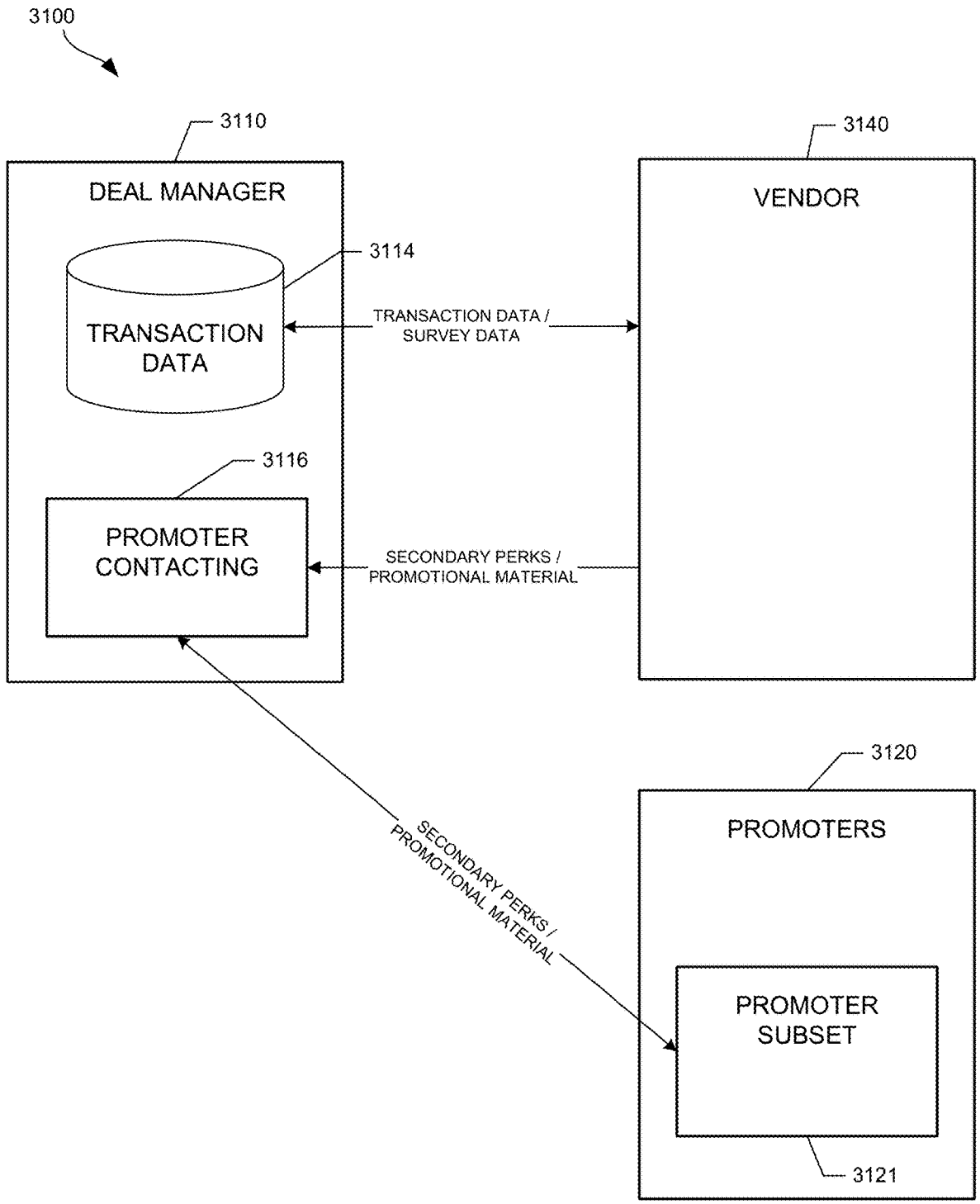
FIG. 31 illustrates an embodiment of a promoter contacting system in accordance with one or more embodiments of the present disclosure.

FIG. 31 illustrates an embodiment of a promoter contacting system 3100 in accordance with one or more embodiments of the present disclosure. The contacting system 3100 includes a deal manager 3110 including a transaction data database 3114 and a promoter contacting module 3114. The transaction data database may include information relating to quantitative and/or qualitative aspects of transactions associated with one or more registered promoters. The promoter contacting module 3116 may comprise functionality for communicating via some suitable means with one or more registered promoters. For example, the promoter contacting module 3116 may include email addresses, phone numbers, physical addresses, or some other data providing information relating to how to provide communication to one or more registered promoters. The promoter contacting module 3116 may further include a transmitter for transmitting material over a network to one or more of the promoters 3120. The material may include secondary perks or benefits, promotional materials, survey data, among possibly other things.

The system 3100 includes a business or other entity of some kind that may have interest in transaction data associated with deal service promoters. For example, the business 3140 may be a hotel, casino, or other company or entity. The system 3100 is configured such that the vendor 3140 receives, possibly in response for a request, transaction data associated with one or more of the promoters 3120 that are registered with the deal manager 3110. As discussed above, transaction data may provide information related to the performance of promoters registered with the deal manager 3110. Such data may be transferred to the vendor 3140 without disclosing personal identities of promoters, and may include general information relating to the performance of one or more of the promoters. Furthermore, the survey questions/data may be transmitted between the deal manager and the vendor 3140 related to promoter input vis-à-vis the vendor or other vendors or topics.

In response to receiving the transaction data, the vendor 3140 may wish to provide benefits, or perks, of some kind and/or promotional materials to some or all of the promoters 3120. For example, the vendor 3140 may wish to provide benefits or materials to a subset of the promoters 3121, such as a subset of promoters that, by some defined standard, have been relatively successful in their promotional activities. In order to facilitate the conveyance of such materials, the business 3140 may provide such to the deal manager 3110. Particularly, the vendor 3140 may provide materials or information to the promoter contacting module 3116. Upon receipt of such materials, benefits, or information, the promoter contacting module 3116 may convey the same, or some portion thereof, to one or more of the promoters 3120 in accordance with the desires of the vendor. Therefore, the deal manager 3110 may serve as an intermediary with respect to communication between a business 3140 and one or more promoters 3120. In such a system, anonymity of promoters may be maintained with respect to the vendor 3140. Anonymity may be desirable in order to maintain equality among vendors with respect to ability to communicate with promoters. Through anonymity, hiring, compensation of, and evaluation of, promoters may be more likely to be based on merit/performance. Further, while the vendor does not have access to the names of the promoters (taxi drivers, for example) the vendor does have access to a group of drivers having the characteristics that the vendor wants to reach (for example, location near vendor, high producer promoters, promoters who have been successful promoting that vendor).

Figure 32:
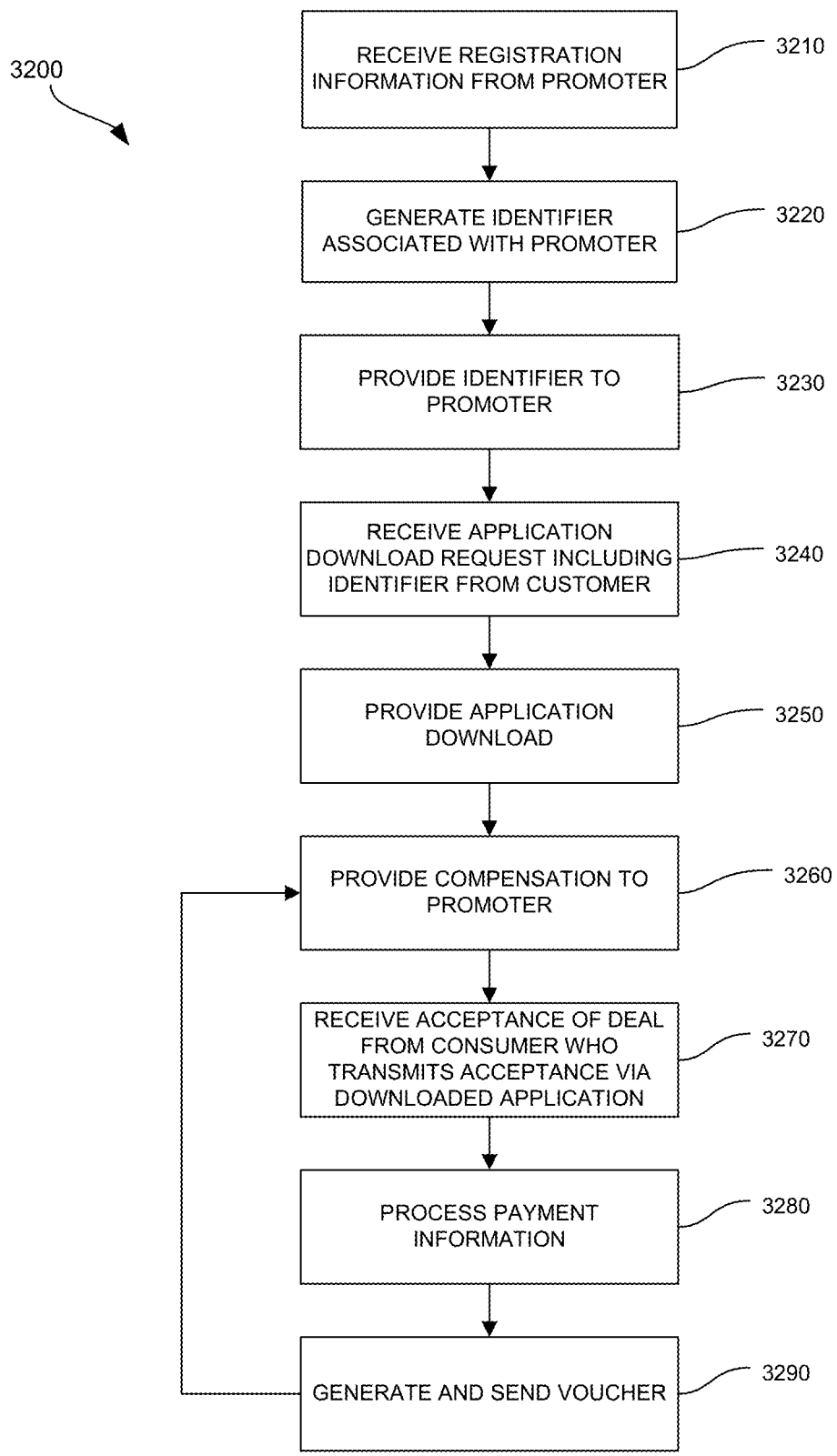
FIG. 32 is a flow chart depicting an embodiment of a method of registering and compensating a promoter in a deal service system.

FIG. 32 is a flow chart depicting an embodiment of a method 3200 of registering and compensating a promoter in a deal service system. The method may be performed, for example, by one or more processors in a deal manager system. At block 3210, registration information is received from a promoter, or potential promoter. Such information may be received, for example, over a computer network. In response to receiving the registration information, an identifier associated with the promoter, such as a unique identifier, may be generated at block 3220. The method 3200 further includes, at block 3230, providing the generated identifier in some way to the promoter. In certain embodiments, the identifier is transmitted electronically. However, it may be desirable for the promoter to physically pick up materials including the identifier at a particular location. Such a pickup event may serve as an opportunity for a representative of the deal service promoter program to interface with the promoter, provide materials that are difficult or expensive to ship, educate and/or encourage the promoter.

Following registration of the promoter, at block 3240, the method includes receiving a request to download a deal service application, such as by a consumer, wherein the request includes communication of the promoter's identifier. For example, the consumer may have input the identifier in response to information or prompting received from the promoter. In certain embodiments, the identifier is not included with the download request, but is included at a later point, such as after the application has been opened or launched on an electronic device of the consumer. Therefore, it should be understood that various aspects of the steps shown in FIG. 32 can be performed in connection with steps other than as particularly illustrated in the figure.

Once the identifier has been received by the deal manager system, compensation is transferred in some manner to the promoter in consideration for its promotional activity related to the download of the application. At block 3250, the application if provided for download. After downloading the application, the consumer may proceed to purchase one or more deals, or conduct one or more transactions using the application, for which it may be desirable to compensate the promoter. In connection with such a purchase, blocks 3270, 3280, and 3290 illustrate steps of receiving a deal acceptance, processing payment information associated with the purchase, and generating and sending a voucher associated with the deal to the consumer.

In certain embodiments, the promoter may be compensated for one or more additional transactions carried out by the consumer using the application. Therefore, the steps 3260, 3270, 3280, and 3290 provide a loop for processing such future transactions and providing compensation therefore.

In Operation

In certain embodiments, one or more of the systems and/or methods described above may operate as follows: A taxi driver may provide registration information to a deal manager system for the purposes of becoming registered as a promoter of deal services with the system. In certain embodiments, registration of the driver may only be permitted if the driver, or his or her employer, has a preexisting business relationship with the deal manager system.

In response to receiving the registration information, the driver may be entered in a registered promoters database. Furthermore, the deal manager system may generate an identifier associated with the driver, and provide the identifier to the driver. In certain embodiments, the deal manager system provides the identifier together with a collection of materials, such as in a start-up kit. The kit may include physical distribution cards or leaflets on which the driver's identifier is displayed. In certain embodiments, the start-up kit is virtual, or electronic, and may be available on a webpage of the deal manager system.

The driver may promote deal services provided through the deal manager to passengers of his or her taxi cab. For example, the driver may verbally encourage passengers to utilize the deal services, or may provide promotional materials to them, such as the card displaying the driver's identifier. A passenger consumer may make a purchase or download a deal service application in response to the driver's promotional efforts. In connection with such purchase or download, the consumer may have the opportunity to input the driver's identifier, thereby associating the driver with the purchase or download. The driver may encourage the consumer to input the identifier in order to create such an association.

When the deal manager system processes the purchase or download, the association between the driver/promoter and the passenger/consumer may prompt the deal manager to provide notice and/or compensation/recognition to the driver. This notice/compensation may encourage the driver in his or her promotional efforts and may incentivize the driver to engage in further efforts.

The deal manager may maintain data associated with registered promoters providing information relating to the nature of one or more of the registered promoters' promotional activities. This data may be useful to vendors or other entities. For example, a vendor may wish to provide vouchers or promotional material to promoters based on such data. It may be desirable for the deal manager to allow the vendor to provide materials to promoters without personally identifying and/or contacting the promoters. Therefore, the deal manager system may receive the materials from the vendor and provide them to all, or a subset of, the registered promoters. For example, a "top performers" subset, or a temporally (for example, within two hours of a show time) or geographically limited group of the registered promoters may receive certain materials from a vendor.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method of electronically providing in-vehicle advertising and sales services to an occupant of a for hire vehicle ("FHV"); the method comprising:
    obtaining a location of the FHV from a global positioning system ("GPS");
    communicating the location of the FHV to a deal presenter system;
    a deal manager system obtaining, by electronic communication, at least one advertisement for a time sensitive discounted good and/or a time sensitive discounted service (a "deal") from a vendor;
    the deal presenter system displaying the deal when the location is within a predetermined inclusive restriction area and/or to not displaying the deal when the location is within a predetermined exclusive restriction area;
    the deal manager system electronically communicating the deal through a network to at least one deal presenter system that is disposed in the FHV;
    the at least one deal presenter system obtaining a current fare fee accumulated by the occupant of the FHV;
    the at least one deal presenter system modifying a cost of the deal based at least in part on the current fare fee accumulated by the occupant of the FHV;
    the at least one deal presenter displaying the deal with the modified cost to the occupant of the FHV on a display that is disposed within the FHV;
    the at least one deal presenter system accepting input from the occupant of the FHV;
    the at least one deal presenter system accepting payment from the occupant of the FHV; and
    the at least one deal presenter system electronically communicating an acceptance of the deal to the deal manager system through the network.

2. The computer implemented method of claim 1 wherein accepting input from the occupant of the FHV comprises the at least one deal presenter system accepting contact information of the occupant of the FHV.

3. The method of claim 2 wherein the contact information comprises an email address.

4. The method of claim 1 further comprising the at least one deal presenter system generating a voucher upon completion of payment for the deal by the occupant of the FHV.

5. The method of claim 4 wherein generating the voucher comprises printing a physical copy of the voucher.

6. The method of claim 4 wherein generating the voucher comprises causing an email to be sent to an email account of the occupant of the FHV.

7. The method of claim 6 wherein the email comprises indicia of a purchase of the deal.

8. The method of claim 1 further comprising after payment by the occupant for the deal, the deal manager system electronically communicating indicia of a sale of the deal to the vendor.

9. The method of claim 8 further comprising the deal manager system updating available inventory of the deal after a sale of the deal to the occupant.

10. The method of claim 1 further comprising the deal manager system sending updated deal information to the at least one deal presenter system which reflects a decreased available supply of deals when the occupant has purchased the deal.

11. The method of claim 1 wherein the deal manager system electronically communicating the deal to at least one deal presenter system comprises the deal manager system electronically communicating the deal to at least one deal presenter system based on a geographic location of the at least one deal presenter system.

12. The method of claim 1 wherein the deal manager system electronically communicates a plurality of deals to the at least one deal presenter system and wherein the at least one deal presenter system determines whether or not to present one or more of the deals to the occupant based at least in part on a current physical location of the at least one deal presenter system.

13. The method of claim 1 further comprising the vendor providing one or more predetermined criteria for presentation of the deal.

14. The method of claim 13 wherein the one or more predetermined criteria for presentation of the deal comprises a location where the occupant was picked up by the FHV.

15. The method of claim 13 wherein the one or more predetermined criteria for presentation of the deal comprises a drop off location where the occupant is to be dropped off by the FHV.

16. The method of claim 13 wherein the one or more predetermined criteria for presentation of the deal comprises a start and a stop time for when the deal may be presented or accepted.

17. The method of claim 1 further comprising the at least one deal presenter electronically communicating to edit a current trip sheet in response to the occupant purchasing the deal.

18. The method of claim 1 further comprising the at least one deal presenter system electronically communicating with a dispatch module of the FHV and based upon that electronic communication, the dispatch module causing a fare fee to be updated if the occupant accepts the deal.

19. The method of claim 1 wherein the deal includes transportation to a location where the good or service will be provided to the occupant.

* * * * *